(12) United States Patent
Nasu et al.

(10) Patent No.: US 7,899,279 B2
(45) Date of Patent: Mar. 1, 2011

(54) OPTICAL DELAY LINE INTERFEROMETER

(75) Inventors: Yusuke Nasu, Atsugi (JP); Kuninori Hattori, Atsugi (JP); Toshikazu Hashimoto, Atsugi (JP); Yohei Sakamaki, Atsugi (JP); Hiroshi Takahashi, Atsugi (JP); Yasuyuki Inoue, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 44 days.

(21) Appl. No.: 12/528,933

(22) PCT Filed: Jan. 9, 2009

(86) PCT No.: PCT/JP2009/050256
§ 371 (c)(1),
(2), (4) Date: Aug. 27, 2009

(87) PCT Pub. No.: WO2009/088089
PCT Pub. Date: Jul. 16, 2009

(65) Prior Publication Data
US 2010/0119189 A1    May 13, 2010

(30) Foreign Application Priority Data

Jan. 10, 2008  (JP) .................................. 2008-003426
Sep. 18, 2008  (JP) .................................. 2008-239864
Sep. 19, 2008  (JP) .................................. 2008-241079

(51) Int. Cl.
*G02B 6/12* (2006.01)
(52) U.S. Cl. .......................................................... 385/14
(58) Field of Classification Search .................. None
See application file for complete search history.

(56) References Cited

U.S. PATENT DOCUMENTS

| 4,781,424 | A  | 11/1988 | Kawachi et al. |
| 6,304,687 | B1 | 10/2001 | Inoue et al. |
| 2007/0047966 | A1 | 3/2007 | Hironishi et al. |
| 2007/0127933 | A1 | 6/2007 | Hoshida et al. |
| 2010/0021179 | A1* | 1/2010 | Kikuchi ........................ 398/183 |

FOREIGN PATENT DOCUMENTS

| JP | 63-147114 | 6/1988 |
| JP | 2614365   | 8/1992 |
| JP | 10-282350 | 10/1998 |

(Continued)

OTHER PUBLICATIONS

PCT/JP2009/050256, Jul. 22, 2010, International Preliminary Report.

(Continued)

*Primary Examiner* — Sung H Pak
(74) *Attorney, Agent, or Firm* — Workman Nydegger

(57) ABSTRACT

A demodulator is provided for a multilevel differential phase shift keyed signal, capable of eliminating polarization dependence due to birefringence and polarization coupling-induced light resulting from a waveguide structure, and also, polarization dependence due to dynamic birefringence produced at the time of driving a variable phase adjuster. The demodulator is configured of an optical delay line interferometer of a waveguide interference type. The S/N ratio of a demodulated signal in the demodulator formed by the optical delay line interferometer can be also improved. Further, both the polarization dependence and the temperature dependence of the optical delay line interferometer can be reduced. The disposition of a polarization converter and groves filled with a temperature compensation material makes it possible to provide a circuit configuration suitable for eliminating the polarization dependence and the temperature dependence of the optical delay line interferometer.

23 Claims, 31 Drawing Sheets

FOREIGN PATENT DOCUMENTS

| | | |
|---|---|---|
| JP | 2005-195840 | 7/2005 |
| JP | 2007-67955 | 3/2007 |
| JP | 2007-158852 | 6/2007 |
| WO | WO 98/36299 | 8/1998 |
| WO | WO 03/063515 A2 | 7/2003 |

OTHER PUBLICATIONS

Yusuke Nasu et al, *Polarization Insensitive MZI with Asymmetric Half-wave Plate Configurations*, IEICE, Mar. 5, 2008, pp. 197.

* cited by examiner

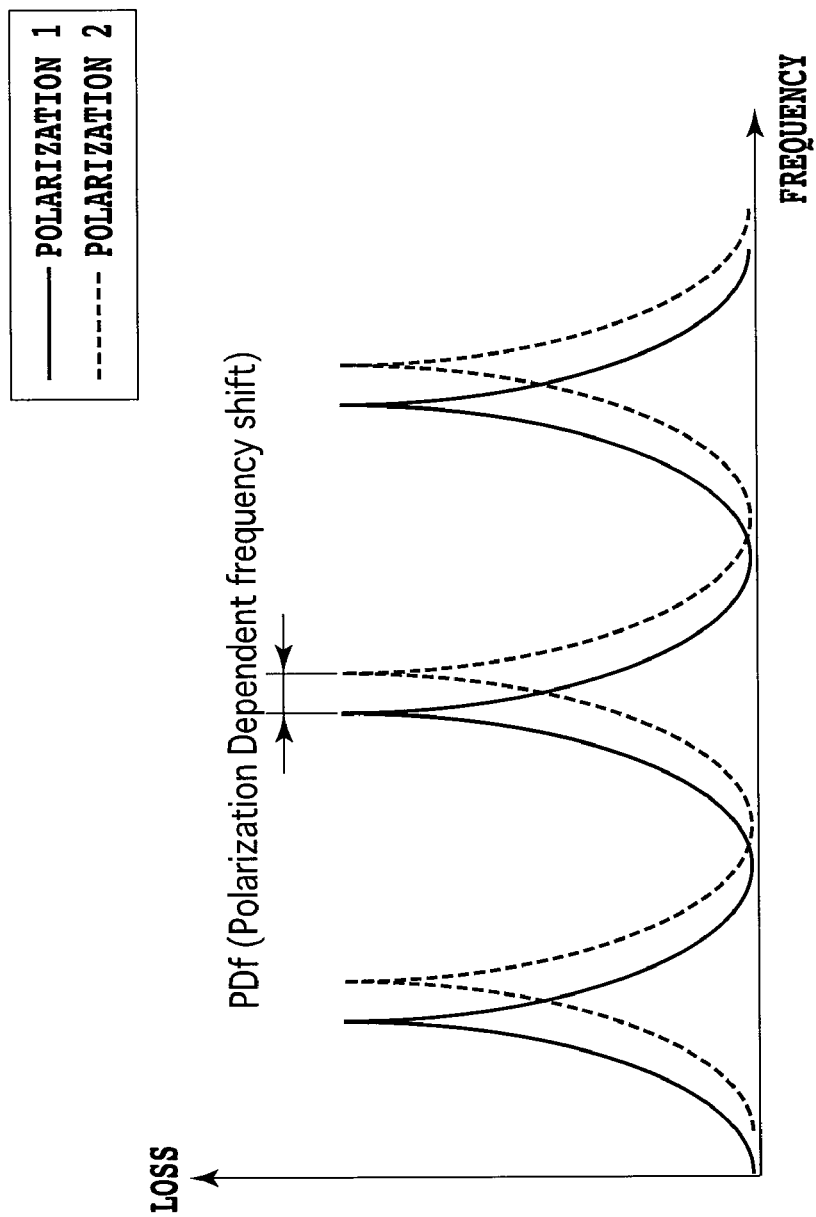

OPTICAL DELAY LINE INTERFEROMETER

TECHNICAL FIELD

The present invention relates to an optical delay line interferometer that demodulates a phase-modulated optical signal and more particularly to an optical delay line interferometer having a low degree of polarization dependence.

BACKGROUND ART

As the optical communication technology moves forward, development of optical components configured to subject an optical signal directly to signal processing becomes increasingly important. Above all, a waveguide-type optical interferometer utilizing interference of light and using a planar lightwave circuit (PLC) integrated on a planar substrate, has advantageous features including mass production, low cost and high reliability, and many pieces of research and development thereof have been carried out. The waveguide-type optical interferometers include an arrayed waveguide diffraction grating, a Mach-Zehnder interferometer, and a lattice circuit, for example.

Such waveguide-type optical interferometers are fabricated by use of standard photolithography and etching technologies and glass deposition technology such as FHD (flame hydrolysis deposition). Specifically, the outline of the process is as follows. First, an undercladding layer, and a core layer with a higher refractive index than its surroundings are deposited on top of a substrate. Then, a waveguide pattern is formed in the core layer. Finally, the waveguide formed in the core layer is buried by an overcladding layer. With such a process, the waveguide is fabricated. An optical signal propagates through the waveguide, while being confined within the waveguide fabricated through such a process as is mentioned above.

Now letting us turn our eyes to modulation/demodulation process technology for an optical transmission system, signal transmission using phase modulation method is in wide, practical use. Differential phase shift keying (DPSK), in particular, attracts attention in that it is strongly resistant to signal degradation caused by chromatic dispersion or polarization mode dispersion in a transmission line. Further, the implementation of multilevel modulation, i.e., an increase of the number of constellation points for phase modulation, also takes place. Research has been done also on DQPSK (differential quadrature phase shift keying) with four constellation points, or the like, in addition to DBPSK (differential binary phase shift keying) with two constellation points.

Demodulation of such a DBPSK or DQPSK optical signal requires an optical delay line interferometer configured to perform demodulation by causing interference between optical signals corresponding to contiguous symbols. Specifically, a phase difference between optical signals of contiguous symbols can be demodulated by dividing an optical signal into optical signals, delaying one optical signal by a time equivalent to one symbol, and causing the one optical signal to interfere with the other optical signal. Application of the PLC technology previously mentioned for fabrication of the optical delay line interferometer is expected to achieve a long period of stabilization of circuit performance, circuit miniaturization, or the like.

Conventional Art 1:

FIG. 1 is a diagram showing a basic configuration of an optical delay line interferometer that forms a DPSK demodulator. Operation of the optical delay line interferometer will be described below, taking DBPSK with two constellation points as an example. An optical delay line interferometer 1 is formed by one Mach-Zehnder interferometer. Specifically, the optical delay line interferometer 1 includes, in its input, a first input waveguide 2 and an optical splitter 3 connected to the input waveguide 2, and includes, in its output, first and second output waveguides 6 and 7 and an optical coupler 10 connected to the output waveguides. The optical splitter 3 and the optical coupler 10 are connected by two waveguides of different lengths, namely, a long arm waveguide 4 and a short arm waveguide 5. A pair of photodiodes (hereinafter called "PDs") 8a and 8b that form a balanced photodetector are disposed at the output ends of the first and second output waveguides 6 and 7, respectively.

The optical delay line interferometer 1 receives a DBPSK optical signal coming in at the input waveguide 2. The DBPSK optical signal is divided into two optical signals, the long arm waveguide 4 and the short arm waveguide 5, by the optical splitter 3. The long arm waveguide 4 and the short arm waveguide form an optical delay line 9 by a difference in length between these waveguides. The amount of delay time provided by the optical delay line 9 is time equivalent to one symbol of the DBPSK optical signal. For example, if a symbol rate is 20 Gbaud, a delay of 50 ps, the reciprocal of the symbol rate, is the amount of delay time for one symbol. The optical delay line 9 gives this delay thereby to generate interference between the DBPSK optical signals across their contiguous symbols. The DBPSK optical signals subjected to the interference exit through the two output waveguides 6 and 7, respectively, to the balanced photodetector, which then in turn detects a light intensity difference between the optical signals. This results in generation of a demodulated signal corresponding to a phase difference between the contiguous symbols. In other words, the demodulated signal is obtained from the balanced photodetector formed of the pair of PDs 8a and 8b. For example, a phase difference of 0 provides a positive demodulated signal, and a phase difference of $\pi$ provides a negative demodulated signal.

In the case of binary or further multileveled phase modulation, the demodulation of the phase difference is not possible with one Mach-Zehnder interferometer alone. For instance, a DQPSK demodulator with four levels requires two Mach-Zehnder interferometers for demodulation of a modulated optical signal. Description will now be given of a configuration of an optical delay line interferometer for DQPSK.

Conventional Art 2:

FIG. 2 is a block diagram showing a conventional optical delay line interferometer for DQPSK. Referring to Patent Document 1, the most basic optical delay line interferometer as employed in the conventional art has a configuration such that DQPSK optical signals predivided by an optical splitter are inputted to two different Mach-Zehnder interferometers, respectively. Specifically, one of DQPSK optical signals divided by an optical splitter 23 is inputted to a first optical delay line interferometer from an optical splitter 3a through a pair of waveguides 4a and 5a to the pair of PDs 8a and 8b. The other DQPSK optical signal is inputted to a second Mach-Zehnder interferometer from an optical splitter 3b through a pair of waveguides 4b and 5b to a pair of PDs 8c and 8d. The two Mach-Zehnder interferometers include optical delay lines 9a and 9b, respectively, which each provide a delay of one symbol. Further, the one optical delay line 9a includes a ($\pi/2$) phase shifter 12.

Variable phase adjusters are disposed in the optical delay lines 9a and 9b and the phase shifter 12 thereby to effect fine adjustment of the delay time or the amount of phase shift. For instance, if a heater is used to form the variable phase adjuster, heating the heater disposed in an upper portion of the waveguide can effect a change in refractive index and hence a change in optical path length. Thus, fine adjustment can be made on the delay time or the amount of phase shift to be given, by the amount of increase in temperature of the heater.

According to the above-mentioned configuration, the optical delay line interferometers demodulate separate orthogonal binary signals (i.e., an I signal and a Q signal), respectively, thereby enabling the demodulation of the DQPSK optical signal with four levels, taken as a whole. With the above-mentioned configuration, however, if the required number of Mach-Zehnder interferometers increases as the number of constellation points is increased for multilevel modulation, an area in the PLC, occupied by the optical delay line interferometer taken as a whole, multiplies, which in turn likewise leads to an increase in cost per chip. For the demodulation of a multileveled modulated signal, therefore, the utilization of the optical delay line interferometer of the configuration shown in FIG. 2 is undesirable.

Conventional Art 3:

FIG. 3 is a block diagram showing another conventional optical delay line interferometer for DQPSK. This configuration presents a proposal of a method in which one optical delay line is utilized to form substantially two Mach-Zehnder interferometers. Specifically, two DQPSK optical signals divided from a DQPSK optical signal by the optical splitter 3 are inputted to a pair of waveguides, namely, the long arm waveguide 4 and the short arm waveguide 5, respectively. The long arm waveguide 4 is provided with the optical delay line 9. Each of the optical signals from the waveguides 4 and 5 is further divided into two optical signals by optical splitters 13b and 13a, respectively. The two optical signals thus divided are recombined by two optical couplers 10a and 10b and thereby interfere with each other. Interfering lights from each of the optical couplers 10a and 10b are fed to the corresponding one of two balanced photodetectors 8a and 8b via output waveguides 6a and 7a, respectively, or output waveguides 6b and 7b, respectively (see Patent Document 1). The demodulation of the DQPSK optical signal can be accomplished by balanced detection of two optical signals exiting from each of the optical couplers 10a and 10b.

Any of four waveguides that link the optical splitters 13a and 13b and the optical couplers 10a and 10b may be provided with the ($\pi$/2) phase shifter 12. The variable phase adjusters are disposed in the optical delay line 9 and the phase shifter 12, respectively, as is the case with the conventional art 2. Fine adjustment enables an accurate provision of a desired amount of phase shift for the optical delay line 9 and the phase shifter 12. According to the above-mentioned configuration of the optical delay line interferometer, one common optical delay line alone can form substantially two Mach-Zehnder interferometers. The use of the one common optical delay line for formation of the optical delay line interferometer enables miniaturization of the optical delay line interferometer taken as a whole, as compared to the configuration of the conventional art 2.

In the Mach-Zehnder interferometer that forms each of the above-mentioned optical delay line interferometers, a wavelength $\lambda_0$ at which transmittance of the optical signal outputted from one of the two output waveguides is at its maximum is expressed by the following equation:

$$\lambda_0 = n \times \Delta L / k \quad \text{Equation (1)}$$

where n denotes an effective refractive index of the long arm waveguide; $\Delta L$ denotes an optical path length difference between the long arm waveguide and the short arm waveguide; and k denotes a natural number. When the wavelength of the optical signal inputted to the Mach-Zehnder interferometer is $\lambda_0$, the transmittance of the optical signal outputted from one of the two output waveguides is at its maximum, while the transmittance of the optical signal outputted from the other output waveguide is at its minimum.

For the optical delay line interferometer to demodulate a phase-modulated optical signal, it is required that a wavelength $\lambda s$ of the optical signal coincide with an optimum operating wavelength $\lambda c$ of the optical delay line interferometer. As employed herein, the optimum operating wavelength $\lambda c$ refers to a wavelength at which the phase-modulated optical signal can be demodulated at the highest S/N (signal-to-noise) ratio. Specifically, for example, $\lambda c$ is such that $\lambda c = \lambda_0$ for a DBPSK optical signal, or is such that $\lambda c = \lambda_0 + n\Delta L/(4k \times (k-1))$ for a DQPSK optical signal.

Referring to FIG. 1, methods for effecting a coincidence of $\lambda s$ and $\lambda c$ include a method in which a variable phase adjuster for the effective refractive index is disposed in the long arm waveguide 4 or the short arm waveguide 5 thereby to adjust the effective refractive index. For instance, if a heater is used to form the variable phase adjuster, heating the heater disposed in an upper portion of the waveguide can effect an adjustment of the effective refractive index. However, a change in temperature of the optical delay line interferometer leads to a mismatch between the wavelengths $\lambda s$ and $\lambda c$, even if adjustment is such that the wavelength $\lambda s$ of the optical signal coincides with the wavelength $\lambda c$ at a given temperature T1. In other words, there arises the following problem: a change from T1 to T2 in the temperature of the optical delay line interferometer leads to the mismatch between the wavelength $\lambda s$ of the optical signal and the wavelength $\lambda c$, because the effective refractive index has temperature dependence.

A solution to this problem necessitate adoption of means for keeping the temperature of the optical delay line interferometer constant, using a Peltier device or the heater, or adoption of means for keeping the variable phase adjuster in operation at all times. Any of these means presents the problem of increasing power consumption by the optical delay line interferometer, because of having to drive the Peltier device or the heater. In other words, it is necessary to lessen the temperature dependence of interference characteristics of the Mach-Zehnder interferometer and thereby reduce electric power required to compensate for the temperature dependence.

In order to reduce the temperature dependence of the optical delay line interferometer formed of the Mach-Zehnder interferometer, there has heretofore been used a method that involves forming a groove by removing the cladding and the core in a portion of the arm waveguide, and filling the groove with a material (hereinafter referred to as a "temperature compensation material") having a different coefficient of refractive index dependence on temperature from a coefficient of effective refractive index dependence on temperature of the waveguide. Thereby, a transmission wavelength $\lambda_0$ can become temperature-independent. This method is disclosed in detail in Patent Document 2, for example.

Conventional Art 4:

FIG. 4A is a diagram showing an example of the configuration of the optical delay line interferometer that forms the DPSK demodulator, in which the transmission wavelength $\lambda_0$ of the Mach-Zehnder interferometer is made temperature-independent. In the configuration of this conventional art, a groove 14 is formed extending across the long arm waveguide 4, and the groove 14 is filled with the temperature compensation material. A variable phase adjuster 15 for the effective refractive index is disposed in the short arm waveguide 5.

FIG. 4B is a view showing, in enlarged dimension, grooves for temperature compensation. In order to reduce a loss of propagating light that occurs in the groove 14, the groove 14 is divided into multiple grooves 14a to 14e each having a width w, which are arranged at predetermined spaced intervals p. Conditions required for the temperature compensation material to be filled into the groove 14 are as follows. Specifically, it is particularly desirable that the temperature compensation material be such that the coefficient dn'/dT of refractive index dependence on temperature of the temperature compensation material is different in sign from the coefficient dn/dT of effective refractive index on temperature of the long arm waveguide, and |dn'/dT| is sufficiently larger than |dn/dT|. The temperature compensation materials that satisfy such conditions include a silicone resin for example, which satisfies the relationship (dn'/dT)~−40×(dn/dT). Meanwhile, if the optical delay line interferometer is formed of multiple Mach-Zehnder interferometers, the transmission wavelength $\lambda_0$ can be made temperature-independent by forming the same grooves in portions of the long arm waveguides 4 of the Mach-Zehnder interferometers, and filling the grooves with the temperature compensation material.

[Patent Document 1]: International Patent Publication No. WO2003/063515

[Patent Document 2]: International Patent Publication No. WO98/36299

[Patent Document 3]: Japanese Patent No. 2614365

DISCLOSURE OF THE INVENTION

However, a waveguide-type optical circuit generally has birefringence, and thus, the interference and other characteristics of the optical delay line interferometer vary depending on the state of polarization of an input optical signal. A variation in the interference characteristics, depending on the state of polarization of the input optical signal, leads to the problem of causing significant degradation of the S/N ratio of a demodulated signal at the time of demodulation of a DPSK optical signal. The birefringence leading to the polarization dependence of the interference characteristics results from the following causes.

A first cause is that the waveguide-type optical circuit is made of different materials such as the substrate and the core layer, and thus, the materials have different coefficients of thermal expansion. Asymmetric stress produced in the waveguide by a difference in the coefficient of thermal expansion produces the birefringence. In other words, the birefringence occurs because of the structural feature of the waveguide, that the waveguide is a buried waveguide formed on the substrate.

A second cause is that the birefringence results from operation of the variable phase adjuster for fine adjustment of the delay time or the like in the optical delay line interferometer. The heater or the like, for example, is used to form the variable phase adjuster, as has been described also for the conventional art 2 and the conventional art 3. When the variable phase adjuster is driven, the birefringence of the waveguide changes dynamically according to the amount of drive such as the amount of heat of the heater.

FIG. 5 is a graph explaining PDf (Polarization Dependent frequency shift), which is an index indicative of the polarization dependence of the optical delay line interferometer. When the birefringence occurs in the waveguide, the polarization dependence caused by the state of polarization of input light develops in a loss spectrum of the optical delay line interferometer, as shown in FIG. 5. The reason is that, due to the fact that the effective refractive index sensed by propagating light traveling through the waveguide depends on the state of polarization of the light, a variation in the state of polarization of the input light causes a slight variation in a period. The slight period variation, if viewed as a variation in the loss spectrum in a given waveband (or frequency band), appears as a shift in the loss spectrum along a frequency axis. A difference between a maximum shift in the loss spectrum toward higher frequencies (e.g., polarization 2) and a maximum shift therein toward lower frequencies (e.g., polarization 1), when determined by measurement of the loss spectrum with the input light in every varying state of polarization, is called the PDf (Polarization Dependent frequency shift). The PDf is used as a typical index indicative of the extent of the polarization dependence of the optical delay line interferometer.

Generally, the elimination of the polarization dependence in the optical delay line interferometer with a simple configuration such as is shown in FIG. 1 can be accomplished by the placement of a polarization converter in the optical delay line interferometer (See Patent Document 3). The polarization converters include, for example, a half-wave plate whose optic axis is inclined by 45° relative to an optic axis of the waveguide. The half-wave plate whose optic axis is inclined by 45° relative to the optic axis of the waveguide will be hereinafter called merely a "half-wave plate." By the utilization of the half-wave plate for conversion from one to another of TE and TM polarizations, the effective refractive index sensed by the propagating light can be regarded as an average value of the effective refractive indices for the TE polarization and the TM polarization, respectively. Thus, the placement of the polarization converter in the optical delay line interferometer enables the elimination of the polarization dependence of the optical delay line interferometer.

Even with the placement of the polarization converter in the optical delay line interferometer, however, the complete elimination of the polarization dependence is difficult with the DQPSK demodulator of such a configuration as is disclosed in the conventional art 3, or the configuration of the DPSK demodulator for further multileveled phase modulation. With the DQPSK demodulator of the configuration shown in FIG. 3, a form of occurrence of static birefringence is very complicated due to the fact that the circuit is asymmetrical in its overall configuration in itself. In addition, the elimination of the polarization dependence resulting from a dynamic birefringence variation, also inclusive of the driving time of the variable phase adjuster, is more difficult because of the asymmetric circuit configuration.

Description has previously been given of the problem of the PDf caused by the birefringence in the waveguide-type optical circuit. However, the PDf (or the polarization dependence) of the optical delay line interferometer likewise suffers degradation from polarization coupling of the waveguide, besides the birefringence. The polarization coupling refers to a phenomenon in which the exchange of energy between the orthogonal polarization states of light takes place and thus produces light in a different state of polarization from the state of polarization of the propagating light. The light produced by the polarization coupling will be hereinafter called particularly "polarization coupling-induced light."

To be more specific about the polarization coupling, in the absence of the polarization coupling in the waveguide on the occasion of entry of light of the TE polarization into the waveguide, the light of the TE polarization alone goes out as output light. In the presence of the polarization coupling, however, light of the TM polarization, orthogonal polarization for the TE polarization, is produced in the waveguide as polarization coupling-induced light, so that the state of polarization of light outputted from the waveguide is in the form of a superposition of both the TE and TM polarizations. This phenomenon is the polarization coupling.

In the presence of the polarization coupling in the waveguide, the polarization coupling-induced light produced by the polarization coupling causes a change in the state of interference of light in the circuit, which in turn leads to a change in a transmission waveform of the optical signal. Due to the fact that the amount of change in the state of interference depends on the state of polarization of the input optical signal, the polarization dependence develops in transmission characteristics (or loss characteristics) of the interferometer. In other words, the PDf caused by the polarization coupling occurs, as in the case of the PDf caused by the birefringence shown in FIG. 5.

The polarization coupling often occurs in locations where there is a change in the waveguide pattern or locations where the waveguide is subjected to stress, such as a curve, a divider and a combiner of the waveguide, a portion of the waveguide in which the heater or the like is disposed, and a portion of the waveguide in which the groove or the like is formed. The complete suppression of the occurrence of the polarization coupling in these locations is very difficult. Therefore, the PDf caused by the polarization coupling has been a problem, as is the case with the PDf caused by the birefringence.

In the optical delay line interferometer of simple configuration shown in FIG. 1, the temperature dependence of the transmission wavelength $\lambda_0$ of the Mach-Zehnder interferometer that forms the optical delay line interferometer can be eliminated by the installation of the groove 14 in the long arm waveguide 4, as described in Conventional art 4. Suppose a case where the groove 14 is formed in the Mach-Zehnder interferometer and is filled with the temperature compensation material. When the temperature of the optical delay line interferometer undergoes a change $\Delta T$, a change $\Delta \lambda_0$ in the transmission wavelength of the Mach-Zehnder interferometer is expressed by the following equation:

$$\Delta \lambda_0 = ((\Delta L - W) \times dn/dT + W \times dn'/dT) \times \Delta T / k \quad \text{Equation (2)}$$

where W denotes the total sum of the widths w of the grooves into which the groove 14 is divided as shown in FIG. 4B. In order to eliminate the temperature dependence of the Mach-Zehnder interferometer, W may be set so that $((\Delta L - W) \times dn/dT + W \times dn'/dT) = 0$. However, in a process for forming the groove 14, that is, a fabrication process for the optical delay line interferometer, a fabrication error occurs in the groove width w in a process for partly removing the cladding and the core after deposition of the overcladding layer. If the fabrication error occurs in the groove width w, a mismatch in the amount of compensation for the temperature dependence occurs between different Mach-Zehnder interferometers. Specifically, the DQPSK demodulator of the configuration shown in the conventional art 2 or a DPSK demodulator for further-multilevel modulation has difficulty in reducing, by the same amount, the temperature dependence of the transmission wavelength $\lambda_0$ of all Mach-Zehnder interferometers, even if the groove 14 is disposed in the Mach-Zehnder interferometer.

Further detailed description will be given of causes of deterioration in reception characteristics of the DPSK demodulator for multilevel phase modulation, the deterioration occurring when the temperature dependence of $\lambda_0$ of each Mach-Zehnder interferometer is not reduced by the same amount, taking the DQPSK demodulator of conventional art 2 as a specific example.

FIG. 6A shows transmission spectrum of optical signals outputted from output waveguides of two Mach-Zehnder interferometers. In other words, the transmission spectrum of the optical signals outputted from the output waveguides 6a, 7a, 6b and 7b in FIG. 2 is shown on one graph. The DQPSK demodulator requires that the phases of the transmission spectrum of the Mach-Zehnder interferometers that demodulate the I signal and the Q signal, respectively, have a phase difference of $\pi/2$ between each other. As the phase difference between the transmission spectrums of the Mach-Zehnder interferometers is offset from $\pi/2$, the reception sensitivity of the demodulator deteriorates.

FIG. 6B shows transmission spectrum in a case where the temperature undergoes the $\Delta T$ change when the grooves 14 in the two Mach-Zehnder interferometers are formed without fabrication error. In other words, there is a match in the amount of compensation for the temperature dependence of the two Mach-Zehnder interferometers. Since the temperature dependence of each Mach-Zehnder interferometer is eliminated, the transmission spectrum does not change, the orthogonality of the phase difference between the transmission spectrums of the Mach-Zehnder interferometers is maintained, and the deterioration in the reception sensitivity of the demodulator does not occur.

FIG. 6C shows transmission spectrum in a case where the temperature undergoes the $\Delta T$ change when the grooves 14 in the two Mach-Zehnder interferometers have fabrication error but has the same fabrication error. Although the temperature dependence of each Mach-Zehnder interferometer is not completely eliminated, the temperature dependence is reduced by the same amount. Thus, each transmission spectrum shifts along the wavelength axis, but the phase difference between the transmission spectrums is held at $\pi/2$. Therefore, in this instance, the cause of the deterioration in the reception characteristics of the demodulator is only an offset between wavelengths $\lambda s$ and $\lambda c$ of the optical signal. The variable phase adjuster, added to the long arm waveguides 4a and 4b or the short arm waveguides 5a and 5b, enables easily the wavelengths $\lambda s$ and $\lambda c$ to coincidence with each other.

FIG. 6D shows transmission spectrum in a case where the temperature undergoes the $\Delta T$ change when the grooves 14 in the two Mach-Zehnder interferometers are formed with different fabrication errors. Since the amounts of shift of the transmission spectrums are different, the phase difference between the transmission spectrums is offset from $\pi/2$. In this instance, the cause of the deterioration in the reception characteristics of the demodulator is the offset between wavelengths $\lambda s$ and $\lambda c$ of the optical signal, and an error in the orthogonality of the phase difference between the transmission spectrums of the Mach-Zehnder interferometers.

In order to improve the reception sensitivity of the demodulator, it is required that the phase difference between the transmission spectrums of the Mach-Zehnder interferometers be adjusted to $\pi/2$, and that $\lambda s$ and $\lambda c$ be brought into coincidence with each other. Therefore, it is required that the variable phase adjuster, added to the long arm waveguides 4a and 4b or the short arm waveguides 5a and 5b, be operated with different amounts of adjustment. Thus, a problem arises: a control mechanism for maintaining the reception sensitivity of the demodulator at the maximum becomes complicated.

For the above-mentioned reason, it is preferable that as for the fabrication error in the groove width w inevitable in the fabrication process for the groove 14 in the optical delay line interferometer, the same fabrication error occurs in all Mach-Zehnder interferometers. In other words, it is desired that the fabrication error in the groove width w be uniform in the optical delay line interferometer. However, the circuit scale of the DQPSK demodulator shown in the conventional art 2 is such that the two grooves 14 are spaced from each other, and thus, it is difficult to keep the uniformity in the fabrication error. In the binary or otherwise multileveled DPSK demodulator, the required number of Mach-Zehnder interferometers increases, and the area of the optical delay line interferometer can possibly increase. Thus, multiple grooves 14 are further spaced from each other, and thus, it is more difficult to ensure the uniformity in the fabrication error of the groove width w.

On the other hand, the DQPSK demodulator shown in the conventional art 3 uses one Mach-Zehnder interferometer alone, and thus, the groove 14 may be formed in one location. The uniformity in the fabrication error of the groove width w presents no problem, as distinct from the configuration of the conventional art 2 in which the grooves 14 are formed in two locations. However, as mentioned above, the configuration of conventional art 3 has difficulty in eliminating the polarization dependence of the optical delay line interferometer.

Further, the demodulator for multilevel phase modulation also has a problem as viewed from another aspect. In the demodulator for multilevel phase modulation, the intensity of the optical signal outputted from each output waveguide is subjected to balanced detection by the photodetector. However, if a difference in excess loss occurs between these output waveguides, the degradation of the S/N ratio of the demodulated signal occurs. As employed herein, the excess loss refers to the loss caused by circuit incompleteness or the like, based on inevitable principle loss determined by a demodulator method or configuration.

Referring to FIG. 7, the occurrence of the excess loss corresponds to the value of an envelope of a loss spectrum between the input waveguide and the output waveguide. A situation where the excess losses vary from one to another of the output waveguides of the demodulator is called the occurrence of the difference in excess loss. In the demodulation of the multileveled modulated signal, the difference in excess loss between the output waveguides causes a great deterioration in the S/N ratio of the demodulated signal.

Further, the optical delay line interferometer has the problem of the occurrence of the polarization mode dispersion due to the birefringence. The polarization mode dispersion causes a considerable deterioration in the S/N ratio of the demodulated signal at the demodulation of the DPSK optical signal, as in the case of the above-mentioned PDf.

The present invention has been made in view of the foregoing problems, and an object of the present invention is to eliminate the polarization dependence of the optical delay line interferometer, resulting from the birefringence and the polarization coupling. The present invention proposes a circuit configuration suitable for making polarization-independent the optical delay line interferometer in which the polarization converter is disposed. Another object of the present invention is to provide an optical delay line interferometer in which the polarization dependence of optical characteristics is small and further, the temperature dependence of the optical characteristics is small. The present invention proposes a circuit configuration suitable for eliminating both the polarization dependence and the temperature dependence of the optical delay line interferometer. Further proposed is the configuration of the demodulator formed by the optical delay line interferometer, in which the S/N ratio of the demodulated signal is improved.

An optical delay line interferometer of the present invention is characterized by comprising: an optical splitter that divides an input modulated optical signal into two optical signals; a first optical divider and a second optical divider that receive, respectively, one of the two optical signals divided by the optical splitter, and that each output N divided output lights; N short arm waveguides connected to the first optical divider, and configured to propagate N first divided output lights from the first optical divider therethrough, respectively; N long arm waveguides connected to the second optical divider, and configured to propagate N second divided output lights from the second optical divider therethrough, respectively; N optical combiners that combine one of the N first divided output lights propagating through the N short arm waveguides, with one of the N second divided output lights propagating through the N long arm waveguides and corresponding to the one of the N first divided output lights, thereby to cause interference of the one first divided output light and the one second divided output light, the optical combiners each outputting two interfering output lights, the optical combiners forming N interferometers corresponding to the N optical combiners, respectively; N pairs of output waveguides connected to the N optical combiners, respectively, each of the N pairs of the output waveguides being configured to propagate the corresponding two interfering output lights and including a first output waveguide and a second output waveguide; a polarization converter disposed across the N short arm waveguides and the N long arm waveguides, the polarization converter being placed in such a location that a difference between an integral value of birefringence of a path from the optical splitter to the polarization converter on each of the short arm waveguides and an integral value of birefringence of a path from the optical splitter to the polarization converter on the corresponding one of the long arm waveguides is half of a difference between an integral value of birefringence of an entire path from the optical splitter via the short arm waveguide to the corresponding one of the optical combiners and an integral value of birefringence of an entire path from the optical splitter via the long arm waveguide to the corresponding one of the optical combiner, the polarization converter performing conversion from one to another of TE and TM polarizations; two optical delay lines disposed on both sides of the polarization converter of the long arm waveguides, the two optical delay lines each producing a corresponding delay time between the entire paths from the optical splitter via the long arm waveguides to the optical combiners and the entire paths from the optical splitter via the short arm waveguides to the optical combiners, the corresponding delay time being equivalent to a time of 0.5 symbols of the input modulated optical signal; and a pair of phase shifters disposed on both sides of the polarization converter, respectively, in at least either the short arm waveguides or the long arm waveguides, the pair of phase shifters having the same phase shift elements before and after the polarization converter, the pair of the phase shifters being configured so that optical path length differences of the N interferometers each has a phase difference of $\pi/N$ at a carrier optical frequency of the input modulated optical signal, and that the optical path length difference of the N interferometers taken as a whole has a phase difference of $\pi(N-1)/N$.

Preferably, circuit components of the N short arm waveguides, the N long arm waveguides, the two optical delay lines and the pair of the phase shifters may be formed axisymmetrically about an imaginary symmetric axis and, given that $B_w$ represents the birefringence of the waveguide; $Lb=\lambda/B_w$ represents a beat length; and m represents an integer of 0 or more, the polarization converter, if being the half-wave plate, may be disposed away from the imaginary symmetric axis by $(Lb/4 \times m)$ where m is an odd number, or the polarization converter, if being any one of the 90° polarization rotator and the −90° polarization rotator, may be disposed away from the imaginary symmetric axis by $(Lb/4 \times m)$ where m is an even number.

Further, the optical delay line interferometer may further includes grooves each formed in line by removing a portion of a cladding and a portion of a core that form each of at least either the N long arm waveguides or the N short arm waveguides, while extending across the at least either the N long arm waveguides or the N short arm waveguides, the grooves being filled with a material having a different coefficient of refractive index dependence on temperature from a coefficient of effective refractive index dependence on temperature of the waveguides, thereby to compensate for a variation in loss spectrum in a wavelength axis due to a change in temperature of the N interferometers.

In addition, the optical delay line interferometer may further include variable phase adjusters for the effective refractive index of the waveguides, provided at least either in the long arm waveguides or in the short arm waveguides. The variable phase adjusters can compensate for the remainder of compensation for a variation in transmission wavelength, provided by the groove.

Preferably, each of the polarization converters is any one of a 90° polarization rotator, a −90° polarization rotator, and a half-wave plate.

According to another aspect of the present invention, the optical delay line interferometer may further comprise variable phase adjusters that adjust the delay time or the amount of phase provided by the phase shift element, the variable phase adjusters being disposed, on both sides of the polarization converter, respectively, in at least either the short arm waveguides or the long arm waveguides, so that the amount of adjustment of the delay time or the amount of phase by the variable phase adjuster on one side of the polarization converter can be equal to the amount of adjustment by the variable phase adjuster on the other side.

Each of the variable phase adjuster may be a heater formed on the long arm waveguides or on the short arm waveguides.

Preferably, given that B denotes the integral value of the birefringence of each of entire paths from the optical splitter via the short arm waveguides to the optical combiners, circuit components of the two optical delay lines, the pair of the phase shifters, and the variable phase adjusters may be formed axisymmetrically about an imaginary symmetric axis that is perpendicular to all arm waveguides, and that contains points on the short arm waveguides where an integral value of the birefringence from the optical splitter is B/2, and given that $B_w$ represents the birefringence of the waveguide; $Lb=\lambda/B_w$ represents a beat length; and m represents an integer of 0 or more, the polarization converter, if being the half-wave plate, may be disposed away from the imaginary symmetric axis by (Lb/4×m) where m is an odd number, or the polarization converter, if being any one of the 90° polarization rotator and the −90° polarization rotator, may be disposed away from the imaginary symmetric axis by (Lb/4×m) where m is an even number.

According to still another aspect of the present invention, the optical delay line interferometer may further comprise a skew adjuster that adjusts an arrival time for the two interfering output lights outputted from any one of the N pairs of the output waveguides. Preferably, the skew adjuster may be disposed, on both sides of the polarization converter, respectively, in at least either the short arm waveguides or the long arm waveguides, or is disposed in at least one pair of the N pairs of the output waveguides.

Further, in the optical delay line interferometer according to another embodiment of the present invention, given that B denotes the integral value of the birefringence of each of entire paths from the optical splitter via the short arm waveguides to the optical combiners, corresponding circuit components located between the optical splitter and the N optical combiners and configured on both sides of the polarization converter with the polarization converter in between, other than the polarization converter may be formed axisymmetrically about an imaginary symmetric axis that is perpendicular to all arm waveguides, and that contains points on the short arm waveguides where an integral value of the birefringence from the optical splitter is B/2, and given that $B_w$ represents the birefringence of the waveguide; $Lb=\lambda/B_w$ represents a beat length; and m represents an integer of 0 or more, the polarization converter, if being the half-wave plate, may be disposed away from the imaginary symmetric axis by (Lb/4×m) where m is an odd number, or the polarization converter, if being any one of the 90° polarization rotator and the −90° polarization rotator, may be disposed away from the imaginary symmetric axis by (Lb/4×m) where m is an even number.

More preferably, each of the first optical divider and the second optical divider, which outputs the N divided output lights, can use any one of an MMI coupler having one input and N outputs, and an S-cascaded optical Y-branch splitters each having one input and two outputs, provided that s satisfying $N=2^s$ is a natural number.

Further, preferably, directional couplers are used as the optical splitter and the N optical combiners.

According to the present invention, the polarization dependence of the optical delay line interferometer, resulting from the birefringence and the polarization coupling, can be eliminated. Provided is the circuit configuration suitable for making polarization-independent the optical delay line interferometer in which the polarization converter is disposed. Provided is the demodulator formed by the optical delay line interferometer, in which the S/N ratio of the demodulated signal is improved. Further, according to the present invention, both the polarization dependence and the temperature dependence of the optical delay line interferometer can be reduced. The disposition of the polarization converter and the grove filled with the temperature compensation material makes it possible to provide the circuit configuration suitable for eliminating the polarization dependence and the temperature dependence of the optical delay line interferometer. Further, a circuit arrangement with high symmetry can be achieved, and the PDf resulting from the polarization coupling-induced light can be effectively eliminated.

BRIEF DESCRIPTION OF THE DRAWINGS

FIG. 5 is a graph explaining PDf that is an index indicative of polarization dependence of a Mach-Zehnder interferometer;

BEST MODE FOR CARRYING OUT THE INVENTION

The present invention provides a demodulator for a multilevel differential phase shift keyed signal, capable of eliminating polarization dependence due to birefringence and polarization coupling-induced light that are resulting from a waveguide structure, and polarization dependence due to dynamic birefringence produced during driving of a variable phase adjuster. The demodulation of the present invention is formed of an optical delay line interferometer of waveguide interference type.

Figure 8:
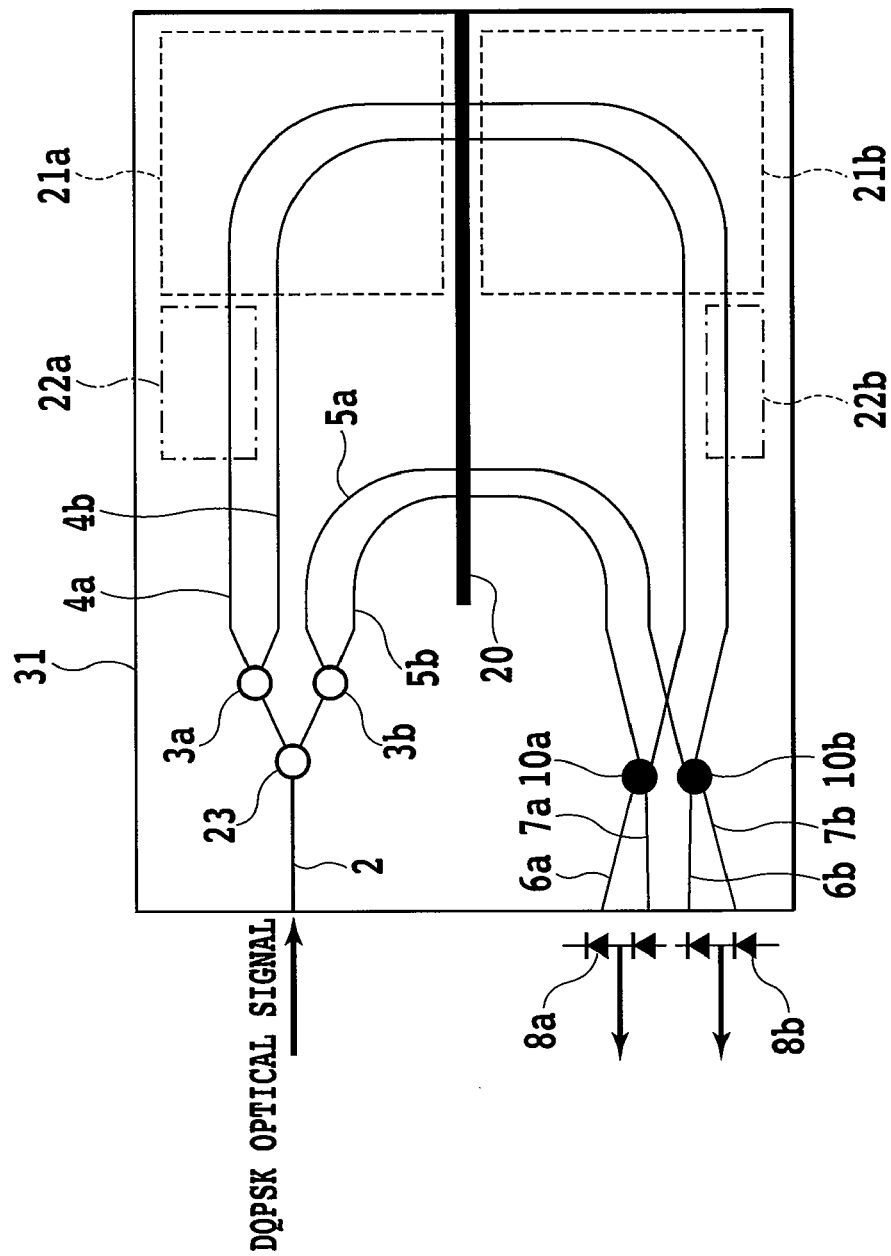
FIG. 8 is a diagram showing a demodulator for DQPSK, of the present invention.

FIG. 8 is a diagram showing a configuration of a demodulator for DQPSK (a four-level differential phase shift keyed signal) according to the present invention in which polarization dependence is eliminated. The demodulator taken as a whole is configured so that a DQPSK optical signal is inputted to an input waveguide 2 of an optical delay line interferometer 31 and a demodulated electric signal is outputted to differential PD pairs 8a and 8b.

The input DQPSK optical signal is divided into two signals by an optical splitter 23, and the divided optical signals are further divided by optical splitters 3a and 3b, respectively, in the second stage. The one optical splitter 3a is connected to two long arm waveguides 4a and 4b. The other optical splitter 3b is connected to two short arm waveguides 5a and 5b. The long arm waveguide 4b and the short arm waveguide 5b are connected to an optical coupler 10a. Likewise, the long arm waveguide 4a and the short arm waveguide 5a are connected to an optical coupler 10b. The optical coupler 10a is connected to two output waveguides 6a and 7a. Likewise, the optical coupler 10b is connected to two output waveguides 6b and 7b. Interfering light from the two output waveguides 6a and 7a are coupled to the differential PD pair 8a, and the two optical signals outputted from the PD pair 8a undergo balanced detection. The same holds for interfering light from the output waveguides 6b and 7b.

The demodulator 31 of the present invention further includes a polarization converter 20 between the group of the splitters 3a and 3b in the second stage and the group of the optical couplers 10a and 10b. The optical delay line that produces a time delay of one symbol is divided into two optical delay lines 21a and 21b, and a delay of 0.5 symbols each is divided before and after the polarization converter 20.

Likewise, the phase shifter that gives a phase of π/2 is divided into two phase shifters 22a and 22b, and a phase shift of π/4 each is divided before and after the polarization converter 20. Here, it is to be noted that the above-mentioned amount of phase shift is such that a phase of π/2 is given for a carrier light frequency of the input modulated optical signal.

The polarization converter is disposed in the following location. Here, a difference between the integral value of birefringence in each entire path from the optical splitter via the short arm waveguide to the corresponding optical coupling means and the integral value of birefringence in the corresponding one of the paths from the optical splitter via the long arm waveguide to the optical coupling means is denoted by ΔB. The entire path mentioned above refers to the entire path of each of the arm waveguides that form one interferometer. Therefore, for example in the configuration shown in FIG. 5, it is to be noted that the entire path is the entire waveguide path from the optical splitter 23 via the optical splitter 3a or 3b in the second stage to the optical couplers 10a or 10b.

The polarization converter 20 is installed in such a location that the difference between the integral value of birefringence in the path from the optical splitter to the polarization converter on each of the short arm waveguide and the integral value of birefringence in the path from the optical splitter to the polarization converter on each of the long arm waveguide is ΔB/2. Typically, this location is at a midpoint of each arm waveguide.

The midpoint is the point halfway along the overall length of each arm waveguide, as shown in FIG. 8. Typically, all waveguides are designed so as to keep birefringence constant, and thus, the polarization converter is installed at the midpoint of each arm waveguide thereby to satisfy the above-mentioned installation conditions of the polarization converter. However, the installed position that satisfies the installation conditions of the polarization converter is present besides the above-mentioned midpoint. This will be described in further detail in a third embodiment in which the polarization dependence resulting from the polarization coupling-induced light.

The polarization converter 20 mutually converts the TE polarization and the TM polarization. Specifically, the polarization converters include a 90° polarization rotator, a −90° polarization rotator, and a half-wave plate. Specifically, a polarization rotator that effects a 90° or −90° rotation of all states of polarization, or a 45° half-wave plate that symmetrically reverses the state of polarization can be disposed thereby to eliminate the polarization dependence of the optical delay line interferometer caused by the birefringence resulting from the structure of the waveguide.

It is to be noted that the above-mentioned two optical delay lines 21a and 21b can be achieved by a difference in length between the long arm waveguide and the short arm waveguide. In other words, the difference in length between the long arm waveguide and the short arm waveguide may be set to have a length equivalent to a time delay of one symbol in terms of the symbol of the modulated optical signal inputted to the demodulator. A delay of one symbol is divided by the two optical delay lines 21a and 21b to form a delay of 0.5 symbols each before and after the polarization converter 20.

The polarization dependence resulting from the dynamic birefringence produced at the time of driving of the variable phase adjuster can be eliminated in the same manner. The birefringence produced in the variable phase adjuster varies according to the amount of driving of the variable phase adjuster. For example, the birefringence changes dynamically according to heating power for the heater. Therefore, in order to reduce the dynamic birefringence produced by the variable phase adjuster, it is required that the variable phase adjusters be dividedly disposed before and after the polarization converter 20 and be driven so that the birefringence produced in the variable phase adjusters may become equal. The simplest method is to dividedly dispose the variable phase adjusters of the same configuration before and after the polarization converter 20 and further drive the variable phase adjusters by the same amount at all times.

If the heater is used to form the variable phase adjuster, heaters of the same length, width and resistance value can be disposed before and after the polarization converter 20, respectively, and be driven by the same power. Thereby, even if the birefringence is produced in the two variable phase adjusters, the birefringence is mutually canceled by the polarization converter 20, and thus, the polarization dependence of the interference characteristics does not develop in the optical delay line interferometer taken as a whole. The above-mentioned circuit configuration enables achieving both a reduction in circuit size and the elimination of the polarization dependence.

Description will now be given of the configuration of the demodulator for DQPSK, capable of further eliminating the polarization dependence.

Figure 9:
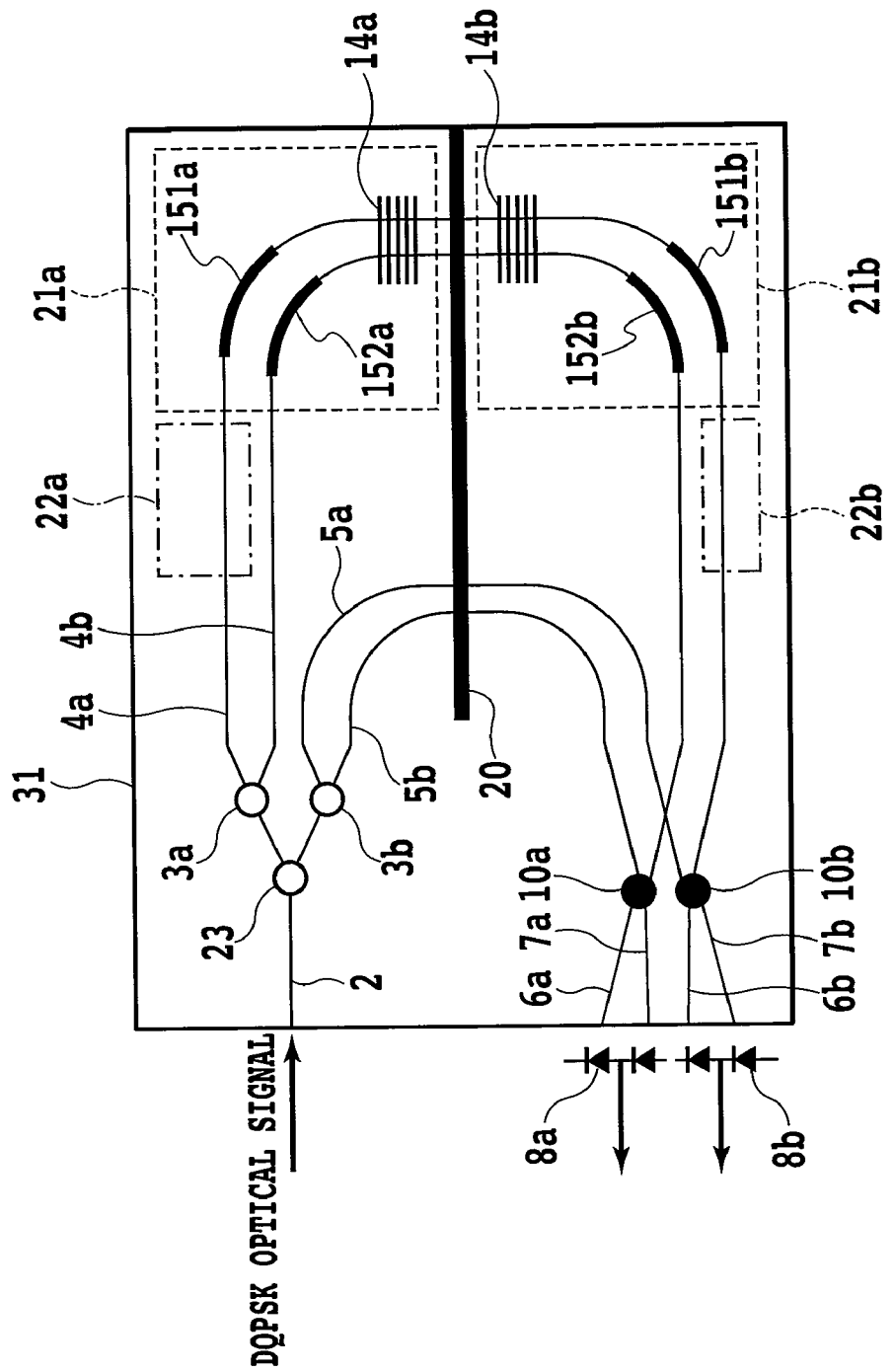
FIG. 9 is a diagram showing the demodulator for DQPSK, of the present invention, where the temperature dependence is eliminated.

FIG. 9 is a diagram showing the configuration of the demodulator for DQPSK, in which the polarization dependence is eliminated and further the temperature dependence is eliminated. The optical delay line interferometer 31 that forms the demodulator is configured so that a DQPSK optical signal is inputted to the input waveguide 2 and a demodulated signal is outputted from the pair of balanced PDs 8a and 8b. Since the demodulator for DQPSK has the same configuration as shown in FIG. 8, detailed description will be given below with regard to operation for eliminating the temperature dependence.

In the optical delay line interferometer of the demodulator shown in FIG. 9, the grooves 14a and 14b are formed in line extending across the long arm waveguides 4a and 4b, and the grooves are filled with the temperature compensation material. In FIG. 9, the grooves 14a and 14b filled with the temperature compensation material are shown as being disposed in two locations; however, the present invention is not limited to this disposition, and one or more grooves extending across the long arm waveguides 4a and 4b may be formed in one or more locations. However, if the birefringence is produced in the formed groove, it is necessary to eliminate the above-mentioned polarization dependence. In order to eliminate the polarization dependence, it is required that two or more grooves be formed in an even number of locations and be disposed symmetrically about the polarization converter 20. Preferably, the groove width w of the grooves 14a and 14b, the number of grooves, and the interval between the grooves are of the same designed value from the viewpoint of suppression of the polarization coupling-induced light that can possibly be produced in the groove portion.

If the groove width of the grooves 14a and 14b disposed for the purpose of eliminating the temperature dependence is fabricated as designed without being affected by the influence of the fabrication error, the optimum operating wavelength λc of the optical delay line interferometer can be merely adjusted so as to coincide with a wavelength λs at a given temperature. After this adjustment, even if the temperature of the optical delay line interferometer changes, λc and λs coincide with each other at all times, and further, the orthogonality of the transmission spectrum of the optical delay line interferometer is held, and the reception sensitivity of the demodulator does not deteriorate. In other words, the temperature dependence of the optical properties of the optical delay line interferometer resulting from the temperature dependence of the effective refractive index of the waveguide can be eliminated.

Description will now be given of a method for eliminating the temperature dependence when the groove width w is affected by the influence of the fabrication error. When the symmetric Mach-Zehnder interferometer is configured apart as disclosed in the conventional art 2, and if the width w of the groove extending across each long arm waveguide is affected by the influence of the fabrication error, the optimum operating wavelength λc of the optical delay line interferometer is offset from the wavelength λs of the optical signal as the temperature changes. However, the use of the configuration of the present invention enables the disposition of the long arm waveguides 4a and 4b in the close proximity to each other. Therefore, if the fabrication error in the groove width w occurs, although λc is offset from the wavelength λs of the optical signal as the temperature changes, the orthogonality of the transmission spectrum of each optical delay line interferometer is held at all times. Thus, the elimination of the temperature dependence of the optical properties of the optical delay line interferometer can be accomplished only by adding a mechanism for compensating for the deviation of λc and λs from each other.

Description will now be given of an adjustment mechanism for effecting coincidence of λc and λs when the width w of the groove is offset from the designed value by being affected by the influence of the fabrication error. Adjusters 151a, 152a, 151a and 152b for the effective refractive index of the waveguides are disposed in the long arm waveguides 4a and 4b. The adjusters for the effective refractive index of the waveguides include a heater formed on the waveguide, for example. Application of a voltage for heating the core of the waveguide can cause a change in the effective refractive index of the waveguide. In FIG. 9, the adjusters 151a, 151b for the effective refractive index are shown as disposed in two locations in the long arm waveguide 4a, and the adjusters 152a, 152b for the effective refractive index are shown as disposed in two locations in the long arm waveguide 4b; however, the present invention is not limited to this disposition. Specifically, one or more adjusters for the effective refractive index may be disposed in one or more locations in each of the long arm waveguides 4a and 4b.

However, if the birefringence for the propagating light occurs in the adjuster for the effective refractive index, the polarization dependence caused by the polarization coupling-induced light must be eliminated. In order to eliminate the polarization dependence, two or more adjusters for the effective refractive index must be disposed in two or more, even-numbered locations and also be disposed symmetrically about the polarization converter 20. In addition, in the adjusters for the effective refractive index located before and after the polarization converter 20, the adjusters for the effective refractive index must be operated so that the amount of adjustment of the effective refractive index is symmetric.

The adjusters 151a, 152a, 151b and 152b for the effective refractive index are configured and operated so as to satisfy the above-mentioned conditions, and thereby, the optimum operating wavelength λc of the optical delay line interferometer can be controlled. Even if the width w of the fabricated groove is offset from the designed value due to the fabrication error, λc can be brought into coincidence with the wavelength λs of the optical signal. In other words, the remainder of a variation in the transmission wavelength that cannot be eliminated by only the temperature compensation by the temperature compensation material filled into the groove can be compensated for.

Figure 10:
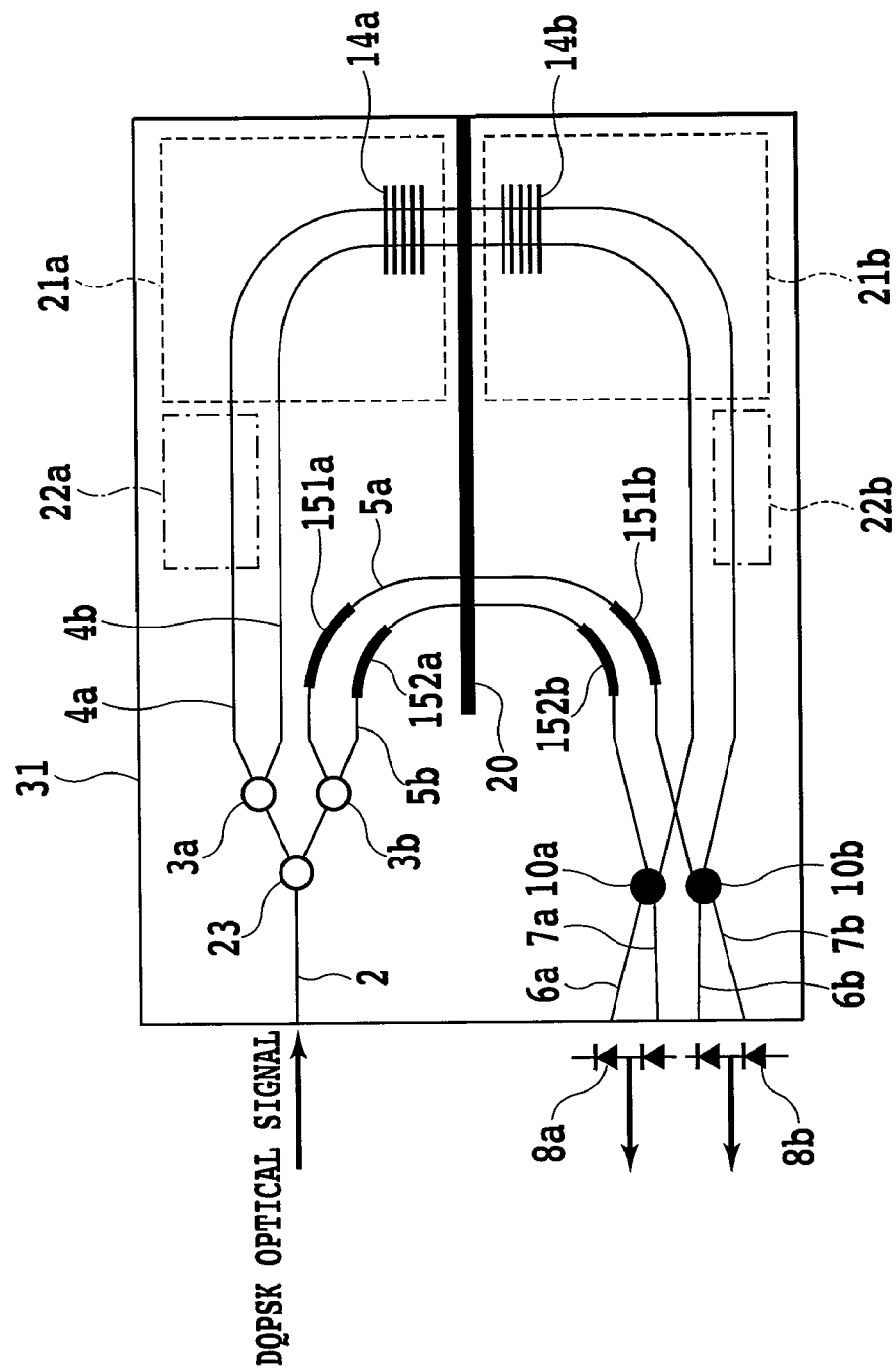
FIG. 10 is a diagram showing another example of the configuration of the demodulator for DQPSK of the present invention.

FIG. 10 is a diagram showing another example of a configuration of the DQPSK demodulator according to the present invention. In FIG. 10, there is shown the configuration in which the adjusters 151a and 151b for the effective refractive index are disposed on the short arm waveguide 5a, and the adjusters 152a and 152b for the effective refractive index are disposed on the short arm waveguide 5b. The above-mentioned effect of elimination of the temperature dependence can be achieved, even in this configuration in which, in the Mach-Zehnder interferometer, the adjusters for the effective refractive index are formed on the short arm waveguides 5a and 5b in which the groove is not formed.

Figure 11:
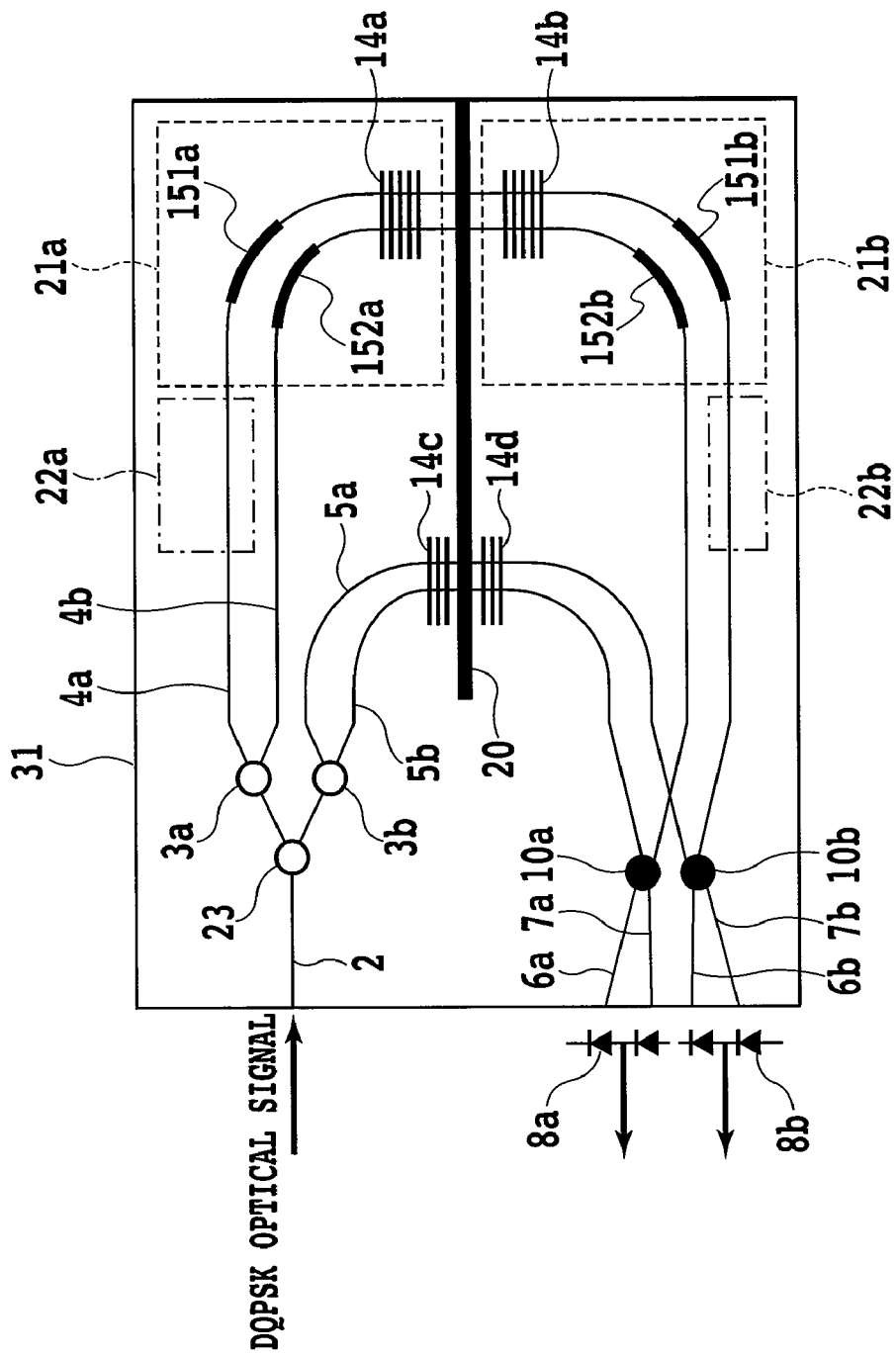
FIG. 11 is a diagram showing still another example of the configuration of the demodulator for DQPSK of the present invention.

FIG. 11 is a diagram showing still another example of a configuration of the DQPSK demodulator according to the present invention. In FIG. 11, there is shown the configuration in which the grooves 14c and 14d are disposed in such a manner as to extend across the short arm waveguides 5a and 5b. In this configuration, a difference between the total sum of the groove widths of the grooves 14a and 14b formed in the long arm waveguides 4a and 4b and the total sum of the groove widths of the grooves 14c and 14d formed in the short arm waveguides 5a and 5b can be set so as to be equal to W that satisfies $((\Delta L-W) \times dn/dT + W \times dn'/dT) = 0$ in Equation (2), thereby to eliminate the temperature dependence of the optical properties of the optical delay line interferometer.

In the configuration shown in FIG. 11, even if the groove widths w of the grooves 14a, 14b, 14c and 14d are affected by the influence of the fabrication error, that is, even if the total sum of the groove widths of the grooves 14a and 14b and the total sum of the groove widths of the grooves 14c and 14d are offset from the designed values, if the fabrication errors in the grooves 14a and 14b are identical and the fabrication errors in the grooves 14c and 14d are identical, the difference is kept constant at all times, and the elimination of the temperature dependence can be achieved as designed. If the fabrication errors in the grooves 14a and 14b are different and the fabrication errors in the grooves 14c and 14d are different, the above-mentioned adjusters 151a, 152a, 151b and 152b for the effective refractive index can be operated thereby to eliminate the temperature dependence of the optical properties of the optical delay line interferometer.

When the configuration in which the heater is disposed on the waveguide is adopted in the above-mentioned adjuster for the effective refractive index, the approach of forming a groove by removing the cladding on the periphery of the waveguide along the waveguide having the heater loaded thereon is known as a method for improving heating efficiency of the core portion of the waveguide (hereinafter, the groove formed for the purpose of improving the efficiency of heating by the heater will be referred to as a "heat insulating groove.") In the optical delay line interferometer for the DQPSK demodulator according to the present invention, even if the heat insulating groove is formed in the circuit, the effects of the present invention, that is, the elimination of the polarization dependence and the elimination of the temperature dependence are not lost. Of course, the effect of improving the efficiency of heating by the heater, using the heat insulating groove, can be also achieved. The groove 14 and the heat insulating groove formed for the purpose of eliminating the temperature dependence can be formed by the same process step in the present invention. Thus, to add the heat insulating groove to the optical delay line interferometer, the groove 14 and the heat insulating groove formed for the purpose of eliminating the temperature dependence can be formed at the same time thereby to achieve simplification of the fabrication process step for the circuit. Specifically, a photomask having formed therein both a mask pattern of the groove 14 to be formed for the purpose of eliminating the temperature dependence, and a mask pattern of the heat insulating groove can be used thereby to achieve the process step for forming both the grooves at the same time.

Although description has previously been given of the optical delay line interferometer for the DQPSK demodulator, description will now be given of the configuration of the optical delay line interferometer for a multilevel differential phase shift keyed signal.

Figure 12:
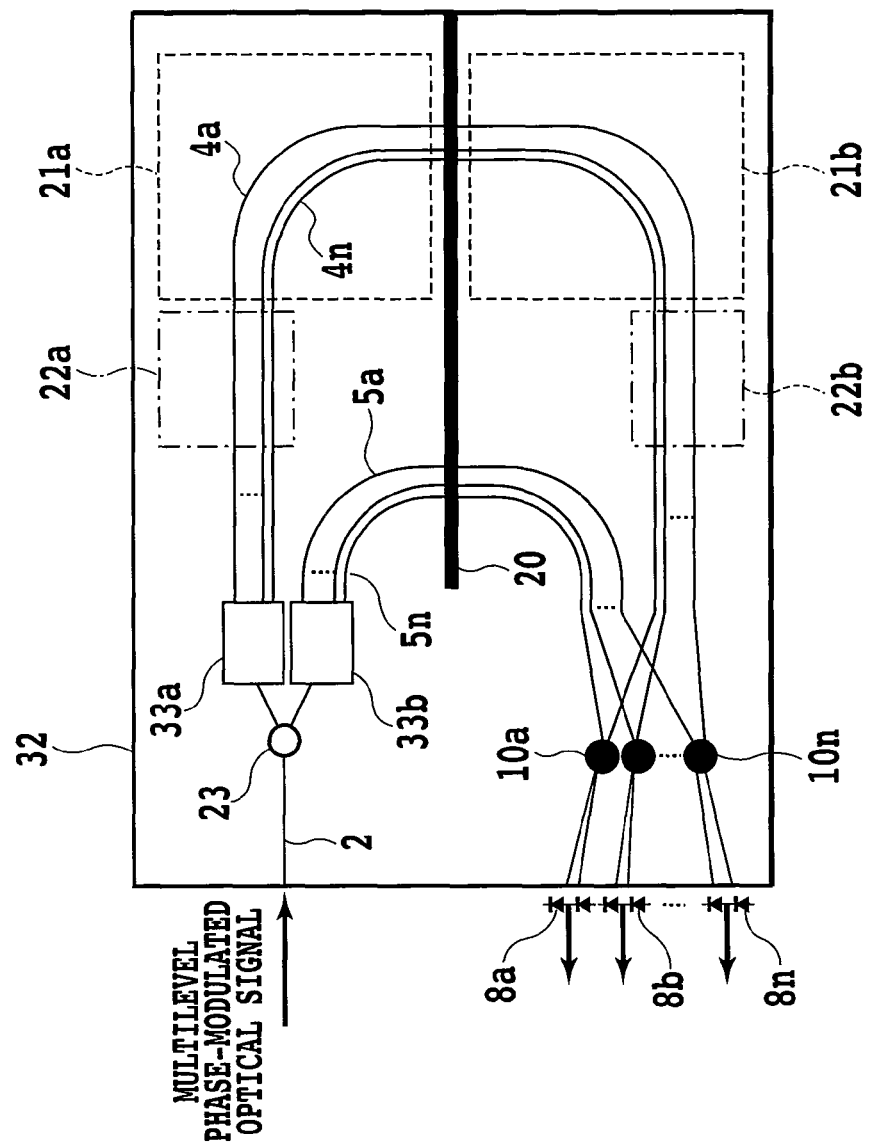
FIG. 12 is a diagram showing a demodulator for a multi-level differential phase shift keyed signal of the present invention.

FIG. 12 is a diagram showing the configuration of the optical delay line interferometer for a multilevel differential phase shift keyed signal, in which the polarization dependence is eliminated. In FIG. 8, the DQPSK demodulator is taken as an example for the sake of explanation; however, the circuit configuration of the present invention may be applied to a demodulator for a multilevel differential phase shift keyed signal with four or more levels. A demodulator 32 for the multilevel differential phase shift keyed signal with four or more levels is different from the configuration shown in FIG. 8, in that the optical splitters 3a and 3b are replaced by (1×N) splitters 33a and 33b, and N long arm waveguides 4a, ..., 4n, N short arm waveguides 5a, ..., 5n, and N optical couplers 10a, ..., 10n are provided. An input optical signal is converted to multilevel DPSK optical signals, and demodulated signals exit from N balanced PD pairs 8a, ..., 8n. The demodulator 32 has the same the configuration as shown in FIG. 8, in that the optical delay lines 21a and 21b and the phase shifters 22a and 22b are dividedly disposed before and after the polarization converter 20.

As generally known, in the demodulator for the multilevel differential phase shift keyed signal, N Mach-Zehnder interferometers are configured corresponding to the N optical couplers, respectively. In the phase shifters, phase differences of 0°, 180/N°, 2*180/N°, 3*180/N°, are given to the N Mach-Zehnder interferometers, respectively. In other words, the configuration may be such that the phase difference due to the optical path length difference of the N Mach-Zehnder interferometers is equal to a constant.

The optical delay line interferometer of N=1 is used for the modulator for a differential binary phase shift keyed signal, or the optical delay line interferometer of N=2 is used for the modulator for a differential quadrature phase shift keyed signal, and in this manner, the optical delay line interferometer formed of N Mach-Zehnder interferometers can be used for a 2×N-level differential phase shift keyed signal, in general. However, the optical delay line interferometer formed of two Mach-Zehnder interferometers may be used as the optical delay line interferometer for a multilevel differential phase shift keyed signal with six or more levels, and the value of N representing the number of Mach-Zehnder interferometers depends on the design of a transmission system. A method for giving a phase difference to each Mach-Zehnder interferometer is not limited, and a phase difference of a given value between adjacent long arm waveguides may be given, for example focusing on the long arm waveguide. Likewise, a phase difference of a given value between adjacent short arm waveguides may be given.

Specifically, using one long arm waveguide as the reference of phase shift, the remaining (N−1) long arm waveguides may be provided with phase shift elements of different amounts of phase shift, respectively. It is to be noted that the phase difference between the long arm waveguides is relative. Likewise, the phase difference may be given to the short arm waveguide as mentioned above. Meanwhile, anything may be used as the optical splitters 23, 33a and 33b, provided that they have the function of dividing light into two or more signals. Therefore, it goes without saying that the optical splitter is not limited to being in a 1-input 2-output form or 1-input N-output form, and a directional coupler in a 2-input 2-output form, a multimode interference coupler (MMI coupler), or the like may be utilized.

Description will now be given of the demodulator for the multilevel differential phase shift keyed signal, having the configuration shown in FIG. 12, in which the temperature dependence is further eliminated. By the configuration including the groove in the same manner as described with reference to FIG. 9, the circuit is made temperature-independent.

Figure 13:
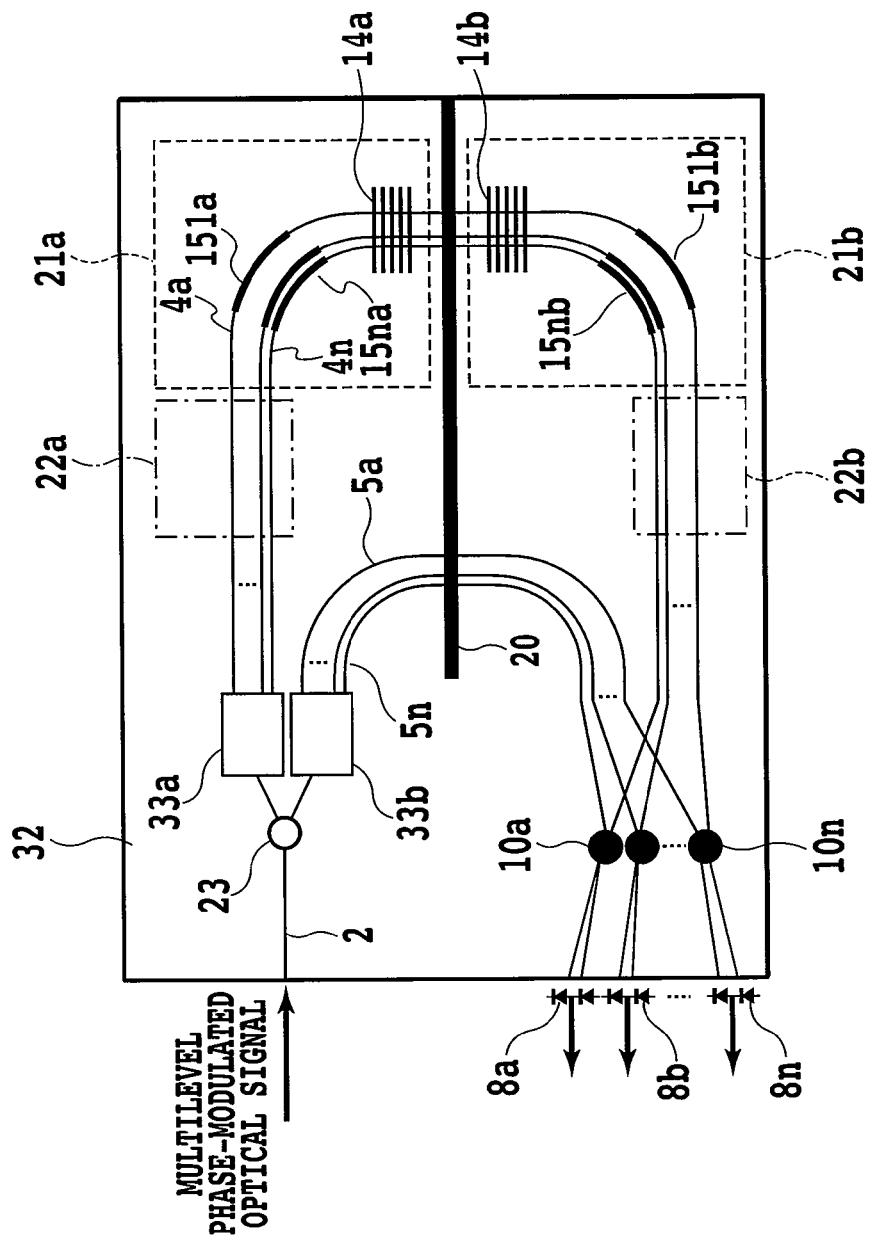
FIG. 13 is a diagram showing the demodulator for the multilevel differential phase shift keyed signal, where the temperature dependence is eliminated.

FIG. 13 is a diagram showing the configuration of the demodulator for the multilevel differential phase shift keyed signal, in which the polarization dependence is eliminated and further the temperature dependence is eliminated. Although description has been given with reference to FIG. 9 taking the DQPSK demodulator as an example, the above-mentioned circuit configuration of the present invention may be applied to the multilevel demodulator with four or more levels. The optical delay line interferometer 32 that forms the demodulator for the multilevel differential phase shift keyed signal is different from the configuration shown in FIG. 9, in that the optical splitters 3a and 3b shown in FIG. 9 are replaced by the (1×N) optical splitters 33a and 33b, and the N long arm waveguides 4a, 4n, the N short arm waveguides 5a, ..., 5n, and the N optical couplers 10a, ..., 10n, the grooves 14a and 14b extending across the N long arm waveguides 4a, ..., 4n, and the adjusters 151a, ..., 15na and 151b, ..., 15nb for the effective refractive index provided for the purpose of eliminating the temperature dependence are provided. An input optical signal is converted to multilevel DPSK signals, and demodulated signals exits from N balanced PD pairs 8a, ..., 8n. The optical delay line interferometer 32 has the same configuration as shown in FIG. 9, in that the optical delay lines 21a and 21b and the phase shifters 22a and 22b are dividedly disposed before and after the polarization converter 20.

As generally known, in the demodulator for the multilevel differential phase shift keyed signal, N Mach-Zehnder interferometers are configured corresponding to the N optical couplers, respectively. In the phase shifters, phase differences of 0°, 180/N°, 2*180/N°, 3*180/N°, ... are given to the N Mach-Zehnder interferometers, respectively. In other words, the configuration may be such that the phase difference due to the optical path length difference of the N Mach-Zehnder interferometers is equal to a constant. A method for giving a phase difference to each Mach-Zehnder interferometer is not limited to the configuration shown in FIG. 13, and a phase difference of a given value between adjacent long arm waveguides may be given, for example focusing on the long arm waveguides. Likewise, a phase difference of a given value between adjacent short arm waveguides may be given.

Specifically, using one long arm waveguide as the reference of phase shift, the remaining (N−1) long arm waveguides may be provided with phase shift elements of different amounts of phase shift, respectively. It is to be noted that the phase difference between the long arm waveguides is relative. Likewise, the phase difference may be given to the short arm waveguide as mentioned above. Meanwhile, anything may be used as the optical splitters 23, 33a and 33b, provided that they have the function of dividing light into two or more signals. Therefore, it goes without saying that the optical splitter is not limited to being in a 1-input 2-output form or 1-input N-output form, and a directional coupler in a 2-input 2-output form, a multimode interference coupler (MMI coupler), or the like may be utilized.

Description will now be given of the performance of the optical delay line interferometer fabricated by the actual application of PLC technology. Referring to a first embodiment, description will be given of details of the optical delay line interferometer in which both the polarization dependence and the temperature dependence are eliminated.

First Embodiment

Figure 14:
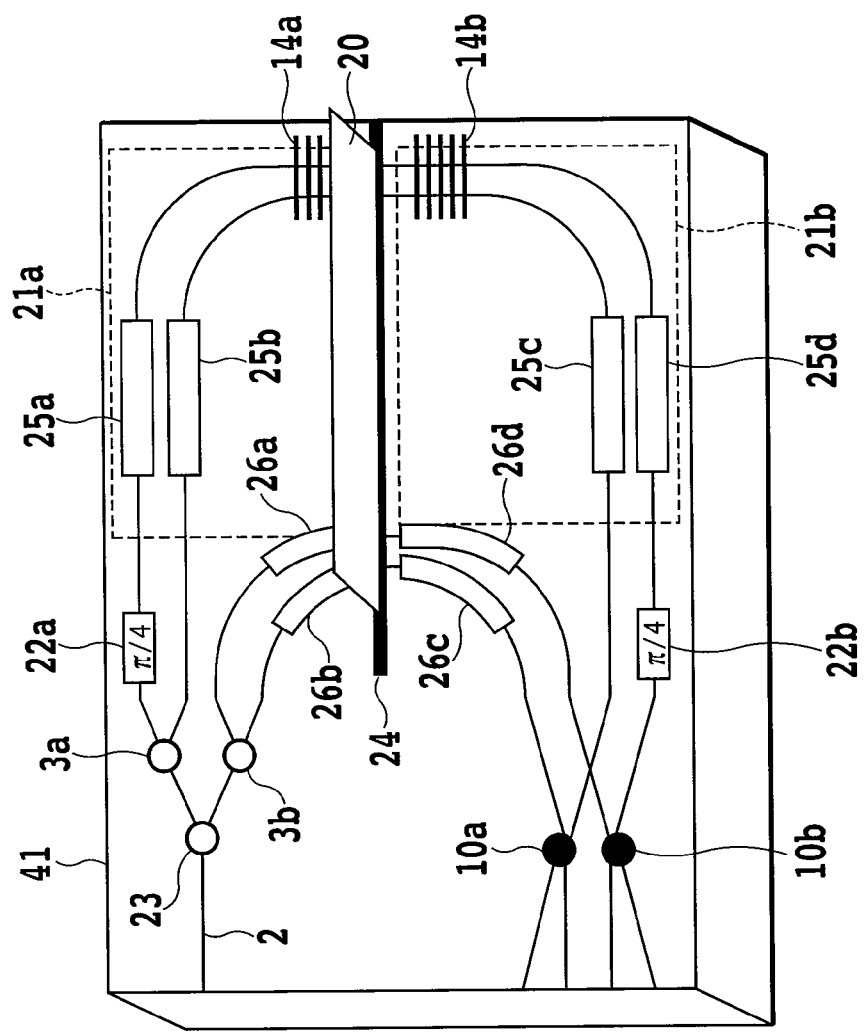
FIG. 14 is a schematic diagram of an optical delay line interferometer for DQPSK of the configuration of the present invention according to a first embodiment.

FIG. 14 shows a schematic diagram of an optical delay line interferometer according to the first embodiment, fabricated actually. The PLC technology is used for fabrication of the optical delay line interferometer. Specifically, flame hydrolysis deposition and reactive ion etching are used to fabricate a silica glass waveguide on a silicon substrate. A core is 4.5 μm square in cross section, and a relative refractive-index difference is 1.5%. Overcladding glass of 30 μm thick is deposited to bury the core.

After deposition of the overcladding glass, a groove is formed by removing the cladding and the core in a portion of the long arm waveguide, using the reactive ion etching, and the formed groove is filled with the temperature compensation material. In the first embodiment, a silicone resin is used as the temperature compensation material; however, the present invention is not so limited, and, of course, a polymer material or the like may be used. The grooves 14a and 14b to be filled with the temperature compensation material are fabricated so that each groove includes five grooves each having a groove width w of 10 μm and the intervals p between the grooves are 30 μm. In addition, the intervals between the long arm waveguides in the grooves 14a and 14b are set to 500 μm. With the disposition of the waveguides in close proximity to each other as mentioned above, the reduction of a difference between fabrication errors in the groove widths w of the grooves 14a and 14b to 0.05 μm or less is sufficiently possible with the use of known waveguide fabrication technology. With a difference of 0.05 μm or less between the fabrication errors, the deviation of the phase difference of the transmission spectrum of each Mach-Zehnder interferometer from 90 degrees presents no problem, in the range of wavelengths of the optical signal for use in the optical communication.

In the optical delay line, the optical path length difference between the long arm waveguide and the short arm waveguide is set so that the FSR (free spectral range) of the interferometer is 21 GHz. Multimode interference couplers (MMI) in a 2-input 2-output form are used as the optical splitter 23 in the first stage linked to the input waveguide 2 and the optical couplers 10a and 10b.

Components shown in the schematic diagram of FIG. 14 correspond to components of a circuit diagram of FIG. 9, and the same components are denoted by the same reference characters. A half-wave plate 20 fabricated by cutting a polyimide film of ten and a few of micrometers thick so that its optic axis is inclined by 45° relative to the optic axis of the waveguide is used as the polarization converter. The half-wave plate 20 is inserted into a groove 24 (having a width of 20 μm and a depth of 100 μm) formed by a dicing saw.

The inserted position of the half-wave plate is such that the amounts of delay of the optical delay lines 21a and 21b located on both sides of the half-wave plate 20 is each equivalent to a time of 0.5 symbols. As the phase shifters, ($\pi/4$) phase shifters 22a and 22b are disposed in a long arm waveguide disposed on the outermost periphery of the circuit taken as a whole, before and after the half-wave plate 20, respectively. Heaters 25a and 25b and heaters 25c and 25d are disposed on two long arm waveguides before and after the half-wave plate 20, respectively, with the half-wave plate 20 in between. Likewise, heaters 26a and 26b and heaters 26c and 26d are disposed on two short arm waveguides. These heaters functions both as the variable phase adjusters to effect fine adjustment of the delay time and the amount of phase provided by the optical delay lines 21a and 21b and the phase shifters 22a and 22b, and as the adjusters for the effective refractive index of the waveguide to achieve the elimination of the temperature dependence.

In this embodiment, the heaters are disposed both on the long arm waveguide side and on the short arm waveguides; however, the heaters may be disposed either on the long arm waveguides or on the short arm waveguides. The disposition of the heaters on both the long and short arm waveguides enables flexible fine adjustment.

Figure 1:
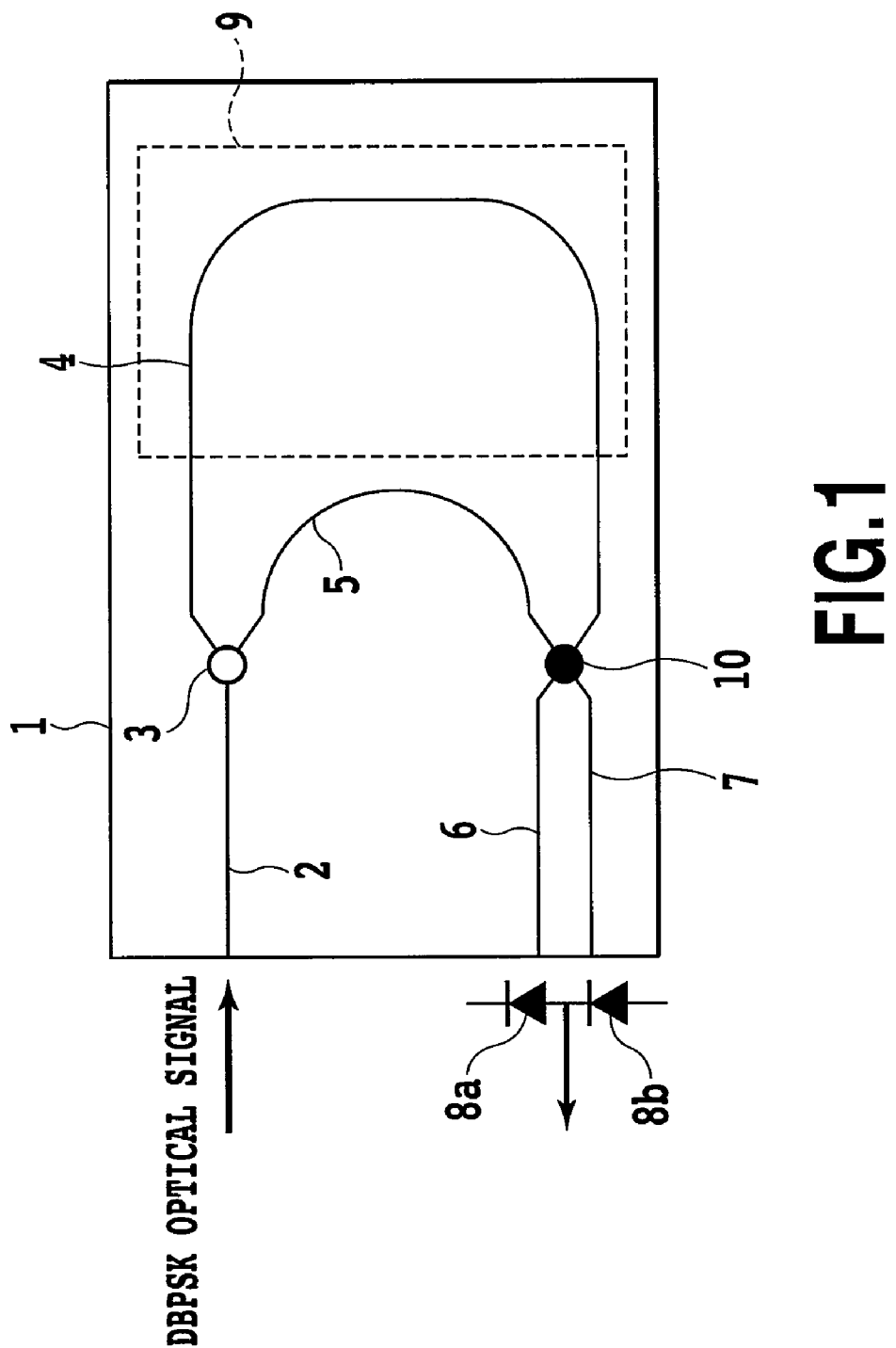
FIG. 1 is a block diagram showing a basic configuration of an optical delay line interferometer that forms a DPSK demodulator.
Figure 2:
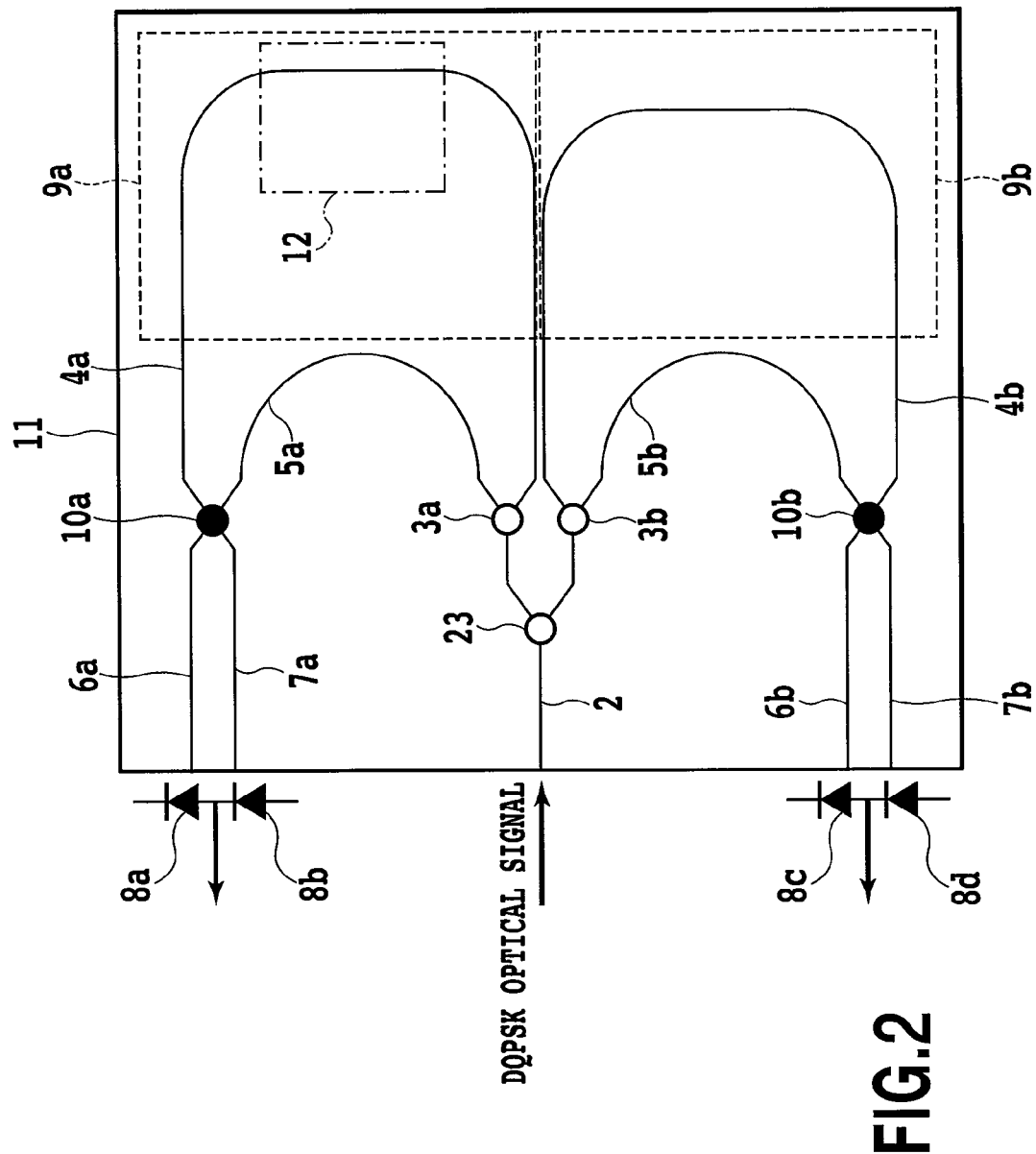
FIG. 2 is a block diagram showing a conventional demodulator for DQPSK.
Figure 3:
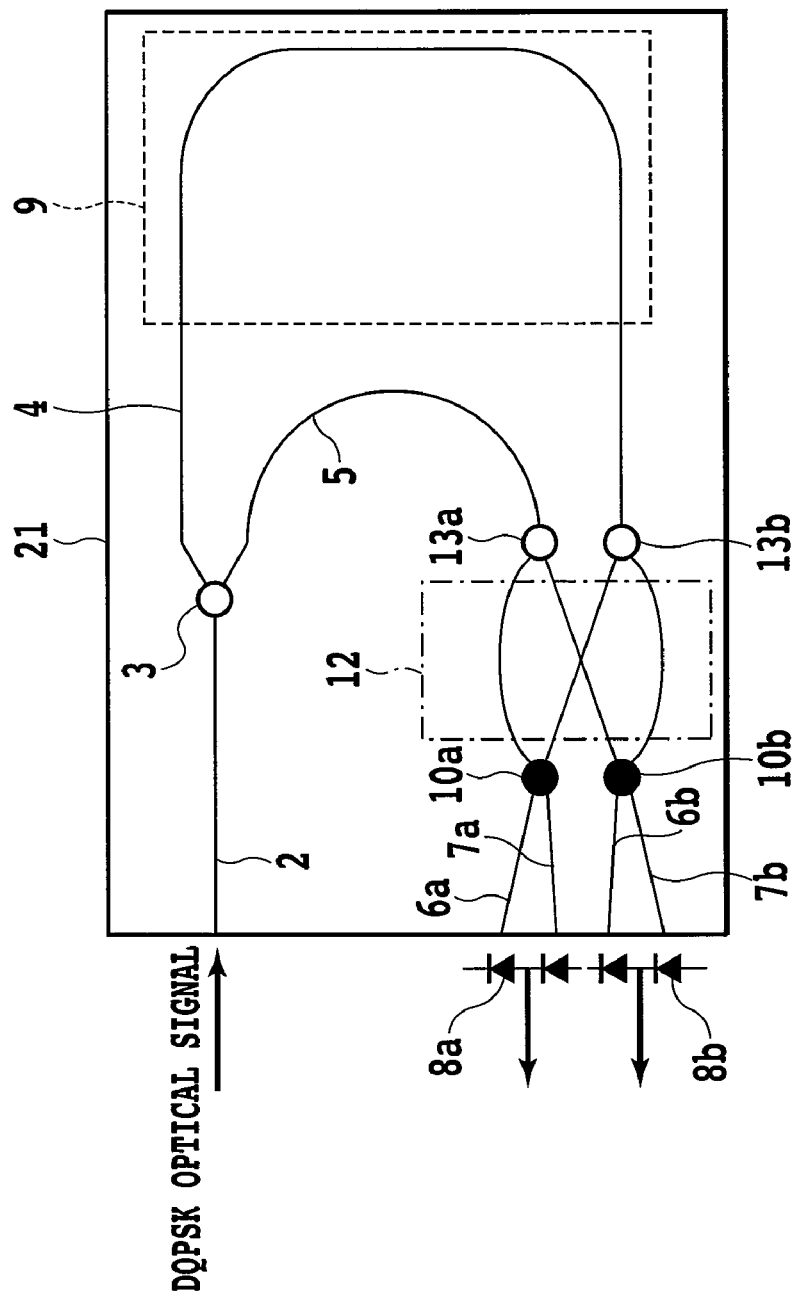
FIG. 3 is a block diagram showing another conventional demodulator for DQPSK.
Figure 4A:
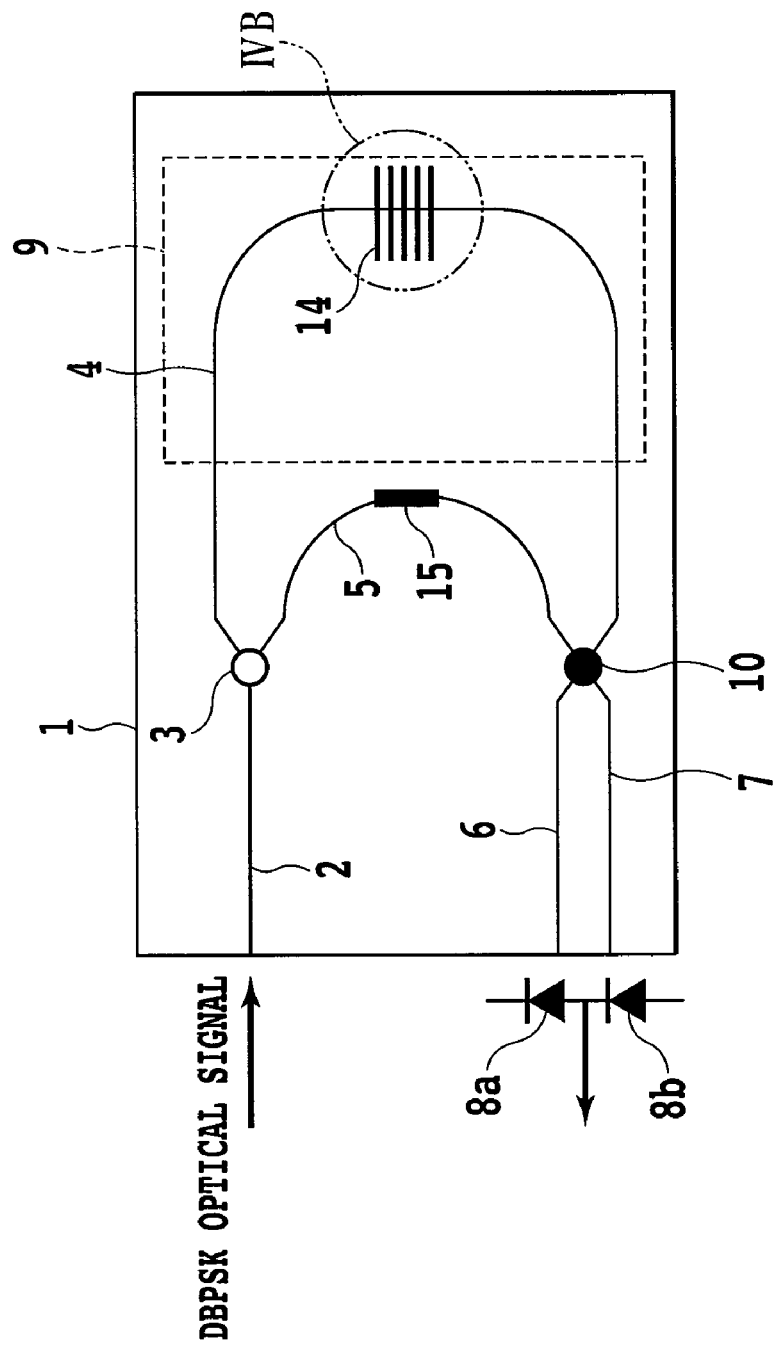
FIG. 4A is a diagram of a basic configuration of a DPSK demodulator including a mechanism for eliminating temperature dependence of optical properties.
Figure 4B:
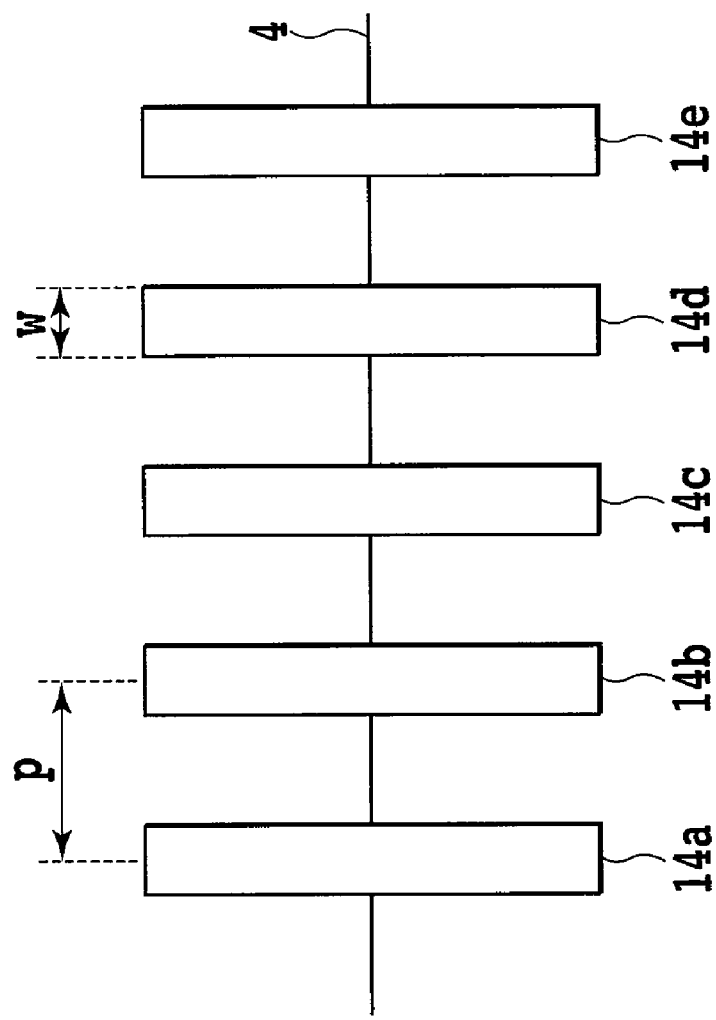
FIG. 4B is an enlarged view showing grooves for temperature compensation.
Figure 6:
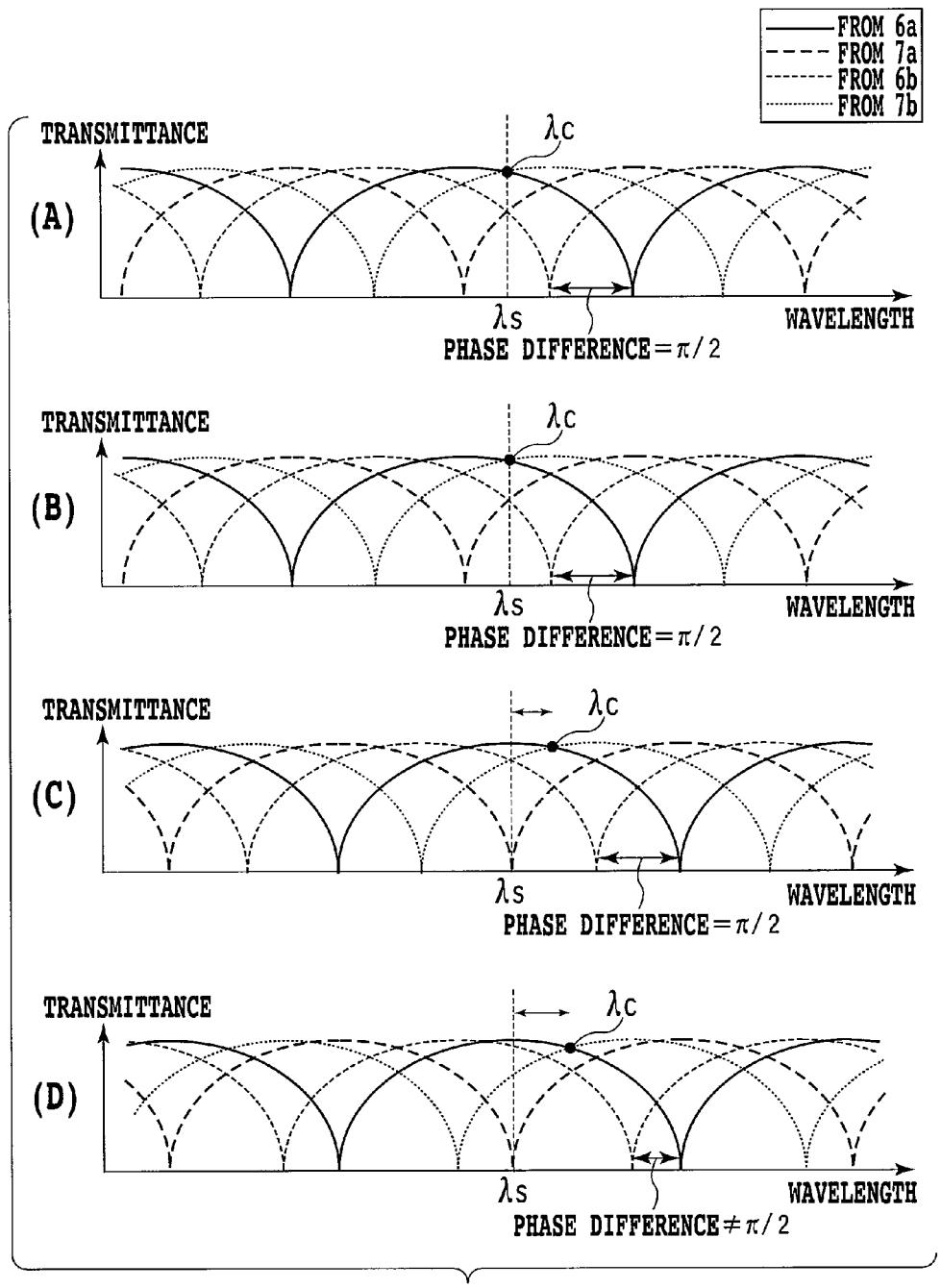
FIG. 6 is a graph explaining a change in transmission spectrum outputted from the optical delay line interferometer in a case where the circuit temperature changes.
Figure 7:
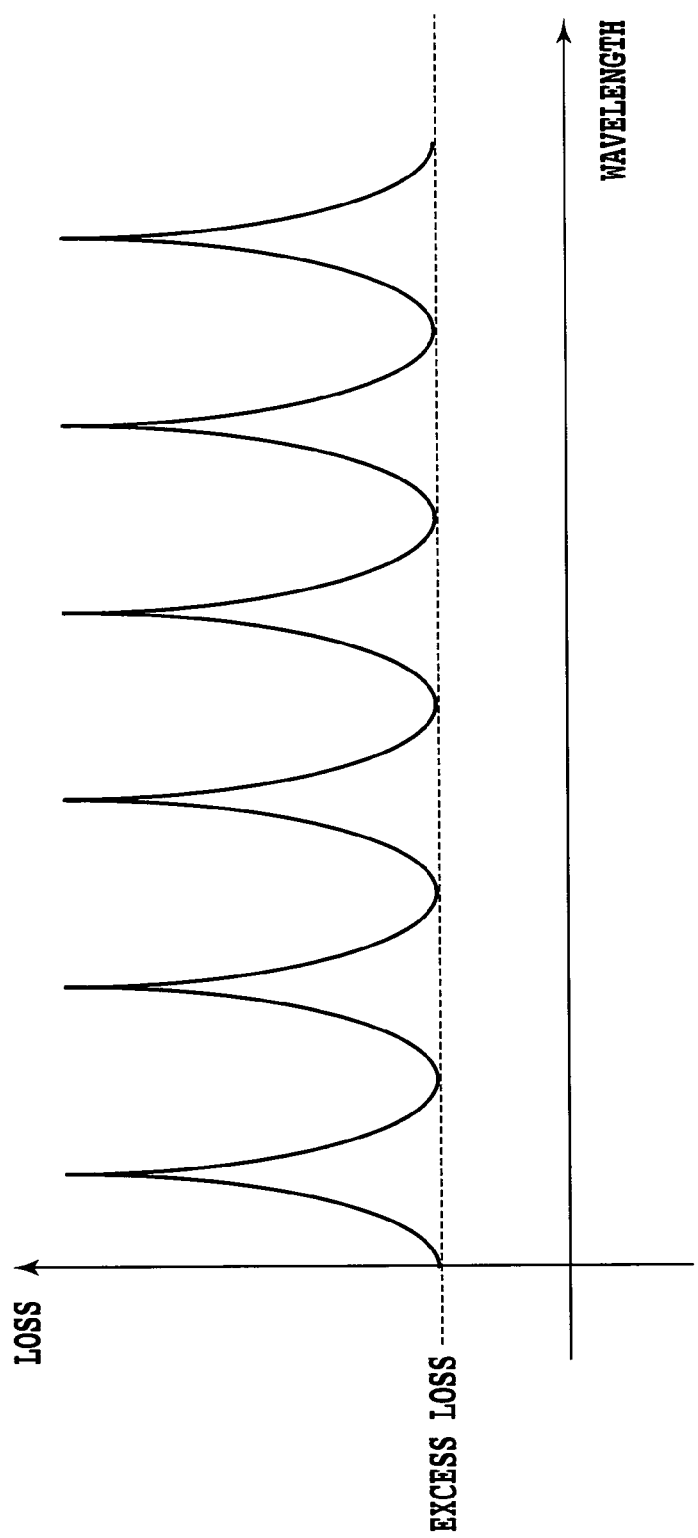
FIG. 7 is a graph explaining an excess loss in an optical delay circuit.
Figure 15:
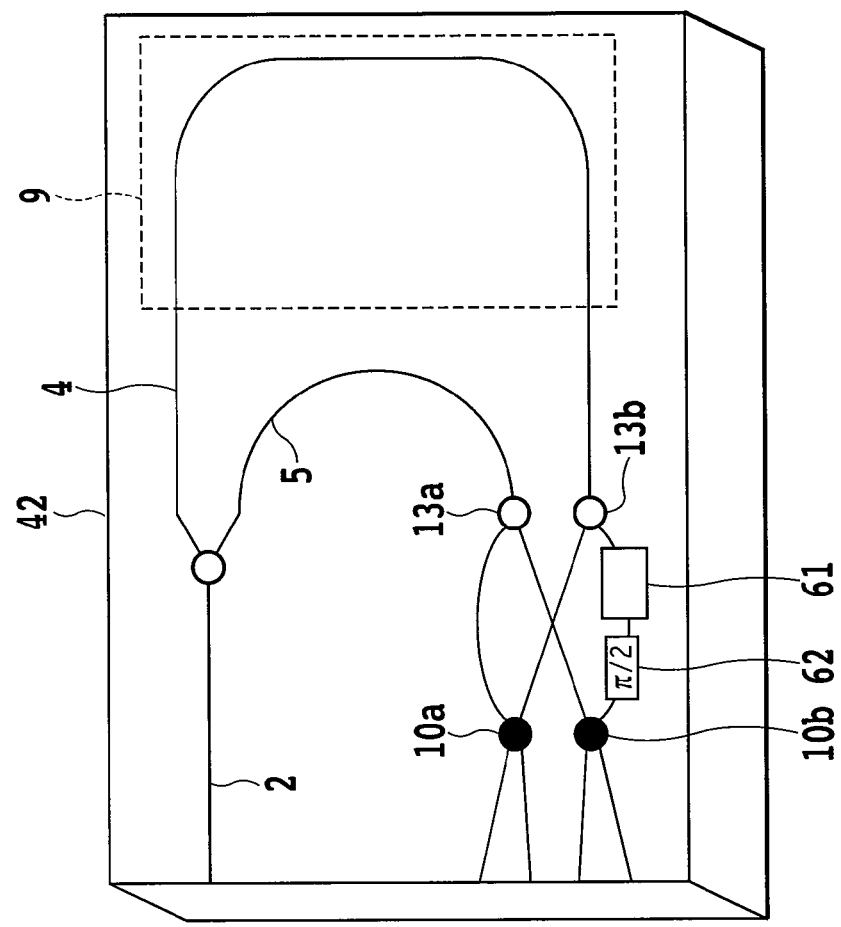
FIG. 15 is a schematic diagram of an optical delay line interferometer for DQPSK of the configuration of the conventional art 2 for comparison.

FIG. 15 is a schematic diagram of the optical delay line interferometer of the configuration of the conventional art 3 fabricated for comparison. Components shown in the schematic diagram of FIG. 15 correspond to components of a circuit diagram shown in FIG. 3, and the same components are denoted by the same reference characters. A ($\pi/2$) phase shifter 62 shown in FIG. 15 corresponds to the phase shifter 12 shown in FIG. 3. A heater 61 that functions as the variable phase adjuster is disposed adjacent to the ($\pi/2$) phase shifter 62.

Firstly, description will be given for this embodiment with regard to the results of comparison of the polarization dependence between the optical delay line interferometer of the configuration of the conventional art 3 and the optical delay line interferometer of the present invention.

Figure 16:
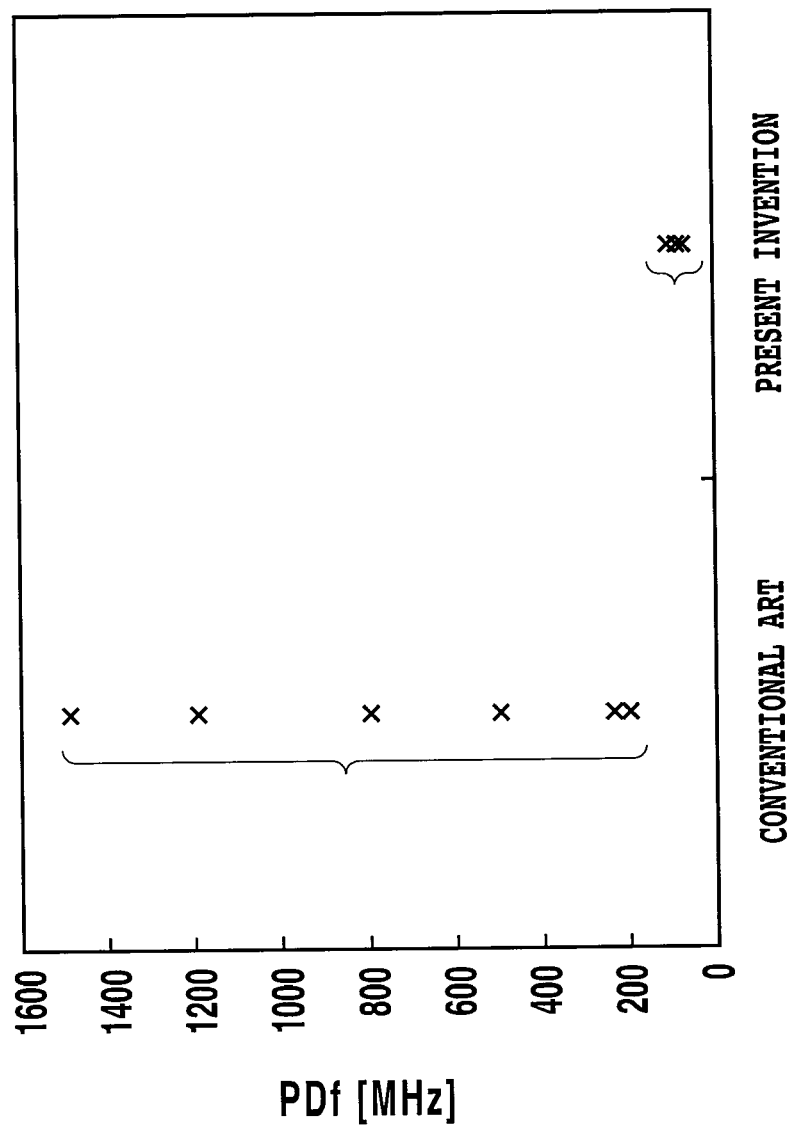
FIG. 16 is a graph showing comparison of PDf variations of the interferometer of the present invention and the interferometer of the configuration of the conventional art 2.

FIG. 16 is a graph showing the results of comparison of PDf variations in the optical delay line interferometer of the configuration of the conventional art 3 and the optical delay line interferometer of the present invention. In order to evaluate the polarization dependence of the optical delay line interferometer, eight circuits each, of the conventional art 3 and the present invention, were fabricated, and initial PDf was measured without fine adjustment being performed. In the optical delay line interferometer of the configuration of the conventional art 3, it can be seen that the average value of PDf is large, and further, the measured values vary greatly. The PDf varies greatly presumably because of a great change in the birefringence of the waveguide due to fabrication variations in core size or characteristic variations in the overcladding glass or the like.

On the other hand, in the optical delay line interferometer of the configuration of the present invention, the produced birefringence is canceled due to the fact that, even if the birefringence occurs in the waveguide, the half-wave plate performs conversion from one to another of polarizations. This enables the reduction of the PDf to a small value with high reproducibility, even if many circuits are fabricated.

Figure 17:
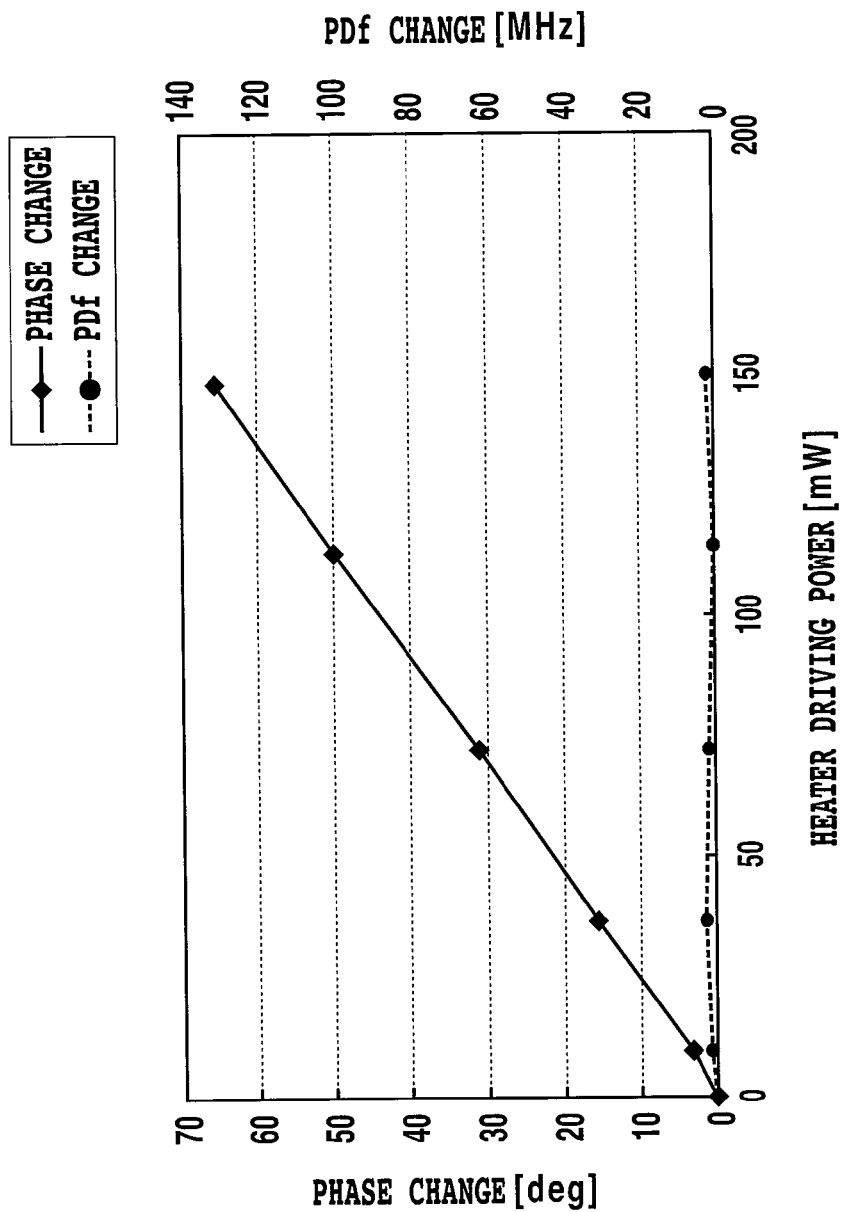
FIG. 17 is a graph showing a PDf change that occurs when the heater is driven in the optical delay line interferometer for DQPSK of the present invention.

FIG. 17 is a graph showing a PDf change that occurred when the heaters were driven in the optical delay line interferometer for DQPSK of the present invention. The heaters functioning as the variable phase adjuster were driven, and the dependence of the PDf change on heater driving power was measured. The horizontal axis of the graph indicates the heater driving power. The vertical axis of the graph on the left side indicates the amount of phase shift during driving, and indicates the amount of phase shift provided to light propagating through the waveguide. On the other hand, the vertical axis on the right side indicates the PDf change during the driving of the heaters.

Figure 18:
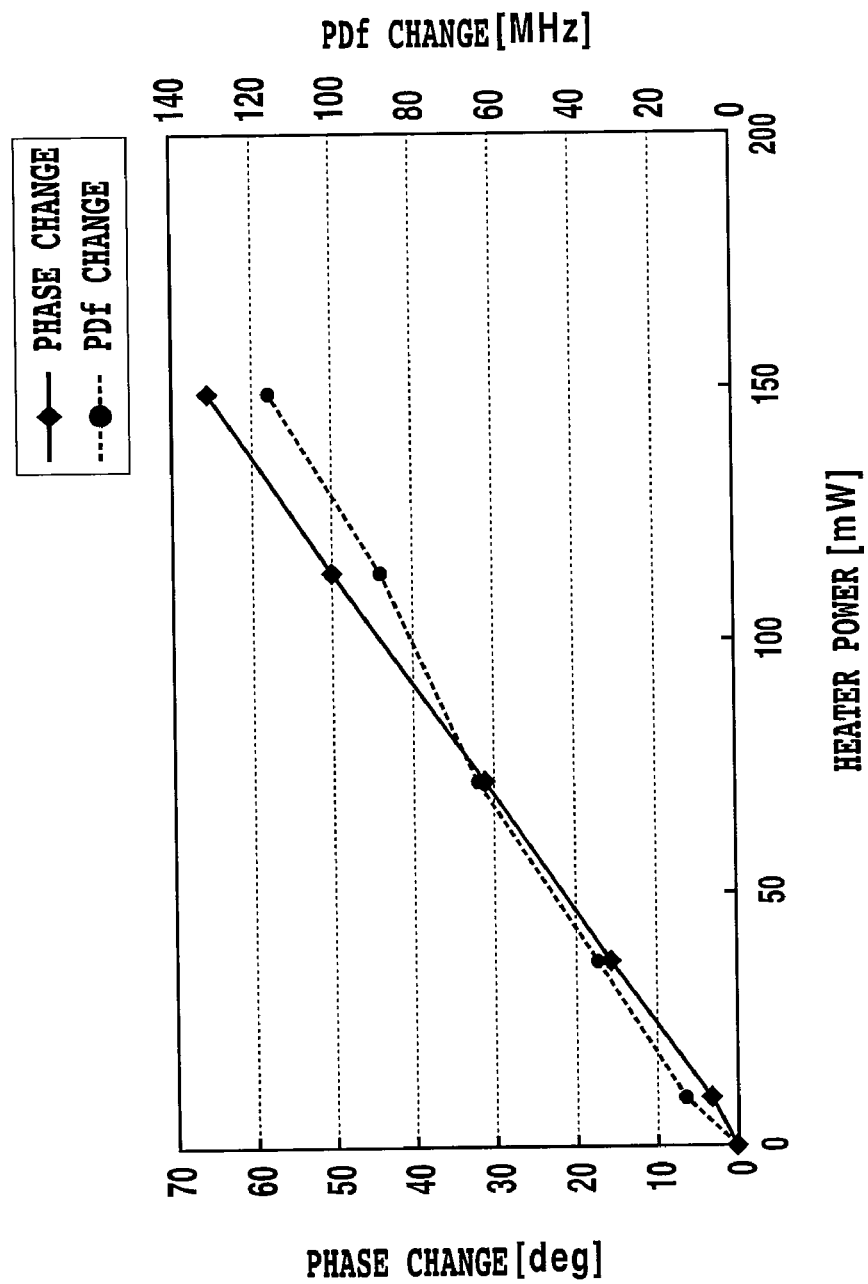
FIG. 18 is a graph showing a PDf change that occurs when the heater is driven in the optical delay line interferometer for DQPSK of the configuration of the conventional art 2 for comparison.

FIG. 18 is a graph showing a PDf change that occurred when the heaters were driven in the optical delay line interferometer for DQPSK of the configuration of the conventional art 3. Incidentally, the half-wave plate was likewise inserted at the center of the optical delay line in the optical delay line interferometer of the configuration of the conventional art 3, and measurement was performed with PDf degradation suppressed. Comparison of FIGS. 17 and 18 shows that, in the optical delay line interferometer of the configuration of the conventional art 3, when the heater driving power is changed to provide a phase change for the propagating light, the PDf increases, and hence, the polarization dependence increases. On the other hand, in the optical delay line interferometer of the configuration of the present invention, even if the phase change is given to the propagating light, there is no change in the PDf, and little polarization dependence develops in the optical delay line interferometer. In other words, the optical delay line interferometer having little polarization dependence at all times, regardless of driving power level of the heater that functions as the variable phase adjuster, can be achieved.

Description will now be given for this embodiment with regard to the results of comparison of the temperature dependence between the optical delay line interferometer of the configuration of the conventional art 3 and the optical delay line interferometer of the present invention.

Figure 19:
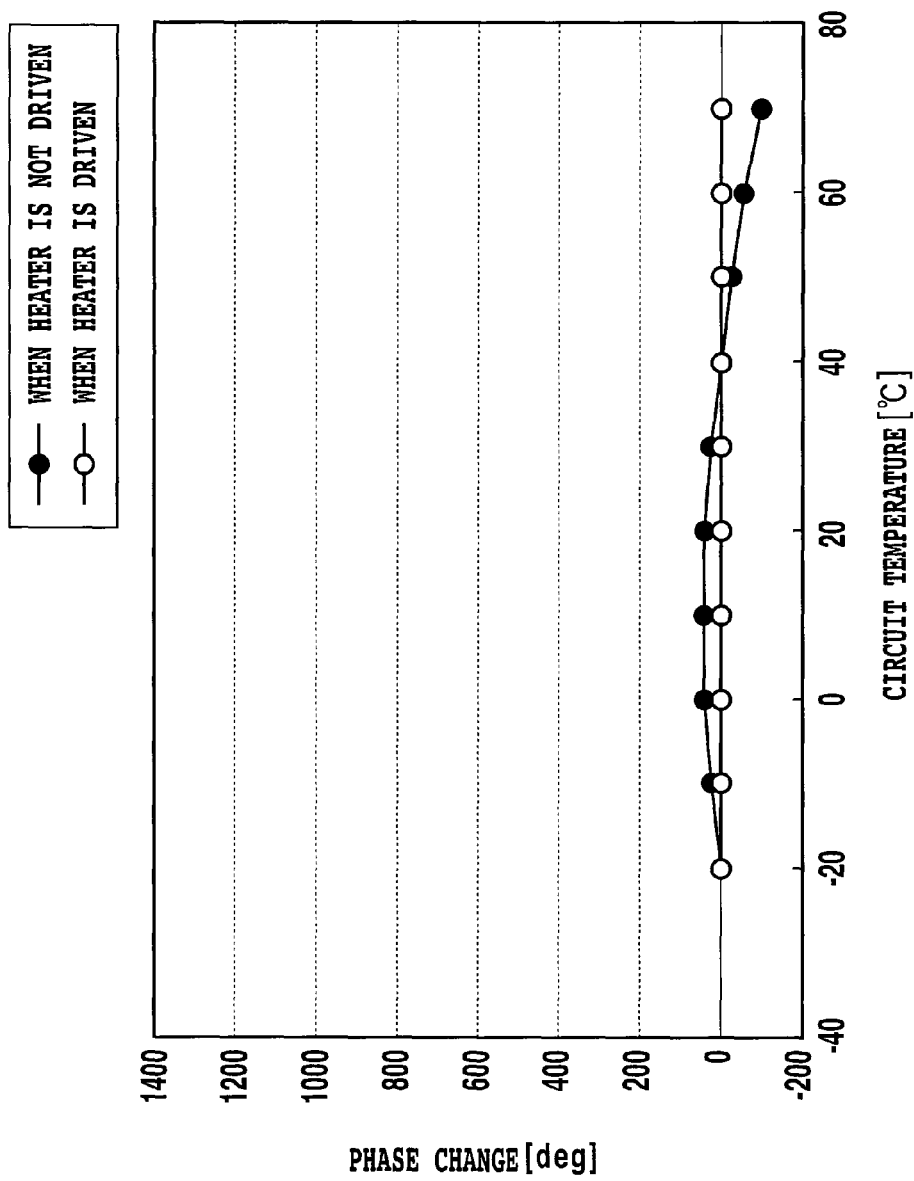
FIG. 19 is a graph showing a phase change in the transmission spectrum of the optical delay line interferometer for DQPSK of the present invention in a case where the temperature changes.

FIG. 19 is a graph showing a change in the optimum operating wavelength λc, which occurred when the circuit temperature changed in the optical delay line interferometer for DQPSK of the present invention. The change in λc is represented in terms of the amount of phase change of the loss spectrum. For example if λc is shifted by 21 GHz (equivalent to 1×FSR) on the frequency axis, this amount of phase change is converted to 360°. With the temperature of the circuit varying from −20° C. to 70° C., the loss spectrum of the Mach-Zehnder interferometer was measured at varying temperatures. The amount of phase change of λc that occurred with the temperature change was calculated, with a case at a circuit temperature of −20 degrees taken as the reference. FIG. 19 shows measured results, which were obtained when the adjusters for the effective refractive index of the waveguide, that is, the heaters, were not driven (shown by ●), and when the heaters were driven to further compensate for the temperature dependence that is not completely eliminated with the temperature compensation material filled into the grooves 14a and 14b (shown by ○). Driving the heater can compensate for the remainder of the variation in the transmission wavelength, which cannot be eliminated only by the temperature compensation using the temperature compensation material filled into the grooves.

Figure 20:
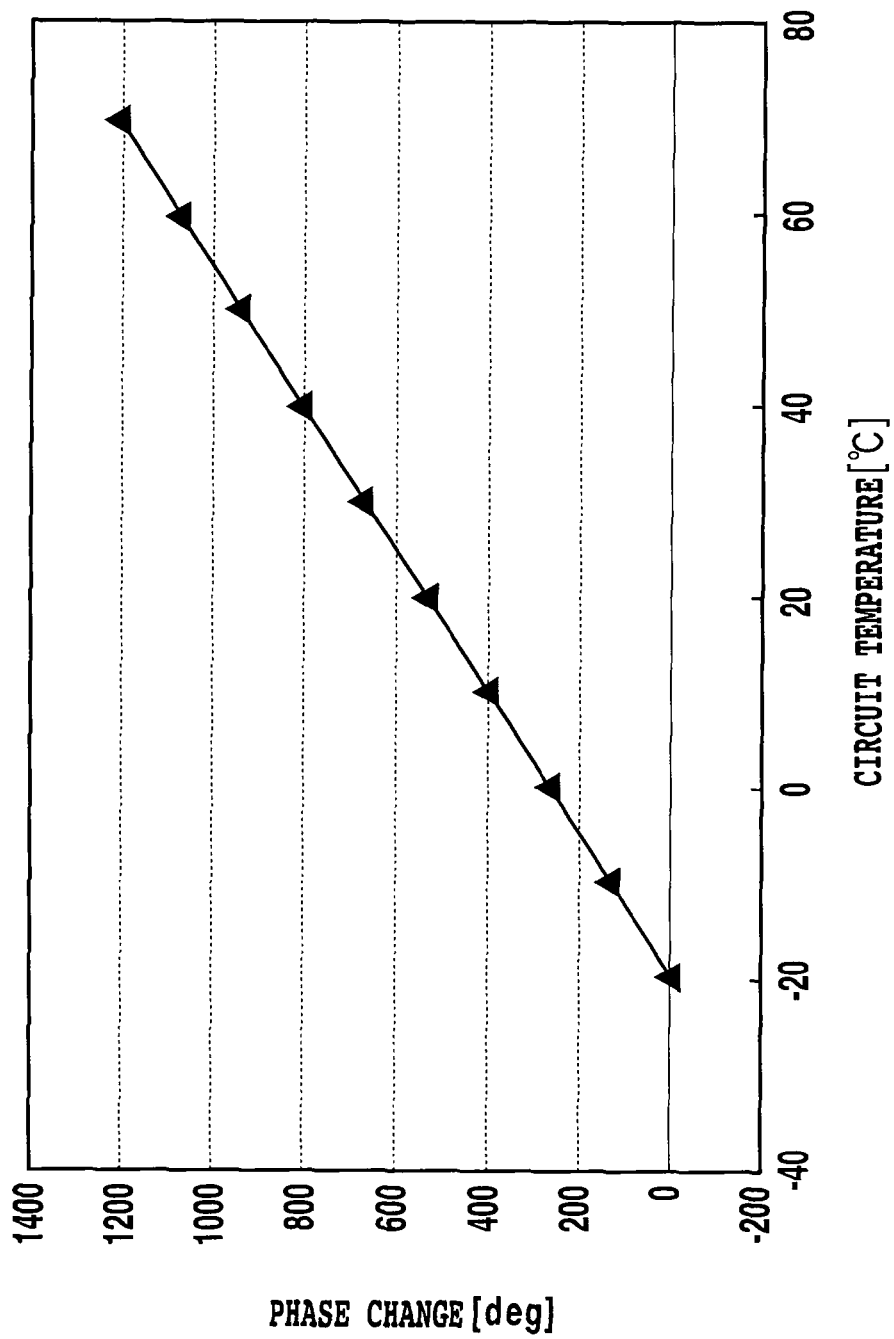
FIG. 20 is a graph showing a phase change in the transmission spectrum of the optical delay line interferometer for DQPSK of the configuration of the conventional art 2 for comparison in a case where the temperature changes.

FIG. 20 is a graph showing a change in the optimum operating wavelength λc, which occurred when the circuit temperature changed in the optical delay line interferometer for DQPSK of the configuration of the conventional art 3. The amount of change in the optimum operating wavelength is represented in terms of the amount of phase change. Comparison of FIGS. 19 and 20 shows that, in the optical delay line interferometer of the configuration of the conventional art 3, the phase of the loss spectrum changed by about 1200 degrees as the circuit temperature changed from −20° C. to 70° C. On the other hand, in the optical delay line interferometer of the configuration of the present invention, when the heaters were not driven, the amount of phase shift of the loss spectrum with the change in the circuit temperature from −20° C. to 70° C. was about 100 degrees. One cause of the occurrence of a situation where the shift of the loss spectrum was not completely eliminated even if the temperature compensation material was filled is the fabrication error in the width w of the groove mentioned previously. In the optical delay line interferometer of the configuration of the present invention, when the heaters were further driven, the amount of phase shift of the loss spectrum was reduced to 0 GHz, that is, the temperature dependence of the optimum operating wavelength was completely eliminated, in the range of temperatures from −20° C. to 70° C.

Figure 21:
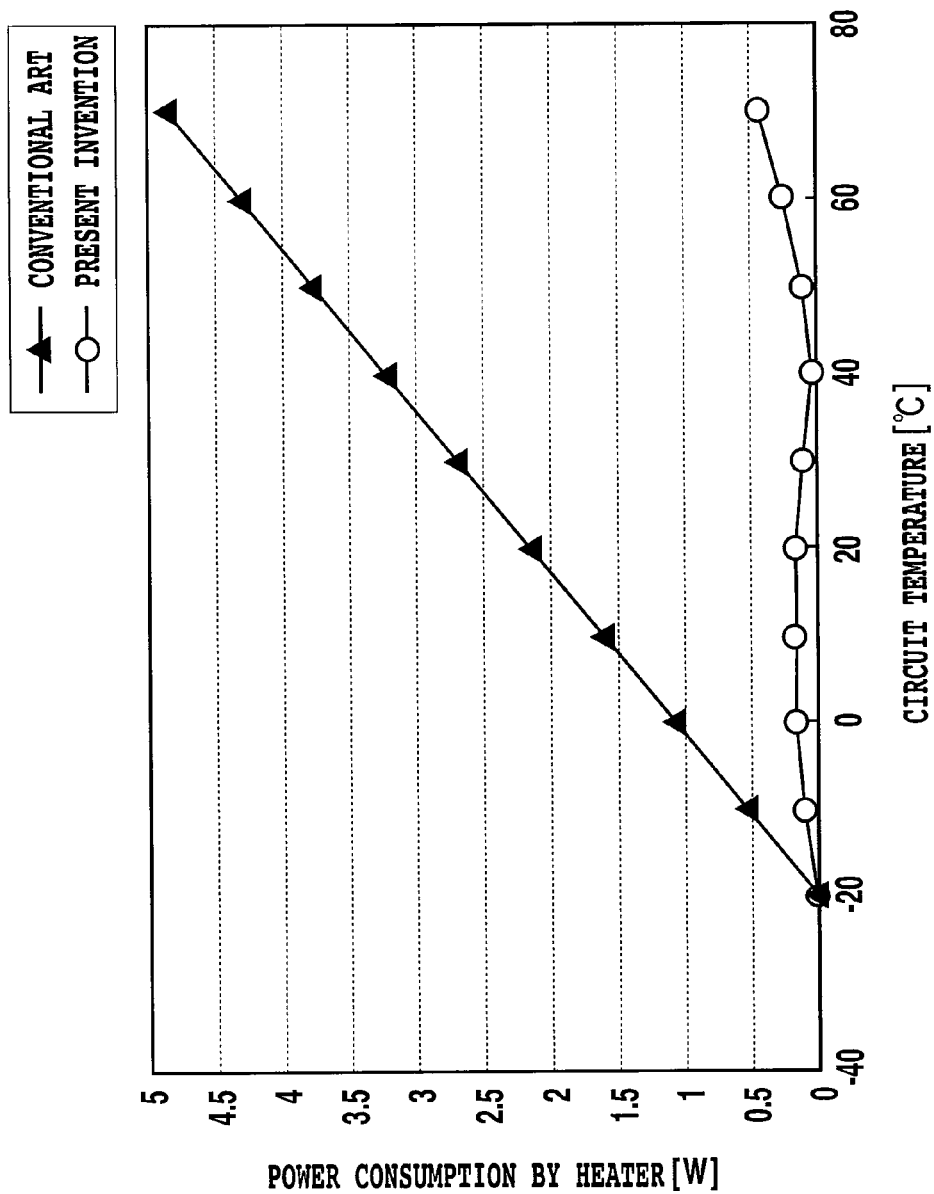
FIG. 21 is a graph showing comparison of power consumption required to eliminate the temperature dependence of the interferometer of the present invention and the optical delay line interferometer of the configuration of the conventional art 2.

FIG. 21 is a graph showing power consumption by the heaters, required to drive the heater for the complete elimination of the temperature dependence of the optical delay line interferometer. Measurements of the power consumption by the heaters required to compensate for the amount of phase change of the loss spectrum with the temperature change were made on the optical delay line interferometers for DQPSK of the configuration of the present invention and the configuration of the conventional art 3, with a case of a circuit temperature of −20° C. taken as the reference. In the configuration of the present invention, the maximum value of power applied to the heater was 0.4 W. On the other hand, the configuration of the conventional art 3 requires 4.8 W of power.

As is apparent from the above-mentioned comparison, when the heaters are driven in the configuration of the conventional art 3, the PDf increases, whereas, in the configuration of the present invention, the PDf does not increase even if the heaters are driven to completely eliminate the temperature dependence. The results of comparison shown in FIG. 21 show the effect characteristic of the circuit configuration of the present invention capable of eliminating both the polarization dependence and the temperature dependence of the optical delay line interferometer. When the Peltier device was mounted on the optical delay line interferometer for DQPSK of the configuration of the conventional art 3 thereby to keep the circuit temperature constant, and when the temperature around the circuit (or an ambient temperature) changed from −20° C. to 70° C., the maximum value of power required to drive the Peltier device was 5 W. As mentioned above, comparison between temperature characteristics of the optical delay line interferometers for DQPSK of the configurations of the present invention and the conventional art 3 has shown that the filling of the temperature compensation material and the adjustment function for the effective refractive index of the waveguide according to the present invention can achieve the effect of completely eliminating the temperature dependence with remarkably low power consumption, as compared to the conventional art.

Second Embodiment

Two pairs of optical signals outputted from the optical delay line interferometer in the modulator for an optical multilevel differential phase shift keyed signal are demodulated by photoelectric converters (or the pair of balanced PDs). On this occasion, if there is an arrival time difference (or a skew) between the optical signals reaching the photoelectric converters, the optical signals are converted into electric signals at different times, and thus, demodulation distortion occurs at the time of phase demodulation. This has a great influence particularly on multileveled modulation with constellation points in close proximity to each other, which is not desirable for the demodulator. In order to compensate for the arrival time of the optical signals, a skew adjuster that adjusts the output timing of the optical signals may be placed at the output end of the optical delay line interferometer.

Figure 22:
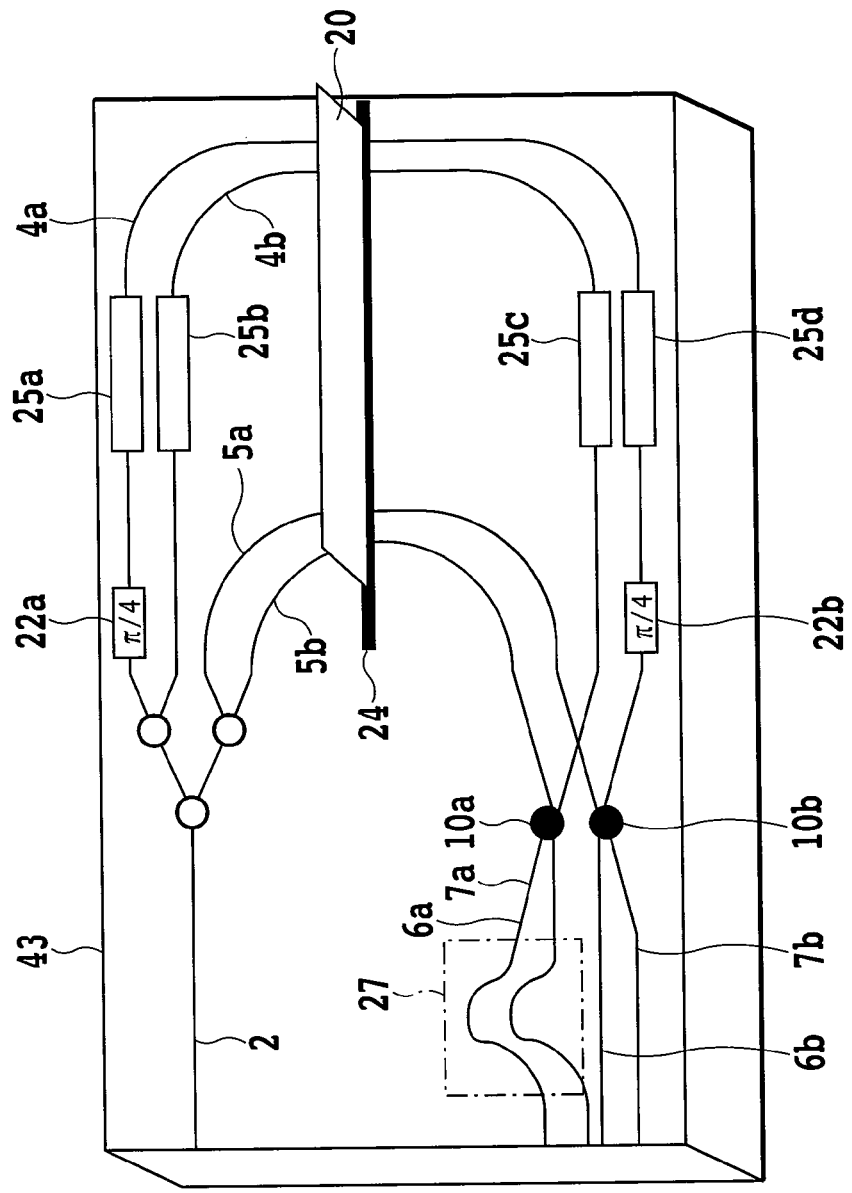
FIG. 22 is a block diagram of the optical delay line interferometer for DQPSK according to a second embodiment in which a skew adjuster is placed after an optical coupler.

FIG. 22 is a block diagram of the optical delay line interferometer for DQPSK in which the skew adjuster is placed after the optical coupler. Although the optical delay line interferometer shown in FIG. 22 has substantially the same configuration as that of the optical delay line interferometer shown in FIG. 14, the former is different from the latter in that the former has a skew adjuster 27 in the outputs of the optical couplers 10a and 10b. Typically, the optical signals propagating through the outer long and short arm waveguides 4a and 5a has a lag in the arrival time behind the optical signals propagating through the inner long and short arm waveguides 4b and 5b, and thus, the skew adjuster circuit 27 is disposed after the optical coupler 10a connected to the inner waveguides 4b and 5b.

Figure 23:
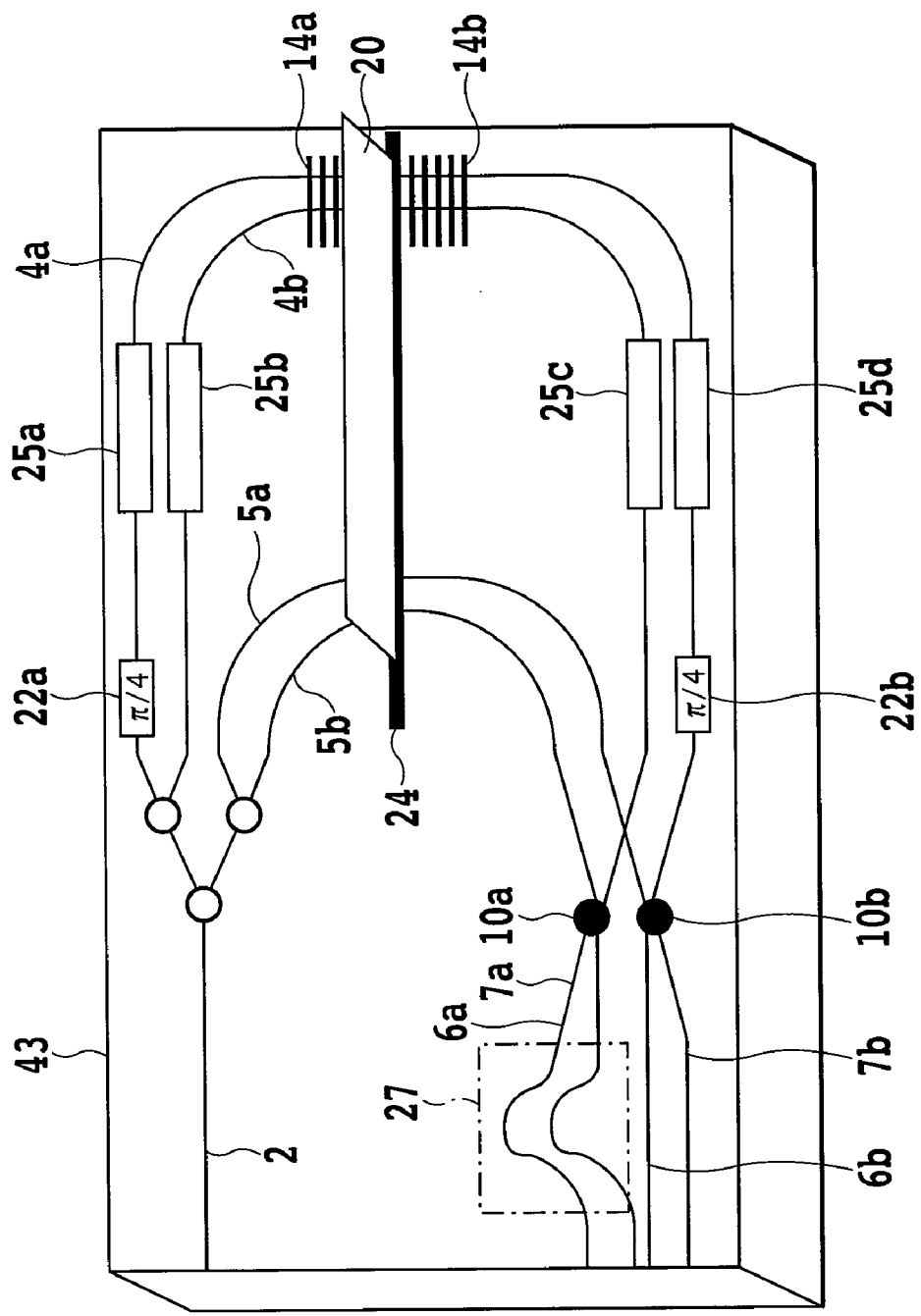
FIG. 23 is a block diagram of the optical delay line interferometer for DQPSK including the skew adjuster, where the temperature dependence is eliminated.

A configuration shown in FIG. 23 is different from that shown in FIG. 22 in that the optical delay line interferometer for DQPSK of the configuration shown in FIG. 23 includes the grooves 14a and 14b to be filled with the temperature compensation material. The skew adjuster that adjusts the output timing of the optical signals operates in the same manner.

Figure 24:
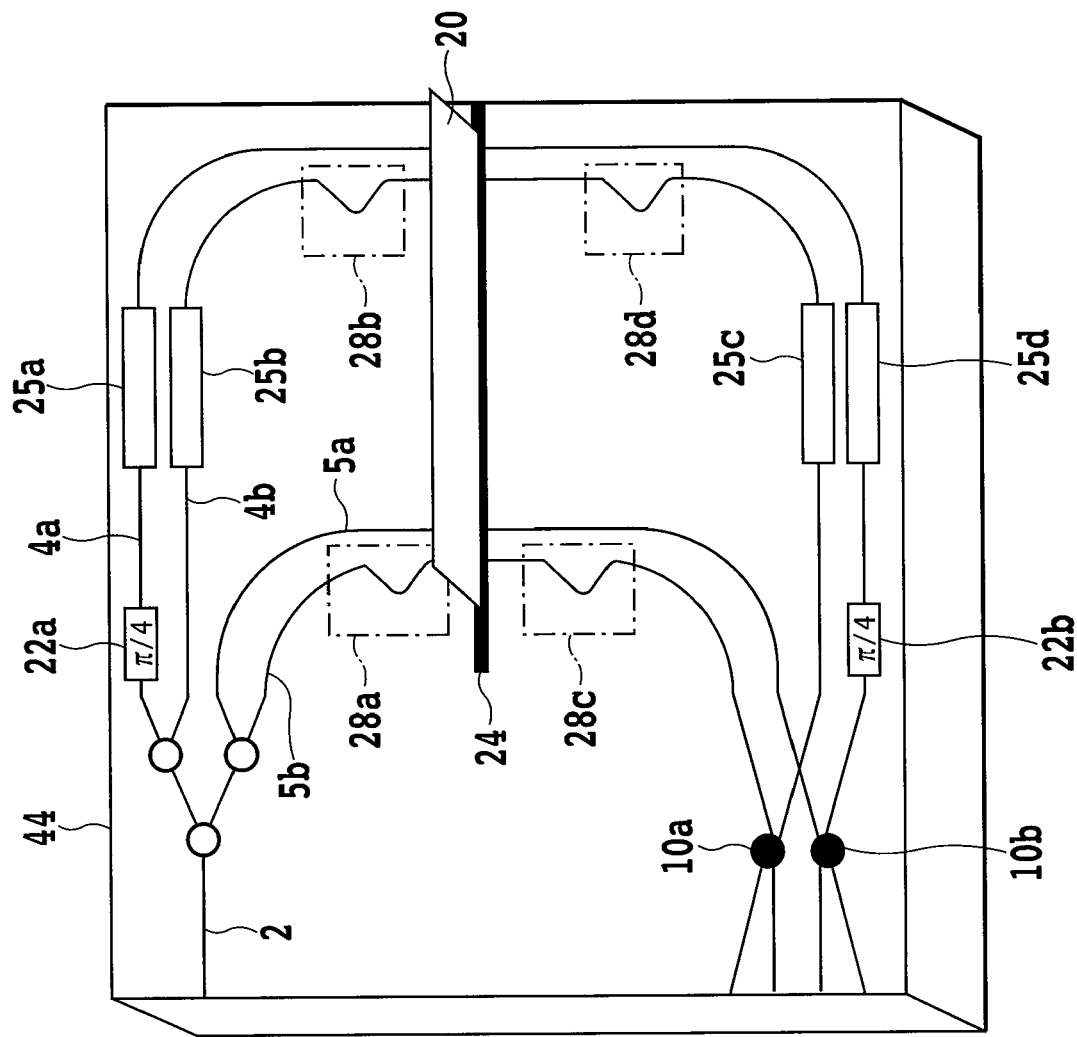
FIG. 24 is a block diagram of the optical delay line interferometer for DQPSK in which the skew adjuster is disposed in the optical delay line interferometer.

FIG. 24 is a block diagram of the optical delay line interferometer for DQPSK in which skew adjusters are disposed in the Mach-Zehnder interferometer. In this configuration, there are provided skew adjusters 28a, 28b, 28c and 28d before and after the polarization converter 20. Skew adjustment is possible within the Mach-Zehnder, interferometer, as is the case with this configuration; however, in this instance, the number of skew adjusters increases. Further, in order to maintain the symmetry of the circuit and thus maintain the polarization dependence low, the amount of skew to be adjusted has to be disposed by half each before and after the polarization converter 20. An increase in the number of skew adjusters leads also to an increase in the size of the circuit. Thus, it is preferable that the skew adjuster 27 be disposed at the output end of the optical delay line interferometer, as is the case with the configuration shown in FIG. 22, from the viewpoint of ease of design and the circuit size. However, the present invention is not so limited.

Figure 25:
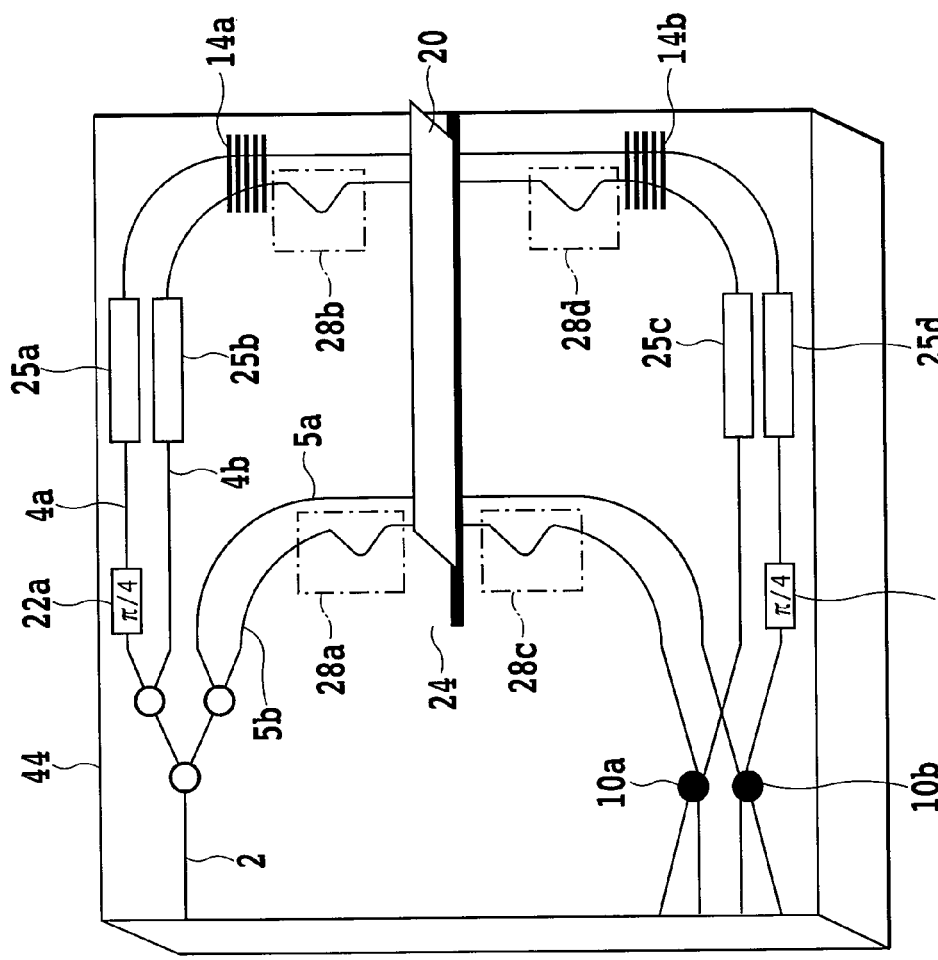
FIG. 25 is a block diagram of the optical delay line interferometer for DQPSK in which the skew adjuster is disposed in the optical delay line interferometer whose temperature dependence is eliminated.

A configuration shown in FIG. 25 is different from that shown in FIG. 24 in that the optical delay line interferometer for DQPSK of the configuration shown in FIG. 25 includes the grooves 14a and 14b to be filled with the temperature compensation material. The skew adjuster that adjusts the output timing of the optical signals operates in the same manner.

Third Embodiment

The embodiments described above are designed focusing on the elimination of the PDf caused by the birefringence and the elimination of the temperature dependence. Description will be given of an embodiment of the circuit configuration further capable of suppressing PDf deterioration caused by the polarization coupling, according to another aspect of the optical delay line interferometer of the present invention. Referring to this embodiment, description will be given of the circuit configuration designed to suppress the PDf by removing produced polarization coupling-induced light, not by suppressing the production in itself of polarization coupling-induced light.

In order to suppress the PDf caused by the polarization coupling, the simplest measurement is to suppress the production in itself of the polarization coupling-induced light that is the cause of the PDf deterioration. However, the suppression of the polarization coupling is very difficult. The polarization coupling-induced light is produced, in principle, not only in the curve or the like of the optical waveguide, but also due to a fabrication error in the waveguide. If there is a variation in any waveguide elements (such as the shape and refractive index of the waveguide, and the stress applied to the waveguide) having an influence on propagating light, in the direction of propagation of the light, the polarization coupling-induced light is produced. Therefore, the polarization coupling-induced light is prone to appear in the divider and combiner of the waveguide, on both ends of the portion of the waveguide in which the heater is disposed, in the portion of the waveguide in which the groove is formed, and in other locations, and the polarization coupling-induced light produced in these locations acts synergistically and degrades the PDf. The concurrent suppression of the polarization coupling-induced light produced in all locations is extremely difficult. The inventors have focused attention on the suppression of the PDf by the removal of the produced polarization coupling-induced light, not by the suppression of the production in itself of the polarization coupling-induced light.

In this embodiment, the phenomenon of interference of light is utilized for the removal of the produced polarization coupling-induced light. When two lights of equal intensity interfere with each other, field intensity is doubled if the two lights have an equal phase difference, or the field intensity becomes zero and disappears if there is a phase difference of 180°. Also in the case of interference of light propagating the waveguide, if the phase difference between the two interfering lights is set at 180° so that the interfering lights attenuate each other, the lights form light of components having no influence on the interference characteristics, which in turn is substantially removed. Therefore, the suppression of the PDf can be accomplished by the utilization of the interference for the removal of the polarization coupling-induced light.

Conditions for the removal of two polarization coupling-induced lights interfering with each other are the following two conditions.

Condition $\alpha$: The two polarization coupling-induced lights have equal intensity.

Condition $\beta$: The phase difference between the two polarization coupling-induced lights is an odd multiple of 180°.

Specific description will be given below with regard to a method for preventing the PDf degradation by removing the polarization coupling-induced light produced in the waveguide in which the heaters are disposed.

Generally, the amount of production of polarization coupling-induced light varies greatly due to a fabrication error in the circuit or the like; however, the fabrication errors become substantially equal, provided that they occur in the same circuit and also in the same structure. Therefore, the amounts of production of polarization coupling-induced light in multiple circuit portions having the same structure become substantially equal.

Figure 26:
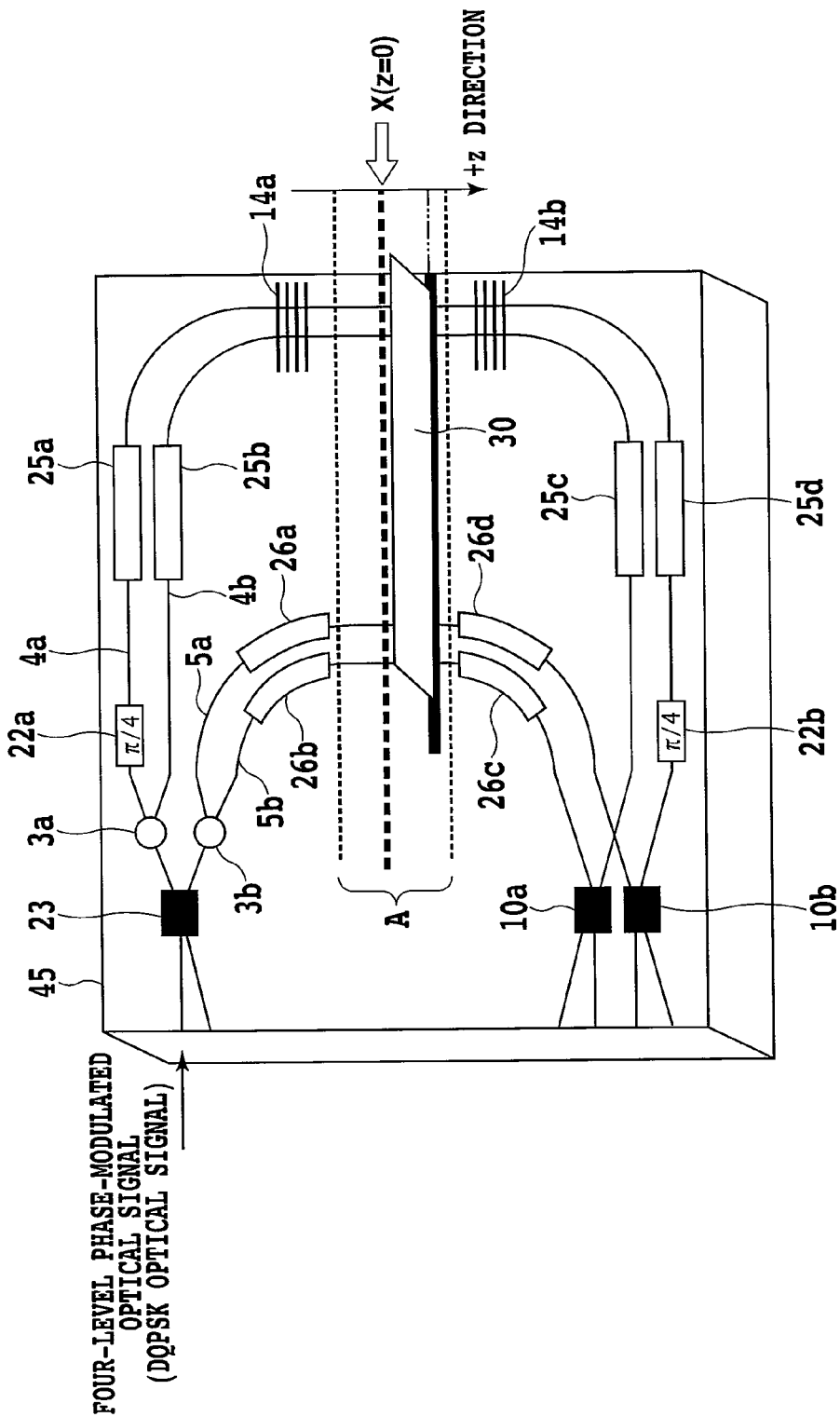
FIG. 26 is a block diagram of an optical delay line interferometer according to a third embodiment, where the polarization dependence caused by polarization coupling is eliminated.

FIG. 26 is a schematic diagram of the optical delay line interferometer according to this embodiment in which the polarization dependence caused by the polarization coupling is eliminated. A basic configuration is the same as that of the optical delay line interferometer shown in FIG. 14. The configuration shown in FIG. 26 is different from that shown in FIG. 14 in that the inserted position of the polarization converter 30 is limited to its optimum position and the circuit configuration is symmetrical.

Here, attention is given to a propagation path from the splitter 23 via the arm waveguide 4a to the optical coupler 10b. As shown in FIG. 26, two heaters 25a and 25b are disposed. The heaters 25a and 25b are given the same heater width and the same heater length thereby to make equal polarization coupling-induced lights produced on the waveguide 4a in which the heaters are disposed. Thereby, the condition a of the conditions for the removal of the polarization coupling-induced light is satisfied.

Description will now be given of means for fulfilling the condition $\beta$, that is, a method for making the phase difference between the polarization coupling-induced lights produced in the heaters 25a and 25b equal to the odd multiple of 180°. The phase difference between the two polarization coupling-induced lights can be adjusted by the placed position of the polarization converter. Description will be given for example with regard to an instance where the half-wave plate 30 is used as the polarization converter. When the half-wave plate 30 is placed on the arm waveguide 4a at the physical midpoint (e.g., the position of X) of the waveguide between the position of the heater 25a and the position of the heater 25d, the two polarization coupling-induced lights produced from the two heaters 25a and 25b, respectively, are in phase.

On the other hand, if the half-wave plate 30 is displaced from the midpoint (e.g., the position of X), the phase difference between the two polarization coupling-induced lights increases in proportion to the distance of displacement of the half-wave plate. Here, a direction along the waveguide in the vicinity of the half-wave plate is taken as the z direction. In addition, the midpoint is taken as an origin point (z=0). At the time of interference of the two polarization coupling-induced lights, the phase difference φ (°) between the polarization coupling-induced lights is expressed by the following equation:

$$\phi = 180 \times 4 \times d \times B_W / \lambda \qquad \text{Equation (3)}$$

where L represents a waveguide length difference between the heaters $25a$ and $25b$; the position of the half-wave plate is such that z=d; $B_W$ represents the birefringence of the waveguide; and λ represents the wavelength of the light. When the half-wave plate 30 is located at the midpoint between the two heaters (that is, the position of X is such that z=0), the phase difference is 0°, and the phase difference increases as d increases.

To make the phase difference equal to the odd multiple of 180° in order to satisfy the condition β, $4 \times d \times B_W / \lambda$ in Equation (3) can be set to an odd number. Therefore, the condition β is satisfied by satisfy the following equation:

$$d = (2t+1) \times Lb/4 \qquad \text{Equation (4)}$$

where t denotes an integer. In Equation (4), Lb is generally called a beat length, which is defined by the following equation.

$$Lb = \lambda / B_W \qquad \text{Equation (5)}$$

It is to be noted here that "distance |d| of displacement" that satisfies the condition β is periodically present in multiple points, as can be seen from Equation (4). Description will now be given further with regard to how the polarization coupling-induced lights interfere with each other on one waveguide.

Figure 27:
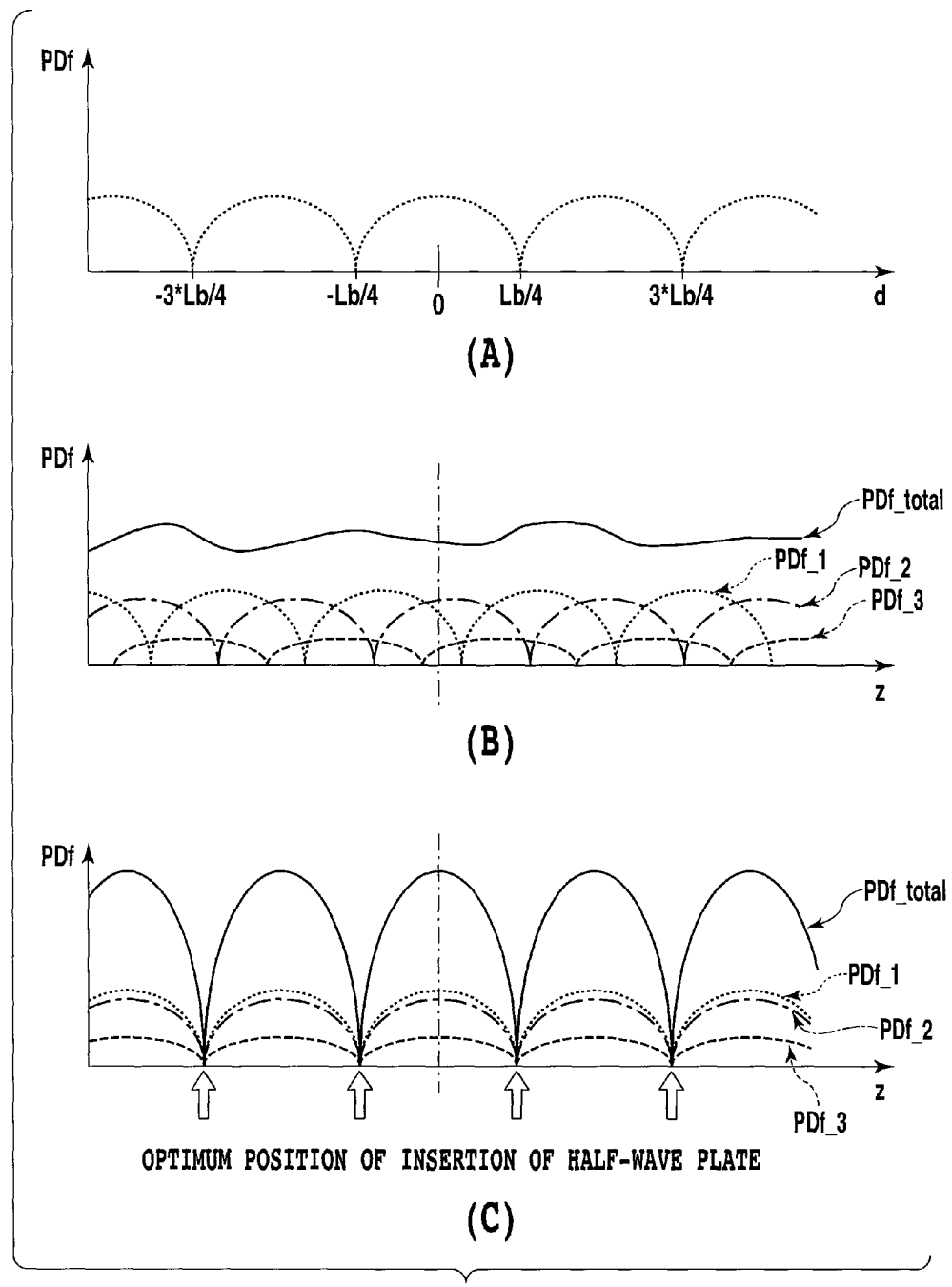
FIG. 27 is a graph explaining a distribution of PDf caused by the polarization coupling-induced light, on the waveguide.

FIG. 27 is a graph explaining a variation in the PDf caused by the polarization coupling-induced light, depending on the placed position of the half-wave plate. Part (a) of FIG. 27 shows a change in the PDf relative to the placed position of the half-wave plate, the change occurring when there are two polarization coupling-induced lights on the waveguide. The PDf caused by the polarization coupling-induced light changes depending on the position d of the half-wave plate 30, because the PDf depends on the field intensity of the two polarization coupling-induced lights after interference thereof. When the conditions for the removal of the polarization coupling-induced light are satisfied, the PDf also becomes zero. On the other hand, when the placed position of the half-wave plate 30 is at the physical midpoint of the waveguide path that links the heaters $25a$ and $25d$, that is, when d=0, the PDf undergoes the greatest degradation. In addition, multiple points such that the PDf becomes zero are present periodically. Therefore, it can be seen that the half-wave plate 30 can be placed at points such that the PDf is at its minimum, shown in Part (a) of FIG. 27, thereby to suppress the PDf that undergoes degradation due to the polarization coupling-induced light produced by the two heaters $25a$ and $25d$.

Likewise, the above-mentioned concept may be applied to the polarization coupling-induced light produced by the groove filled with the temperature compensation material, or the curve and other portions of the arm waveguide $4a$, besides the heater. As shown in FIG. 27, pairs of parts having the same structure can be disposed before and after the half-wave plate 30 thereby to make equal the amounts of production of polarization coupling-induced light and make the phase difference equal to the odd multiple of 180°. For example, the optical splitter 23 and the optical couplers $10a$ and $10b$ can be all configured of the same couplers (e.g., MMIs or directional couplers) with two inputs and two outputs thereby to utilize the interference for the removal of the polarization coupling-induced light.

It is to be noted here that consideration is given to the overall arrangement of all circuit components in which the polarization coupling-induced light is produced, if there are multiple locations (or circuit components) where the polarization coupling-induced light is produced, and there are multiple pairs of polarization coupling-induced lights. As mentioned previously, as for polarization coupling-induced lights from a pair of circuit components, the PDf varies depending on the distance |d| of displacement of the half-wave plate from the physical midpoint of the waveguide path, as shown in Part (a) of FIG. 27. When the origin point (z=0) is appropriately reset and the inserted position of the half-wave plate is replotted, a graph of PDf_1 shown in Part (b) of FIG. 27 is obtained. Further, if there are multiple pairs of polarization coupling-induced lights produced from multiple different circuit components, variations in the PDf caused by the polarization coupling of the circuit components occur as shown by PDf_2 and PDf_3 in Part (b) of FIG. 27.

The overall PDf characteristics of the optical delay line interferometer taken as a whole are the sum total of PDf_1, PDf_2 and PDf_3, which is represented as a curve of PDf_total. As can be seen from the graph, if variations in PDf_1, PDf_2 and PDf_3 and the like are out of synchronization (or out of phase) on the z axis, an optimum position of the half-wave plate such that the PDf caused by the polarization coupling can be eliminated is unclear. It is therefore required that the positions of the circuit components that produce the polarization coupling-induced lights, that is, the circuit layout, be designed so that the variations in PDf_1, PDf_2 and PDf_3 are in synchronization with one another on the z axis, as shown in Part (c) of FIG. 27. As shown in Part (c) of FIG. 27, the variations in PDfs can be brought into synchronization with one another thereby to make clear PDf characteristics and a periodic variation of the optical delay line interferometer and hence make obvious an optimum inserted position of the half-wave plate such that the PDf can be minimized.

The simplest method for making obvious the inserted position capable of minimization of the PDf mentioned above is that the circuit components that form the Mach-Zehnder interferometer are configured physically axisymmetrically about one given symmetric axis (X), wherever possible, as shown in FIG. 26. Here, the symmetric axis is called an imaginary symmetric axis. The imaginary symmetric axis refers to the central, symmetric axis about which two components belonging to each of all pairs of circuit components that produce the polarization coupling-induced light in the Mach-Zehnder interferometer are axisymmetrically disposed. One imaginary symmetric axis for achievement of the symmetric disposition of each individual pair can be achieved by a typical optimization process for the circuit layout.

All circuit components can be disposed symmetrically about the imaginary symmetric axis thereby to effect synchronization of the variations in the PDf due to the polarization coupling from the circuit components. In the optical delay line interferometer having such a symmetric disposition, when the position of the imaginary symmetric axis is set at the origin point (z=0), the half-wave plate can be disposed parallel to the imaginary symmetric axis X at the position z represented by the following equation:

$$z = Lb/4 \times (2t+1) \qquad \text{Equation (6),}$$

thereby to suppress the PDf degradation due to the polarization coupling. The condition of Equation (6) is a condition for the placed position of the half-wave plate for the suppression of the PDf degradation due to the polarization coupling-induced light.

On the other hand, it is also necessary to satisfy conditions for the inserted position of the half-wave plate for the simultaneous suppression of the PDf degradation due to the birefringence. As has been described previously in connection with FIG. 8, in two paths that form the Mach-Zehnder interferometer, the half-wave plate must be placed in such a location that the value of the difference between the integral value of the birefringence of the path from the optical splitter to the polarization converter on the short arm waveguide and the integral value of the birefringence of the path from the optical splitter to the polarization converter on the long arm waveguide is ΔB/2. Typically, the half-wave plate is placed at the midpoint between the arm waveguides; however, in the case of a circuit configuration as shown in FIG. 26, the half-wave plate may be disposed anywhere in a region A thereby to satisfy the above-mentioned conditions, provided that the polarization converter is disposed parallel to a line (e.g., the dotted line shown by the arrow X) on which the midpoints are physically arranged in a straight line.

In more detail, when the waveguides having the same structure are disposed parallel to each other in the vicinity of the midpoint between the arm waveguides as is the case with the configuration shown in FIG. 26, the difference between the integral values of the birefringence described previously is ΔB/2 at the midpoint. At this time, even if the half-wave plate is displaced from the midpoint, the integral values of the birefringence along the paths (i.e., the long arm waveguide and the short arm waveguide) change, but the amounts of change in the paths are the same. Therefore, the value of the difference between the integral values of the birefringence remains constant at ΔB/2. For the above reason, in the case of the optical delay line interferometer of the configuration shown in FIG. 26, the placement of the polarization converter capable of the elimination of the PDf caused by the birefringence may be anywhere in the region A, provided that the placement is parallel to the line that links the midpoints.

From the above, for the placed position of the half-wave plate for the elimination of both the PDf caused by the birefringence and the PDf caused by the polarization coupling-induced light, a location in the region A such that Equation (6) is satisfied is the optimum position, as shown in FIG. 26.

The half-wave plate is disposed in such a location that z is ±Lb/4, thereby to minimize the region A, which is effective from the view point of reduction in the overall size of the circuit.

Description will now be given of the effect of reducing the PDf resulting from the polarization coupling-induced light, according to the configuration of this embodiment described with reference to FIGS. 26 and 27.

Even if the polarization rotator is used as the polarization converter 30, interference conditions of the produced polarization coupling-induced light can be suppressed. The polarization rotator may be formed of a combination of two half-wave plates, that is, a first half-wave plate whose optic axis is inclined by 45° relative to the optic axis of the waveguide, and a second half-wave plate whose optic axis is parallel to the optic axis of the waveguide, and the polarization rotator can shift the phase difference between the polarization coupling-induced lights by 180°. In order to distinguish between these two half-wave plates having different functions, the second half-wave plate whose optic axis is parallel or horizontal to the optic axis of the waveguide will be called particularly "retarder," and the first half-wave plate whose optic axis is inclined by 45° relative to the optic axis of the waveguide will be called "half-wave plate" as it is.

When the above-mentioned polarization rotator is used as the polarization converter 30, Equation (3) representing the phase difference between the polarization coupling-induced lights is expressed by the following equation.

$$\phi = 180 \times 4 \times d \times B_W / \lambda + 180 \qquad \text{Equation (7)}$$

In Equation (7), the amount of phase change of 180° produced by the polarization rotator is added to Equation (3). Therefore, when the polarization rotator is used, Equation (6) representing the placed position of the polarization converter capable of the suppression of the PDf degradation due to the polarization coupling is expressed by the following equation.

$$z = Lb/4 \times (2t) \qquad \text{Equation (8)}$$

Figure 28:
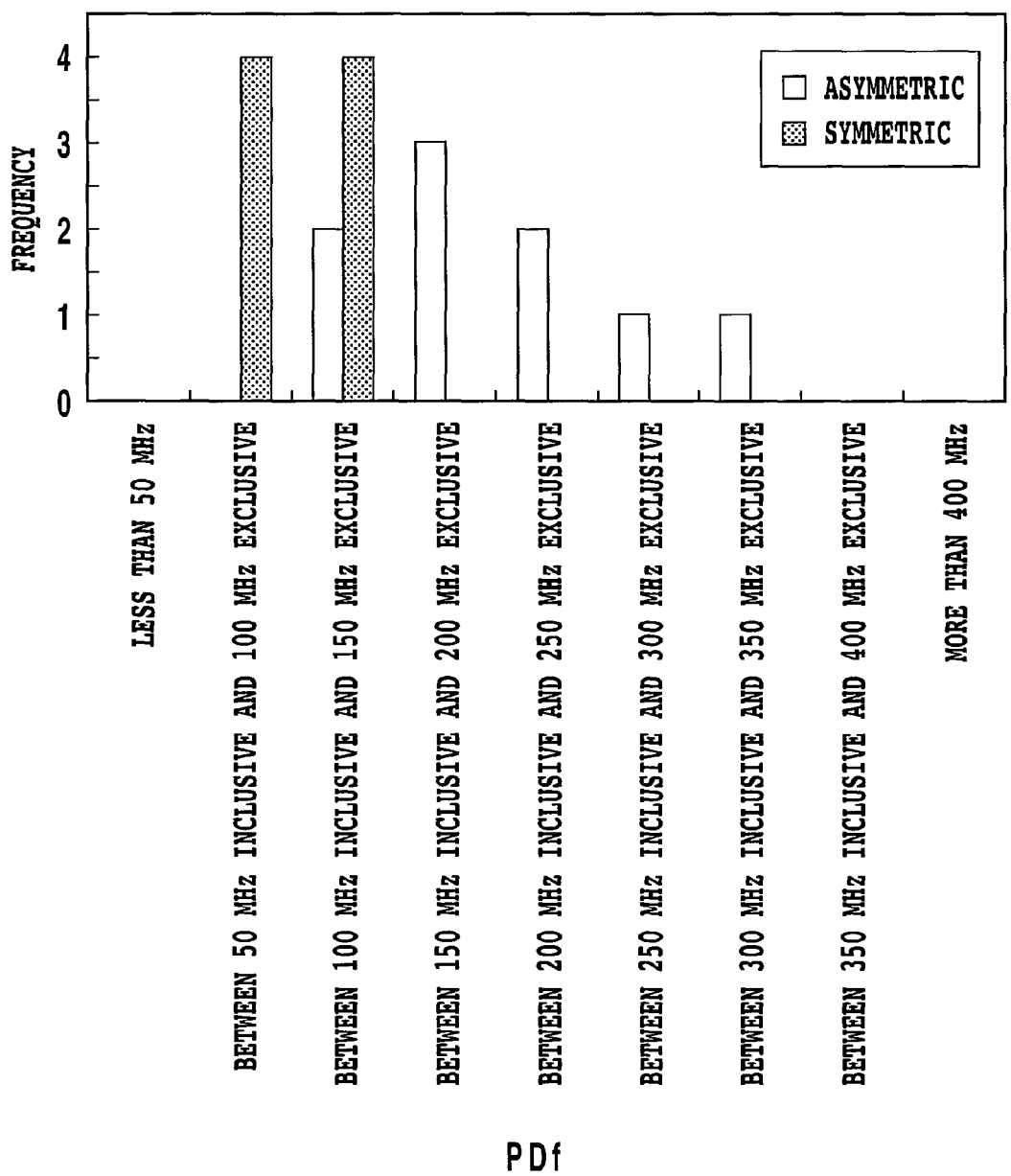
FIG. 28 is a histogram showing comparison of the PDf values of circuit groups fabricated under varying conditions for axisymmetry in the optical delay line interferometer shown in FIG. 26.

FIG. 28 is a histogram showing comparison of the PDf values of circuit groups fabricated under varying conditions for axisymmetry in the optical delay line interferometer shown in FIG. 26. In order to check the validity of the axisymmetry of the above-mentioned circuit configuration, multiple pieces of each of two types of circuit groups, that is, a circuit group designed in consideration for the axisymmetry, and a circuit group designed without consideration for the axisymmetry, were fabricated, and the PDf values were measured. The configuration of the circuit group designed in consideration for the axisymmetry is the same as that shown in FIG. 26. On the other hand, the configuration of the circuit group designed without consideration for the axisymmetry, fabricated for comparison, is the layout in which, in the configuration shown in FIG. 26, the heaters 25a and 25b are displaced by 1000 μm toward the optical splitter 23. The worst PDf values measured in the range of available frequencies from 1530 to 1570 nm are used for the comparison of the PDf values.

The two circuit groups are greatly different in the extent of variations in the PDf values. In the circuit group with high axisymmetry, many circuits generally having a low PDf values can be fabricated, and thus, the PDf degradation due to the polarization coupling is prevented. On the other hand, in the circuit group designed without consideration for the axisymmetry, the PDf varies over a wide range because of the polarization coupling caused by variations from circuit to circuit, and the average value of the PDf is also large. It can be seen that the circuit configuration in which the circuit components that can possibly produce the polarization coupling-induced light are axisymmetrically disposed, and also, the half-wave plate alone is offset from the central symmetric axis by a given distance is very effective for the suppression of the PDf caused by the polarization coupling.

In any of the embodiments, the optical delay line interferometer of the present invention enables the circuit layout with high axisymmetry as mentioned above, and is very effective in that the PDf caused by the polarization coupling-induced light can effectively be eliminated. In such a circuit configuration as is disclosed in the conventional art 3 shown in FIG. 3, it is impossible that the disposition of the phase shifters 12, the variable phase adjusters, or the like is the symmetric disposition about one symmetric axis (or the midpoint), and thus, synchronization of the PDf variations caused by the polarization coupling-induced light from multiple circuit components is impossible.

With reference to this embodiment, description has been given above with regard to the circuit configuration capable of preventing the PDf degradation due to the polarization coupling-induced light, taking the circuit layout with high axisymmetry as a specific example; however, the present invention is not limited to the configuration of this embodiment. A more generalized description is as given below. First, circuit components having the same structure in each pair (such as the optical splitter in the first stage and the optical coupler, the pair of heaters, or the pair of optical delay lines) are disposed on both sides relative to a given imaginary symmetric axis. Then, all pairs of circuit components can be disposed so that the integral value of the birefringence along the path of the optical waveguide from the imaginary symmetric axis to the circuit components is the same at each side. Then, the polarization converter can be displaced from the imaginary symmetric axis by the amount represented by Equation (6) or (8) according to the type of the polarization converter. Generally, the birefringence of the waveguide is uniform in the circuit, and thus, the circuit of the physically symmetric layout is one configuration that satisfies the above-mentioned conditions.

Fourth Embodiment

Description will now be given of an embodiment of the configuration capable of suppressing the degradation of the S/N ratio in the demodulator caused by an excess loss difference between the output waveguides in the demodulator, according to another aspect of the optical delay line interferometer of the present invention. The cause of the excess loss difference is a deviation of a division ratio of the optical splitters 23, 3a, 3b, 33a, 33b, ..., 33n in the configurations shown in FIGS. 8 and 12, or a deviation of a coupling ratio of the optical couplers 10a, 10b, ..., 10n. When the fabrication error or the like causes the deviation of the division ratio or the coupling ratio from 50%, which is a desired value, the excess loss difference occurs between the output waveguides of the optical delay line interferometer that forms the demodulator.

Figure 29:
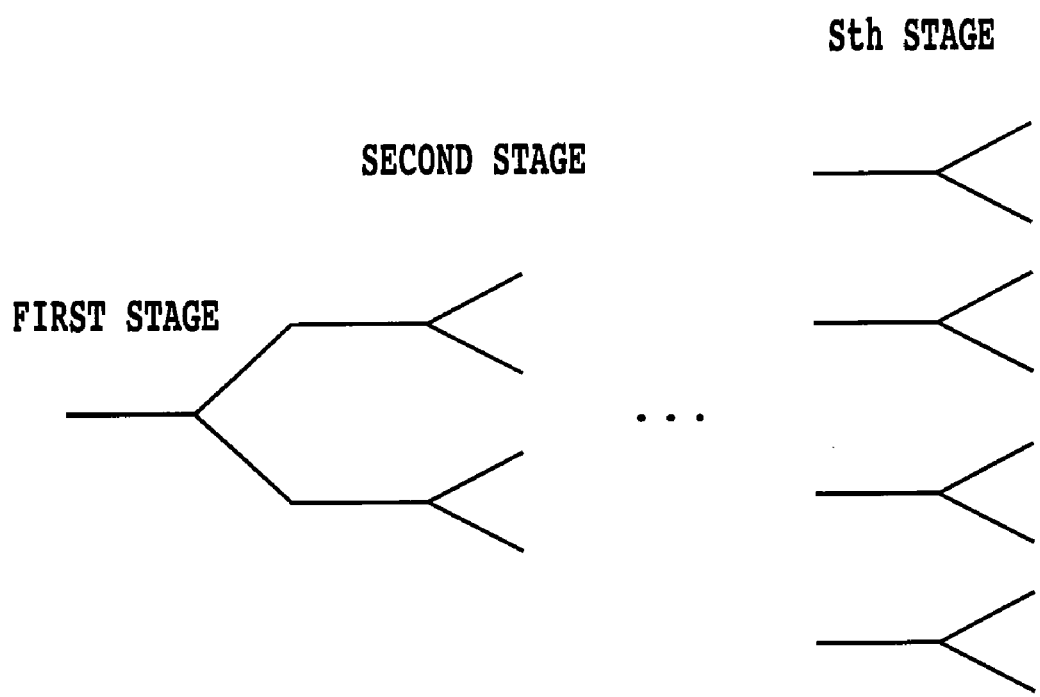
FIG. 29 is a diagram explaining the configuration of multiply cascaded optical Y-branch splitters.

Generally, the optical couplers 10a, 10b, ..., 10n have to be of a type having two inputs and two outputs, because of the configuration of the optical delay line interferometer, and thus, MMI couplers or directional couplers each having two inputs and two outputs are used as the optical couplers. Likewise, the optical splitter 23 has to be provided with an input port for monitor, and thus, an MMI coupler or directional coupler with two inputs and two outputs is used as the optical splitter 23. For simplicity, the optical splitters 3a, 3b, 33a, 33b, ..., 33n may have the same design as other optical dividers or optical combiners, and MMI couplers or directional couplers each having two inputs and two outputs may be used as these optical splitters. However, from the viewpoint of the suppression of the excess loss difference, the configuration of an MMI coupler with one input and N outputs or multiply cascaded optical Y-branch splitters shown in FIG. 29 may be utilized for each of the optical splitters 3a, 3b, 33a, 33b, ..., 33n, thereby to suppress the excess loss difference caused by the fabrication error. This respect will be described in more detail below.

In the optical splitters 23, 3a, 3b, 33a, 33b, ..., 33n or the optical couplers 10a, 10b, ..., 10n, the deviation of the value of the division ratio or the coupling ratio from 50% due to the fabrication error leads to the excess loss difference. However, the extent of influence on the excess loss difference varies from one to another of locations where the deviation of the division ratio or the coupling ratio occurs. As discussed specifically, here, the amount of deviation of the division ratio or the coupling ratio from its ideal value is taken as $\alpha$. As employed herein, the ideal value is 0.5 for the optical splitter 23, the optical couplers 10a, 10b, ..., 10n, and the optical splitters 3a and 3b. Meanwhile, the ideal value is 1/n for the optical splitters 33a, 33b, ..., 33n. Because of the configuration of the optical delay line interferometer, if the deviation occurs in the optical splitter 23 or the optical couplers 10a, 10b, ..., 10n closest to an input point or an output point, the excess loss difference (or a difference between a minimum excess loss and a maximum excess loss) is approximately $\alpha^2$. On the other hand, because of the configuration of the optical delay line interferometer, if the deviation of the division ratio of the optical splitters 3a, 3b, 33a, 33b, ..., 33n within the Mach-Zehnder interferometer occurs, the excess loss difference is approximately $\alpha$.

The value $\alpha$ is less than 1 and actually lies between about 0.05 and 0.1. Therefore, even if the division ratio of the optical splitter 23 or the coupling ratio of the optical couplers 10a, 10b, ..., 10n deviates by 0.01, an excess loss difference of only about 0.0001 occurs. On the other hand, even if the division ratio of the optical splitters 3a, 3b, 33a, 33b, ..., 33n deviates by 0.01, the excess loss difference reaches 0.01. Therefore, it can be seen that the deviation of the division ratio of the optical splitters 3a, 3b, 33a, 33b, ..., 33n has a great influence on the excess loss difference, which in turn increases the likelihood of the excess loss difference occurring.

Therefore, the MMI coupler with one input and N outputs (incidentally, the MMI coupler with one input and two outputs in FIG. 8) or the multiply cascaded optical Y-branch splitters (incidentally, the simple optical Y-branch splitter in FIG. 8) can be used as each of the optical splitters 3a, 3b, 33a, 33b, ..., 33n, thereby to suppress the occurrence of the excess loss difference. Generally, the MMI coupler with one input and N outputs or the multiply cascaded optical Y-branch splitters can effectively suppress the occurrence of the excess loss difference, since these coupler and splitter are resistant to the occurrence of the deviation of the division ratio due to the fabrication error.

On the other hand, the optical splitter 23 or the optical couplers 10a, 10b, ..., 10n located closest to the input or the output of the demodulator are resistant to the occurrence of the influence of the excess loss difference, even if the deviation of the division ratio or the coupling ratio occurs due to the fabrication error, as mentioned above. Thus, the directional couplers, the MMI couplers each having N inputs and N outputs, or the like can be used. The type of the directional coupler with little excess loss, the MMI coupler with N inputs and N outputs having a wide range of available wavelengths, or the like can be selectively used according to requirements for the circuit characteristics.

As a more specific embodiment, the optical delay line interferometer having the same configuration as shown in FIG. 14 was fabricated by the same fabrication method as the first embodiment. In this embodiment, multimode interference (MMI) couplers each having two inputs and two outputs were used as the optical splitter 23 in the first stage and the optical couplers 10a and 10b, linked to the input waveguide 2. For comparison, three types of splitters were used as the optical splitters 3a and 3b. The three types are as follows: type A: a splitter with one input and two outputs (or an optical Y-branch splitter); type B: an MMI coupler with two inputs and two outputs; and type C: an MMI coupler with one input and two outputs. Comparison is made of variations in excess loss from one output port to another among groups (that is, excess loss differences).

Figure 30:
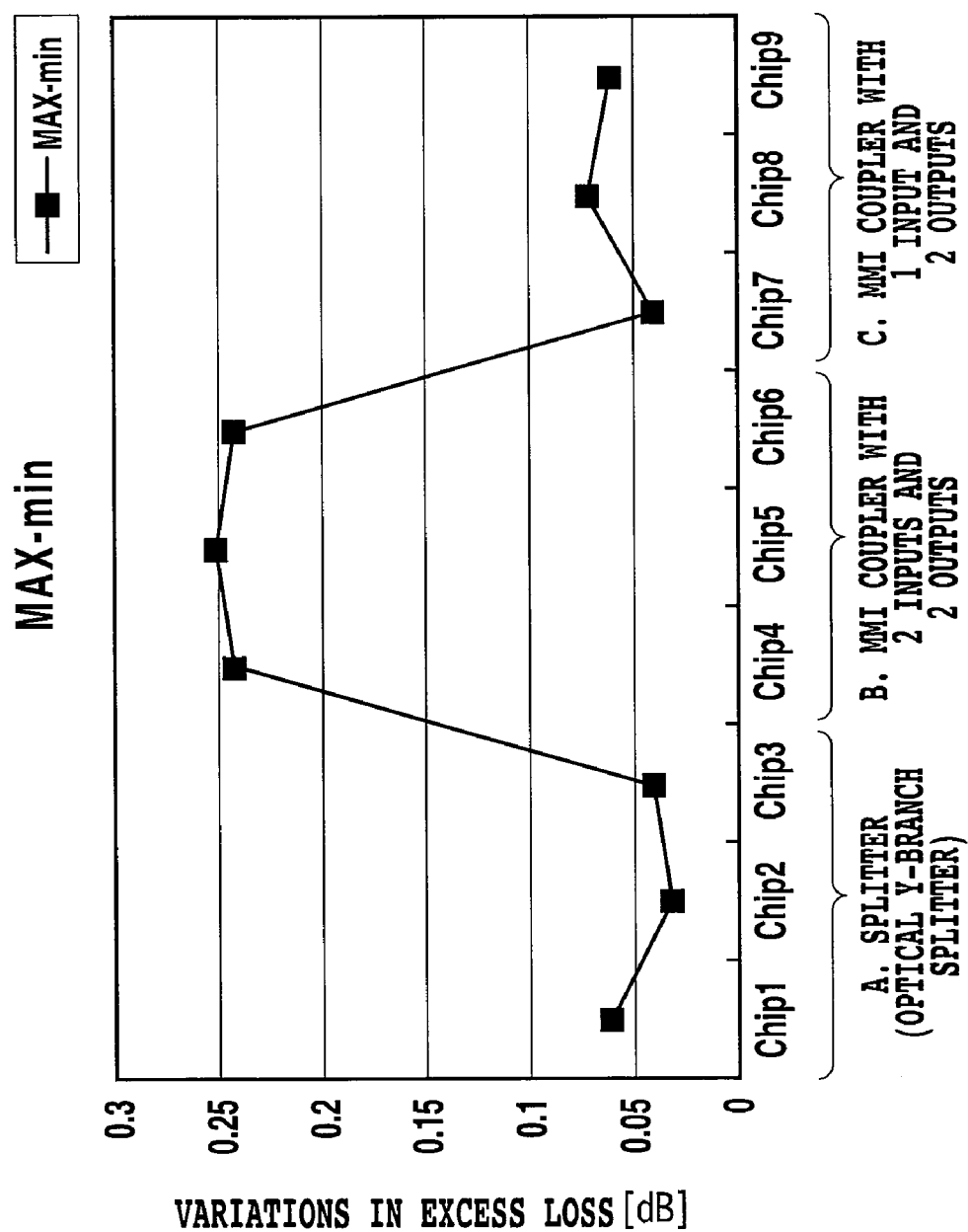
FIG. 30 is a graph showing comparison of the amounts of variations in excess loss difference among different types of splitters.

FIG. 30 is a graph showing the variations in the excess loss difference among the three different types of splitters, as plotted and compared. If the excess losses vary from one to another of four output waveguides of the optical delay line interferometer, the S/N ratio of the demodulated signal demodulated by the demodulator is degraded. Using splitters of each of the different types as the optical splitters 3a and 3b, three circuits were fabricated. The excess loss difference from one to another of four output waveguides of each optical delay line interferometer is plotted. When the type A, that is, the splitter (or the optical Y-branch splitter), and the type C, that is, the MMI coupler with one input and two outputs, are used, the excess loss difference is as low as about 0.05 dB. On the other hand, when the type B, that is, the MMI coupler with two inputs and two outputs, is used, the excess loss difference reaches 0.25 dB. Therefore, the splitters (or the optical Y-branch splitters) or the MMI couplers with one input and two outputs can be used as the optical splitters $3a$ and $3b$ thereby to suppress the excess loss difference between the output waveguides.

As mentioned above, it has been shown that, because of the circuit configuration of the optical delay line interferometer, an optical circuit of a type that attaches importance to the accuracy of the division ratio can be selected as the optical splitter within the Mach-Zehnder interferometer thereby to effectively suppress the excess loss difference.

Fifth Embodiment

The optical splitter 23 and the optical couplers $10a$, $10b$, ..., $10n$ needs to have the functions of dividing or combining light, and required characteristics are different, allowing for the polarization mode dispersion of each circuit. The polarization mode dispersion means that propagation delay characteristics of light depends on the state of polarization of an input optical signal. The polarization mode dispersion causes a waveform distortion of the optical signal and hence the degradation of the S/N ratio at the time of demodulation of a phase shift keyed signal.

The most dominant factor of the occurrence of the polarization mode dispersion of the optical delay line interferometer is the polarization dependence of the division ratio and the coupling ratio of the optical splitter 23 and the optical couplers $10a$, $10b$, ..., $10n$. The division ratio and the coupling ratio of the optical splitter and the optical couplers change, depending on the state of polarization of input light. In such a situation, there is a difference in intensity ratio between light propagating through the long arm waveguide and light propagating through the short arm waveguide. At this time, the delay of the propagating light increases as the intensity ratio of the light propagating through the long arm waveguide increases. It is possible that, when the division ratio and the coupling ratio have the polarization dependence, the amount of this delay also depends on the state of polarization of the input light, and thus, the polarization mode dispersion occurs.

Therefore, it is required that circuits in which the polarization dependence of the division ratio is low be used as the optical splitter 23 and the optical couplers $10a$, $10b$, ..., $10n$. A directional coupler is optimum for such a circuit. Further, the directional couplers of the same design may be used as the optical splitter 23 and the optical couplers $10a$, $10b$, ..., $10n$ thereby to increase tolerance of circuit fabrication. In the case of the same design, even if the fabrication error caused by the fabrication process occurs, the division ratios of the directional couplers deviate by the same amount. In this case, a variation in the polarization mode dispersion in itself can be also suppressed.

Description will now be given of the performance of the specific optical delay line interferometer actually fabricated by the application of the PLC technology.

The optical delay line interferometer having the same configuration as shown in FIG. 14 was fabricated by the same fabrication method as the first embodiment. Circuits using directional couplers each having two inputs and two outputs and circuits using MMI couplers each having two inputs and two outputs were fabricated as the optical splitter 23 in the first stage and the optical couplers $10a$ and $10b$ that form an output circuit, and comparison of the polarization mode dispersion was performed.

It has been shown that when the MMI couplers each having two inputs and two outputs are used, a polarization mode dispersion of 2.0 ps or more occurs, whereas when the directional couplers are used, the polarization mode dispersion is about 0.5 ps. Generally, it is demanded that the polarization mode dispersion of the optical delay line interferometer be 2 ps or less, and thus, it is preferable that the directional couplers be used as the optical splitter 23 and the optical couplers $10a$ and $10b$.

As can be seen from the fourth embodiment, the MMI couplers each with one input and N outputs, or the multiply cascaded optical Y-branch splitters may be used as each of the N optical splitters within the optical delay line interferometer thereby to achieve a further reduction in the excess loss difference. In addition, the directional couplers may be used as the optical splitter in the first stage of the optical delay line interferometer and the N optical couplers in the last stage thereby to achieve a further reduction in the polarization mode dispersion. The optimum type of optical circuit may be selected as the optical splitter and the optical couplers within the circuit according to the position in the configuration of the optical delay line interferometer thereby to improve the S/N ratio of the demodulator.

As can be seen from the above-described embodiments, the optical delay line interferometer of the present invention is characterized in that multiple Mach-Zehnder interferometers are disposed such that multiple long arm waveguides are disposed in close proximity to each other, multiple short arm waveguides are disposed in close proximity to each other, and the optical delay lines and the phase shifters are equally disposed before and after the polarization converter disposed on the arm waveguides. The configuration of the conventional art 2 requires two polarization converters for the elimination of the polarization dependence, whereas according to the configuration of the present invention, the required number of polarization converters is only one. Meanwhile, even if the arm waveguides are configured in stacked relation while the topology configuration of the conventional art 2 is maintained, loss increases because of the presence of many points of intersection of the waveguides. On the other hand, according to the configuration of the present invention, the required number of points of intersection per Mach-Zehnder interferometer is only one, and thus, loss reduction can be achieved.

In addition, the configuration of the conventional art 3 cannot eliminate a dynamic birefringence variation due to the heater or the like provided in the phase shifter. As opposed to this, according to the configuration of the present invention, the optical delay lines and the phase shifters can be equally disposed before and after the polarization converter disposed on the arm waveguides in which the birefringence occurs, thereby to achieve the elimination of the dynamic birefringence variation.

Further, multiple arm waveguides can be disposed in close proximity to each other thereby to achieve a reduction in fabrication variations in the refractive index or the like. Therefore, this also enables the suppression of variations in the interference characteristics among multiple interferometers.

Further, since multiple arm waveguides can be disposed in close proximity to each other, the influence of the fabrication error on the groove formed in order to be filled with the temperature compensation material is little. Accordingly, besides the effect of eliminating the polarization dependence, the effect of reducing the temperature dependence of multiple Mach-Zehnder interferometers at a time can be achieved while the phase relation between the optical signals outputted from each Mach-Zehnder interferometer is maintained.

As described in detail above, according to the present invention, the polarization dependence of the optical delay line interferometer, resulting from the birefringence and the polarization coupling, can be eliminated. Provided is the circuit configuration suitable for making polarization-independent the optical delay line interferometer in which the polarization converter is disposed. The S/N ratio of the demodulated signal of the demodulator formed by the optical delay line interferometer can be improved. Further, according to the present invention, both the polarization dependence and the temperature dependence of the optical delay line interferometer can be reduced. The disposition of the polarization converter and the grove filled with the temperature compensation material makes it possible to provide the circuit configuration suitable for eliminating the polarization dependence and the temperature dependence of the optical delay line interferometer. Further, the circuit layout with high axisymmetry can be achieved, and the PDf resulting from the polarization coupling-induced light can be effectively eliminated.

INDUSTRIAL APPLICABILITY

The present invention is applicable to an optical communication apparatus for an optical transmission system. The present invention is applicable particularly to an optical delay line interferometer that delays and demodulates a phase-modulated optical signal.

The invention claimed is:

1. An optical delay line interferometer, comprising:
an optical splitter that divides an input modulated optical signal into two optical signals;
a first optical divider and a second optical divider that receive, respectively, one of the two optical signals divided by the optical splitter, and that each output N divided output lights;
N short arm waveguides connected to the first optical divider, and configured to propagate N first divided output lights from the first optical divider therethrough, respectively;
N long arm waveguides connected to the second optical divider, and configured to propagate N second divided output lights from the second optical divider therethrough, respectively;
N optical combiners that combine one of the N first divided output lights propagating through the N short arm waveguides, with one of the N second divided output lights propagating through the N long arm waveguides and corresponding to the one of the N first divided output lights, thereby to cause interference of the one first divided output light and the one second divided output light, the optical combiners each outputting two interfering output lights, the optical combiners forming N interferometers corresponding to the N optical combiners, respectively;
N pairs of output waveguides connected to the N optical combiners, respectively, each of the N pairs of the output waveguides being configured to propagate the corresponding two interfering output lights and including a first output waveguide and a second output waveguide;
a polarization converter disposed across the N short arm waveguides and the N long arm waveguides, the polarization converter being placed in such a location that a difference between an integral value of birefringence of a path from the optical splitter to the polarization converter on each of the short arm waveguides and an integral value of birefringence of a path from the optical splitter to the polarization converter on the corresponding one of the long arm waveguides is half of a difference between an integral value of birefringence of an entire path from the optical splitter via the short arm waveguide to the corresponding one of the optical combiners and an integral value of birefringence of an entire path from the optical splitter via the long arm waveguide to the corresponding one of the optical combiner, the polarization converter performing conversion from one to another of TE and TM polarizations;
two optical delay lines disposed on both sides of the polarization converter of the long arm waveguides, the two optical delay lines each producing a corresponding delay time between the entire paths from the optical splitter via the long arm waveguides to the optical combiners and the entire paths from the optical splitter via the short arm waveguides to the optical combiners, the corresponding delay time being equivalent to a time of 0.5 symbols of the input modulated optical signal; and
a pair of phase shifters disposed on both sides of the polarization converter, respectively, in at least either the short arm waveguides or the long arm waveguides, the pair of phase shifters having the same phase shift elements before and after the polarization converter, the pair of the phase shifters being configured so that optical path length differences of the N interferometers each has a phase difference of $\pi/N$ at a carrier optical frequency of the input modulated optical signal, and that the optical path length difference of the N interferometers taken as a whole has a phase difference of $\pi(N-1)/N$.

2. The optical delay line interferometer according to claim 1, further comprising:
grooves each formed in line by removing a portion of a cladding and a portion of a core that form each of at least either the N long arm waveguides or the N short arm waveguides, while extending across the at least either the N long arm waveguides or the N short arm waveguides, the grooves being formed in the same shape on both sides of the polarization converter, the grooves being filled with a material having a different coefficient of refractive index dependence on temperature from a coefficient of effective refractive index dependence on temperature of the waveguides, thereby to compensate for a variation in loss spectrum in a wavelength axis due to a change in temperature of the N interferometers.

3. The optical delay line interferometer according to claim 1, comprising:
variable phase adjusters that adjust the delay time or the amount of phase provided by the phase shift element, the variable phase adjusters being disposed, on both sides of the polarization converter, respectively, in at least either the short arm waveguides or the long arm waveguides, the optical delay line interferometer characterized in that the amount of adjustment of the delay time or the amount of phase by the variable phase adjuster on one side of the polarization converter is equal to the amount of adjustment by the variable phase adjuster on the other side.

4. The optical delay line interferometer according to claim 2, comprising:
variable phase adjusters that adjust the delay time or the amount of phase provided by the phase shift element, the variable phase adjusters being disposed, on both sides of the polarization converter, respectively, in at least either the short arm waveguides or the long arm waveguides, the optical delay line interferometer characterized in that the amount of adjustment of the delay time or the amount of phase by the variable phase adjuster on one side of the polarization converter is equal to the amount of adjustment by the variable phase adjuster on the other side.

5. The optical delay line interferometer according to claim 1, wherein the polarization converter is any one of a 90° polarization rotator, a −90° polarization rotator, and a half-wave plate.

6. The optical delay line interferometer according to claim 3, wherein the variable phase adjuster is a heater formed on the long arm waveguides or on the short arm waveguides.

7. The optical delay line interferometer according to claim 4, wherein the variable phase adjuster is a heater formed on the long arm waveguides or on the short arm waveguides.

8. The optical delay line interferometer according to claim 1, further comprising:
a skew adjuster that adjusts an arrival time for the two interfering output lights outputted from any one of the N pairs of the output waveguides.

9. The optical delay line interferometer according to claim 6, wherein the skew adjuster is disposed, on both sides of the polarization converter, respectively, in at least either the short arm waveguides or the long arm waveguides, or is disposed in at least one pair of the N pairs of the output waveguides.

10. The optical delay line interferometer according to claim 1, wherein
given that B denotes the integral value of the birefringence of each of entire paths from the optical splitter via the short arm waveguides to the optical combiners, circuit components of the two optical delay lines and the pair of the phase shifters are formed axisymmetrically about an imaginary symmetric axis that is perpendicular to all arm waveguides, and that contains points on the short arm waveguides where an integral value of the birefringence from the optical splitter is B/2, and
given that $B_w$ represents the birefringence of the waveguide; $Lb=\lambda/B_w$ represents a beat length; and m represents an integer of 0 or more, the polarization converter, if being the half-wave plate, is disposed away from the imaginary symmetric axis by (Lb/4×m) where m is an odd number, or the polarization converter, if being any one of the 90° polarization rotator and the −90° polarization rotator, is disposed away from the imaginary symmetric axis by (Lb/4×m) where m is an even number.

11. The optical delay line interferometer according to claim 3, wherein
given that B denotes the integral value of the birefringence of each of entire paths from the optical splitter via the short arm waveguides to the optical combiners, circuit components of the two optical delay lines, the pair of the phase shifters, and the variable phase adjusters are formed axisymmetrically about an imaginary symmetric axis that is perpendicular to all arm waveguides, and that contains points on the short arm waveguides where an integral value of the birefringence from the optical splitter is B/2, and
given that Bw represents the birefringence of the waveguide; $Lb=\lambda/B_w$ represents a beat length; and m represents an integer of 0 or more, the polarization converter, if being the half-wave plate, is disposed away from the imaginary symmetric axis by (Lb/4×m) where m is an odd number, or the polarization converter, if being any one of the 90° polarization rotator and the −90° polarization rotator, is disposed away from the imaginary symmetric axis by (Lb/4×m) where m is an even number.

12. The optical delay line interferometer according to claim 4, wherein
given that B denotes the integral value of the birefringence of each of entire paths from the optical splitter via the short arm waveguides to the optical combiners, circuit components of the two optical delay lines, the pair of the phase shifters, and the variable phase adjusters are formed axisymmetrically about an imaginary symmetric axis that is perpendicular to all arm waveguides, and that contains points on the short arm waveguides where an integral value of the birefringence from the optical splitter is B/2, and
given that $B_W$ represents the birefringence of the waveguide; $Lb=\lambda/B_w$ represents a beat length; and m represents an integer of 0 or more, the polarization converter, if being the half-wave plate, is disposed away from the imaginary symmetric axis by (Lb/4×m) where m is an odd number, or the polarization converter, if being any one of the 90° polarization rotator and the −90° polarization rotator, is disposed away from the imaginary symmetric axis by (Lb/4×m) where m is an even number.

13. The optical delay line interferometer according to claim 1, wherein each of the first optical divider and the second optical divider, which outputs the N divided output lights, uses any one of an MMI coupler having one input and N outputs, and an S-cascaded optical Y-branch splitters each having one input and two outputs, provided that s satisfying $N=2^s$ is a natural number.

14. The optical delay line interferometer according to claim 2, wherein each of the first optical divider and the second optical divider, which outputs the N divided output lights, uses any one of an MMI coupler having one input and N outputs, and an S-cascaded optical Y-branch splitters each having one input and two outputs, provided that s satisfying $N=2^s$ is a natural number.

15. The optical delay line interferometer according to claim 4, wherein each of the first optical divider and the second optical divider, which outputs the N divided output lights, uses any one of an MMI coupler having one input and N outputs, and an S-cascaded optical Y-branch splitters each having one input and two outputs, provided that s satisfying $N=2^s$ is a natural number.

16. The optical delay line interferometer according to claim 7, wherein each of the first optical divider and the second optical divider, which outputs the N divided output lights, uses any one of an MMI coupler having one input and N outputs, and an S-cascaded optical Y-branch splitters each having one input and two outputs, provided that s satisfying $N=2^s$ is a natural number.

17. The optical delay line interferometer according to claim 8, wherein each of the first optical divider and the second optical divider, which outputs the N divided output lights, uses any one of an MMI coupler having one input and N outputs, and an S-cascaded optical Y-branch splitters each having one input and two outputs, provided that s satisfying $N=2^s$ is a natural number.

18. The optical delay line interferometer according to claim 11, wherein each of the first optical divider and the second optical divider, which outputs the N divided output lights, uses any one of an MMI coupler having one input and N outputs, and an S-cascaded optical Y-branch splitters each having one input and two outputs, provided that s satisfying $N=2^s$ is a natural number.

19. The optical delay line interferometer according to claim 12, wherein each of the first optical divider and the second optical divider, which outputs the N divided output lights, uses any one of an MMI coupler having one input and N outputs, and an S-cascaded optical Y-branch splitters each having one input and two outputs, provided that s satisfying $N=2^s$ is a natural number.

20. The optical delay line interferometer according to claim 1, wherein directional couplers are used as the optical splitter and the N optical combiners.

21. The optical delay line interferometer according to claim 2, wherein directional couplers are used as the optical splitter and the N optical combiners.

22. The optical delay line interferometer according to claim 7, wherein directional couplers are used as the optical splitter and the N optical combiners.

23. The optical delay line interferometer according to claim 16, wherein directional couplers are used as the optical splitter and the N optical combiners.

* * * * *